United States Patent
Kim et al.

(10) Patent No.: US 12,284,603 B2
(45) Date of Patent: *Apr. 22, 2025

(54) METHOD AND DEVICE FOR SUPPORTING MULTIPLE SCG CONFIGURATIONS IN DUAL CONNECTIVITY SUPPORTED BY NEXT-GENERATION MOBILE COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/590,396

(22) Filed: Feb. 28, 2024

(65) Prior Publication Data

US 2024/0205802 A1     Jun. 20, 2024

Related U.S. Application Data

(63) Continuation of application No. 17/393,717, filed on Aug. 4, 2021, now Pat. No. 11,924,747.

(30) Foreign Application Priority Data

Aug. 5, 2020  (KR) .................. 10-2020-0098084

(51) Int. Cl.
*H04W 4/00* (2018.01)
*H04W 48/16* (2009.01)
*H04W 52/36* (2009.01)

(52) U.S. Cl.
CPC ......... *H04W 48/16* (2013.01); *H04W 52/365* (2013.01)

(58) Field of Classification Search
CPC ................ H04W 48/16; H04W 52/365
(Continued)

(56) References Cited

U.S. PATENT DOCUMENTS 10,306,537 B2   5/2019   Dinan
10,314,005 B2   6/2019   Kim et al.
(Continued)

FOREIGN PATENT DOCUMENTS

IN   201937032087 A   10/2019
KR   10-2018-0032675 A   3/2018
(Continued)

OTHER PUBLICATIONS

International Search Report with Written Opinion dated Nov. 17, 2021; International Appln. No. PCT/KR2021/010291.
(Continued)

*Primary Examiner* — Temica M Beamer
(74) *Attorney, Agent, or Firm* — Jefferson IP Law, LLP

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. A method performed by a terminal in a communication system is provided. The method includes receiving, from a first base station, configuration information for a secondary cell group (SCG) including at least one serving cell associated with a second base station, receiving, from the first base station, a first message for activation or deactivation of the SCG, and in case that the SCG is deactivated based on the first
(Continued)

message and uplink data arrives on at least one bearer of the SCG, transmitting a second message for activation of the SCG. According to the disclosure, carrier aggregation and dual connectivity can be quickly activated, thereby reducing battery consumption of a terminal.

15 Claims, 20 Drawing Sheets

(58) Field of Classification Search
USPC .......................................................... 370/328
See application file for complete search history.

(56) References Cited

U.S. PATENT DOCUMENTS

| | | | |
|---|---|---|---|
| 10,397,863 | B2 | 8/2019 | Lee et al. |
| 10,701,719 | B2 | 6/2020 | Dinan |
| 2019/0261396 | A1 | 8/2019 | Dinan |
| 2019/0349866 | A1 | 11/2019 | Lin et al. |
| 2020/0067664 | A1 | 2/2020 | Kim et al. |
| 2020/0288338 | A1 | 9/2020 | Freda et al. |
| 2020/0288478 | A1 | 9/2020 | Lee et al. |
| 2021/0274587 | A1 | 9/2021 | Jung et al. |

FOREIGN PATENT DOCUMENTS

| | | |
|---|---|---|
| KR | 10-2011585 B1 | 8/2019 |
| KR | 10-2019-0143782 A | 12/2019 |
| WO | 2019/050352 A1 | 3/2019 |
| WO | 2019/099550 A1 | 5/2019 |

OTHER PUBLICATIONS

Qualcomm Incorporated; Further discussion on suspension of SCG; 3GPP TSG RAN WG2 Meeting #108; R2-1914364; Reno, Nevada, US; Nov. 18-22, 2019; Nov. 8, 2019.

ETSI; LTE; Evolved Universal Terrestrial Radio Access (E-UTRA); Medium Access Control (MAC) protocol specification (3GPP TS 36.321 version 15.9.0 Release 15); ETSI TS 136 321 V15.9.0 (Jul. 2020); Sophia Antipolis Cedex, France; Jul. 31, 2020.

Extended European Search Report dated Jun. 21, 2024; European Appln. No. 21852458.5-1215 / 4176681 PCT/KR2021010291.

| $C_7$ | $C_6$ | $C_5$ | $C_4$ | $C_3$ | $C_2$ | $C_1$ | R | Oct 1 |

14-10

| $C_7$ | $C_6$ | $C_5$ | $C_4$ | $C_3$ | $C_2$ | $C_1$ | R | Oct 1 |
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |

METHOD AND DEVICE FOR SUPPORTING MULTIPLE SCG CONFIGURATIONS IN DUAL CONNECTIVITY SUPPORTED BY NEXT-GENERATION MOBILE COMMUNICATION SYSTEM

CROSS-REFERENCE TO RELATED APPLICATION(S)

This application a continuation application of prior application Ser. No. 17/393,717 filed on Aug. 4, 2021, and is based on and claims priority under 35 U.S.C. § 119(a) of a Korean patent application number 10-2020-0098084, filed on Aug. 5, 2020, in the Korean Intellectual Property Office, the disclosure of which is incorporated by reference herein in its entirety.

BACKGROUND

1. Field

The disclosure relates to operations of a terminal and a base station in a mobile communication system.

More particularly, the disclosure relates to a method and a device for efficiently operating carrier aggregation (CA) or dual connectivity (DC) in a next-generation mobile communication system.

2. Description of Related Art

To meet an increasing demand for wireless data traffic since deployment of $4^{th}$-Generation (4G) communication systems, efforts have been made to develop an improved $5^{th}$-Generation (5G) or pre-5G communication system. Therefore, the 5G or pre-5G communication system is also called a 'Beyond 4G Network' or a 'Post Long-Term Evolution (LTE) System'. The 5G communication system is considered to be implemented in higher frequency (millimeter (mm) Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid Frequency Shift Keying (FSK) and Quadrature Amplitude Modulation (QAM) Frequency Quadrature Amplitude Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

There is a need for a method for using carrier aggregation or dual connectivity in a next-generation mobile communication system.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a next-generation mobile communication system, carrier aggregation (CA) or dual connectivity (DC) that may be used to provide a terminal with a service having a high data transmission rate and a low transmission delay.

There is a need for a method for preventing a processing delay that may occur when carrier aggregation or dual connectivity is configured and activated for a terminal connected to a network, or when carrier aggregation or dual connectivity is used and then deactivated. If a terminal maintains multiple cells active to use carrier aggregation or dual connectivity, the terminal needs to perform physical downlink control channel (PDCCH) monitoring for each cell, and thus battery consumption of the terminal may be significant. On the other hand, if the multiple cells are maintained deactivated to reduce battery consumption of the terminal, a data transmission or reception delay may occur due to a delay occurring when activating the multiple cells to use carrier aggregation or dual connectivity.

In the above or in the disclosure, a cell may refer to a primary cell (PCell), a secondary cell (SCell) (e.g., SCell configured in a master cell group (MCG)), a primary secondary cell (PSCell) (e.g., PCell of a secondary cell group (SCG)), or an SPCell (e.g., SCell configured in a secondary cell group (SCG)).

Additional aspects will be set forth in part in the description which follows and, in part, will be apparent from the description, or may be learned by practice of the presented embodiments.

In accordance with an aspect of the disclosure, a method performed by a terminal in a communication system is provided. The method includes receiving, from a first base station, configuration information for a secondary cell group (SCG) including at least one serving cell associated with a second base station, receiving, from the first base station, a first message for activation or deactivation of the SCG, and in case that the SCG is deactivated based on the first message and uplink data arrives on at least one bearer of the SCG, transmitting a second message for activation of the SCG.

In accordance with another aspect of the disclosure, a method performed by a base station in a communication system is provided. The method includes transmitting, to a terminal, configuration information for a SCG including at least one serving cell associated with a second base station, transmitting, to the terminal, a first message for activation or deactivation of the SCG, and in case that the SCG is deactivated based on the first message and uplink data arrives on at least one bearer of the SCG, receiving, from the terminal, a second message for activation of the SCG.

In accordance with another aspect of the disclosure, a terminal in a communication system is provided. The terminal includes a transceiver, and a controller configured to control to receive, from a first base station via the transceiver, configuration information for a SCG including at least one serving cell associated with a second base station, receive, from the first base station via the transceiver, a first message for activation or deactivation of the SCG, and in case that the SCG is deactivated based on the first message and uplink data arrives on at least one bearer of the SCG, transmit a second message for activation of the SCG via the transceiver.

In accordance with another aspect of the disclosure, a method performed by a base station in a communication system is provided. The base station includes a transceiver, and a controller configured to control to transmit, to a terminal via the transceiver, configuration information for a SCG including at least one serving cell associated with a second base station, transmit, to the terminal via the transceiver, a first message for activation or deactivation of the SCG, and in case that the SCG is deactivated based on the first message and uplink data arrives on at least one bearer of the SCG, receive, from the terminal via the transceiver, a second message for activation of the SCG.

The disclosure proposes, in a next-generation mobile communication system, a new mode enabling a terminal in a radio resource control (RRC) connected mode, which has established a connection with a network, to quickly activate and deactivate carrier aggregation or dual connectivity, the new mode including a dormant mode, a suspension mode, or a deactivated mode. In the disclosure, by proposing a method capable of operating the dormant (hibernation, dormancy, or suspension) mode in a bandwidth part-level, cell-level, or cell group-level (e.g., for a secondary cell group), the terminal can quickly activate carrier aggregation or dual connectivity, and can reduce battery consumption.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 14 is a diagram illustrating medium access control (MAC) control information (MAC control element, MAC CE) indicating a state transition to an active state, a dormant state, or a deactivated state according to an embodiment of the disclosure;

Throughout the drawings, like reference numerals will be understood to refer to like parts, components, and structures.

DETAILED DESCRIPTION

Figure 1:
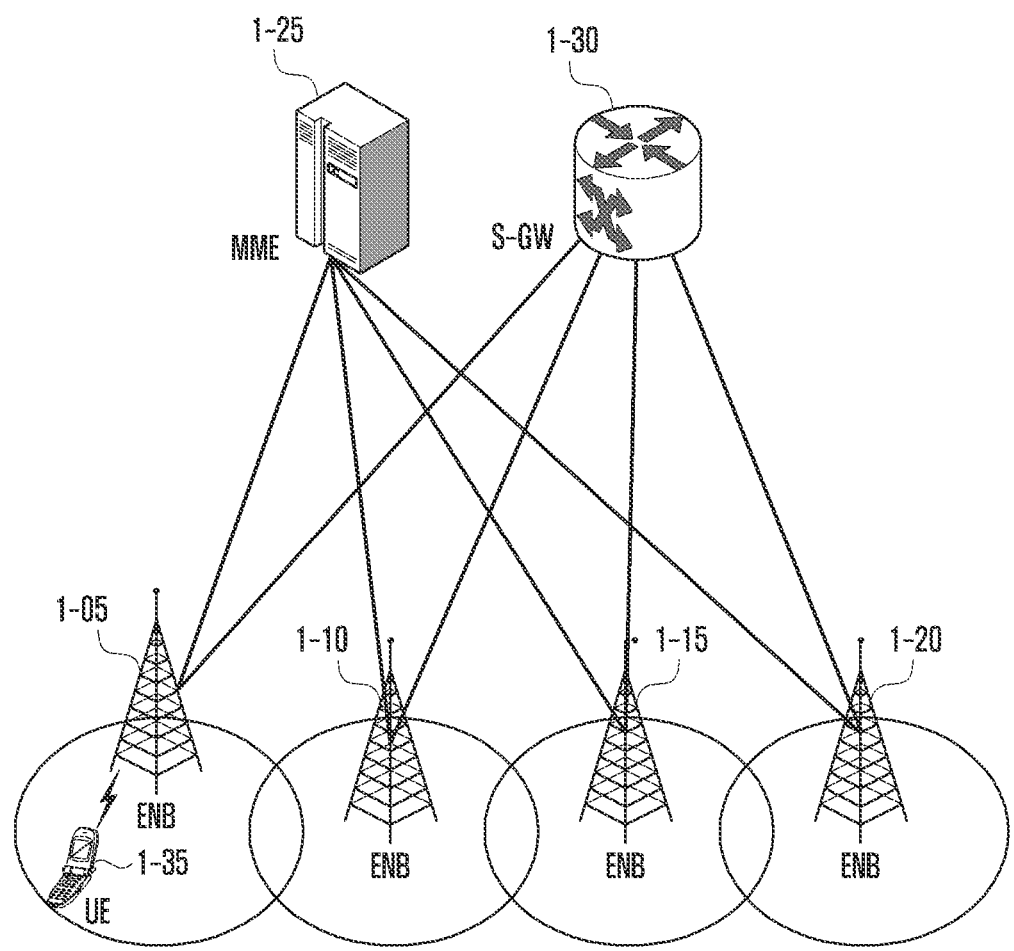
FIG. 1 is a diagram illustrating a structure of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description of the disclosure, a detailed description of relevant known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In describing the disclosure below, a detailed description of relevant known functions or configurations incorporated herein will be omitted when it may make the subject matter of the disclosure unnecessarily unclear. Hereinafter, embodiments of the disclosure will be described with reference to the accompanying drawings.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB" for the convenience of description. That is, a base station described as "eNB" may indicate "gNB".

FIG. 1 is a diagram illustrating a structure of a long term evolution (LTE) system according to an embodiment of the disclosure.

Referring to FIG. 1, as illustrated, a radio access network of an LTE system includes next-generation base stations (evolved Node B, hereinafter, eNB, Node B, or base station) 1-05, 1-10, 1-15, and 1-20, a mobility management entity (MME) 1-25, and a serving-gateway (S-GW) 1-30. A user terminal (user equipment, hereinafter, UE or terminal) 1-35 accesses an external network via the ENBs 1-05 to 1-20 and the S-GW 1-30.

Referring to FIG. 1, the ENBs 1-05 to 1-20 correspond to existing Node Bs of a Universal Mobile Telecommunications System (UMTS) system. The eNBs are connected to the UE 1-35 via a radio channel and perform more complex roles compared to the existing Node Bs. In the LTE system, because all user traffic including a real-time service, such as Voice over IP (VOIP) over the Internet protocol, is serviced via a shared channel, a device, which collects state information, such as buffer states, available transmission power states, and channel states of the UEs, so as to perform scheduling, is required, and the ENBs 1-05 to 1-20 take on the role of the device. A single ENB typically controls multiple cells. For example, in order to implement a transmission rate of 100 Mbps, the LTE system uses, for example, orthogonal frequency division multiplexing (hereinafter, referred to as OFDM) as a radio access technology in a 20 MHz bandwidth. An adaptive modulation & coding (hereinafter, referred to as AMC) method of determining a modulation scheme and a channel coding rate according to a channel state of the UE is applied. The S-GW 1-30 is a device configured to provide a data bearer, and generates or removes a data bearer under control of the MME 1-25. The MME is a device in charge of various control functions as well as a mobility management function for the UE, and is connected to multiple base stations.

Figure 2:
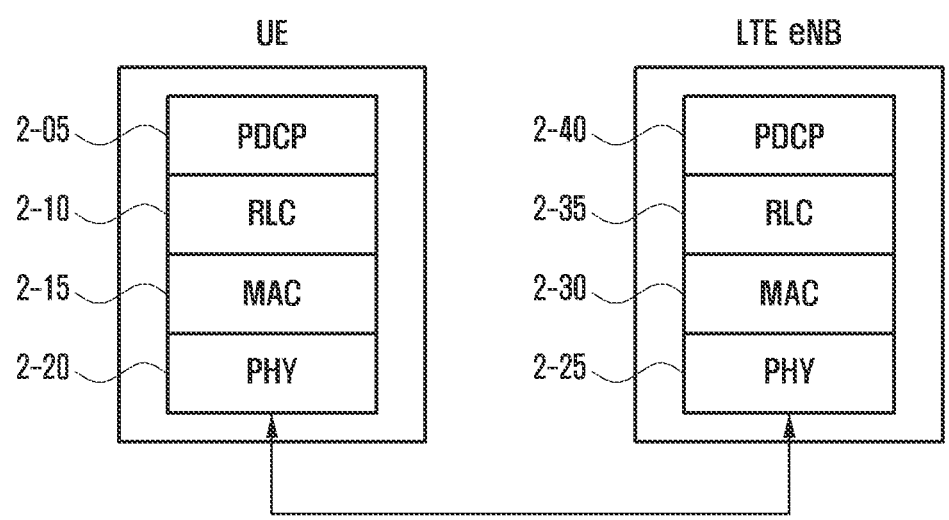
FIG. 2 is a diagram illustrating a radio protocol structure in the LTE system according to an embodiment of the disclosure.

FIG. 2 is a diagram illustrating a radio protocol structure in the LTE system according to an embodiment of the disclosure.

Referring to FIG. 2, a radio protocol of the LTE system includes packet data convergence protocols (PDCPs) 2-05 and 2-40, radio link controls (RLCs) 2-10 and 2-35, and medium access controls (MACs) 2-15 and 2-30, in a UE and an eNB, respectively. The packet data convergence protocols (PDCPs) 2-05 and 2-40 are in charge of operations, such as IP header compression/restoration, and the like. Main functions of the PDCPs are summarized as follows.

Header compression and decompression function (Robust Header Compression (ROHC) only)
    User data transmission function (transfer of user data)
    In-sequence delivery function (in-sequence delivery of upper layer protocol data units (PDUs) at PDCP re-establishment procedure for radio link controller (RLC) acknowledged mode (AM))
    Reordering function (for split bearers in DC (only support for RLC AM): PDCP PDU routing for transmission and PDCP PDU reordering for reception)
    Duplicate detection function (duplicate detection of lower layer service data units (SDUs) at PDCP re-establishment procedure for RLC AM)
    Retransmission function (retransmission of PDCP SDUs at handover and, for split bearers in DC, of PDCP PDUs at PDCP data-recovery procedure, for RLC AM)
    Encryption and decryption function (ciphering and deciphering)
    Timer-based SDU discard function (timer-based SDU discard in uplink)

Radio link controls (hereinafter, referred to as RLCs) 2-10 and 2-35 reconfigure a PDCP protocol data unit (PDU) or an RLC service data unit (SDU) to an appropriate size to perform automatic repeat request (ARQ) operation and the like. Main functions of the RLCs are summarized as follows.

Data transmission function (transfer of upper layer PDUs)
    ARQ function (error correction through ARQ (only for AM data transfer))
    Concatenation, segmentation, and reassembly function (concatenation, segmentation, and reassembly of RLC SDUs (only for unacknowledged mode (UM) and AM data transfer))
    Re-segmentation function (re-segmentation of RLC data PDUs (only for AM data transfer))
    Reordering function (reordering of RLC data PDUs (only for UM and AM data transfer))
    Duplicate detection function (duplicate detection (only for UM and AM data transfer))
    Error detection function (protocol error detection (only for AM data transfer))
    RLC SDU discard function (RLC SDU discard (only for UM and AM data transfer))
    RLC re-establishment function (RLC re-establishment)

MACs 2-15 and 2-30 are connected to multiple RLC layers configured in one UE, multiplex RLC PDUs to MAC PDUs, and demultiplex RLC PDUs from MAC PDUs. Main functions of the MACs are summarized as follows.

Mapping function (mapping between logical channels and transport channels)
    Multiplexing and demultiplexing function (multiplexing/demultiplexing of MAC SDUs belonging to one or different logical channels into/from transport blocks (TB) delivered to/from the physical layer on transport channels)
    Scheduling information reporting function (scheduling information reporting)
    Hybrid automatic repeat request (HARQ) function (error correction through HARQ)
    Function of priority handling between logical channels (priority handling between logical channels of one UE)
    Function of priority handling between UEs (priority handling between UEs by means of dynamic scheduling)
    Multimedia Broadcast Multicast Service (MBMS) service identification function (MBMS service identification)
    Transmission format selection function (transport format selection)
    Padding function (padding)

Physical layers 2-20 and 2-25 perform channel-coding and modulation of upper layer data, make the channel-coded and modulated upper layer data into OFDM symbols, and transmit the OFDM symbols via a radio channel, or the physical layers 2-20 and 2-25 perform demodulation and channel-decoding of the OFDM symbols received through the radio channel, and transfer the same to an upper layer.

Figure 3:
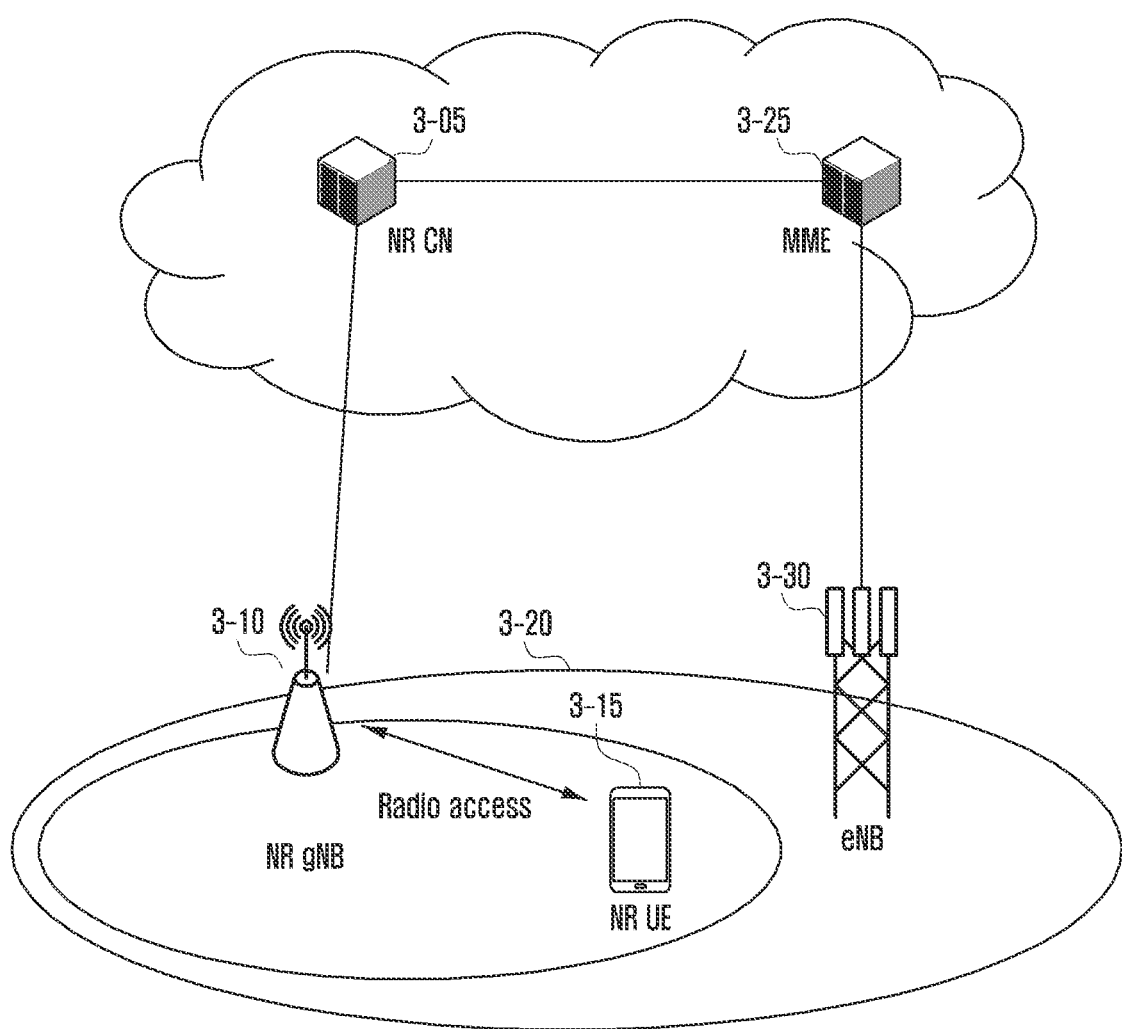
FIG. 3 is a diagram illustrating a structure of a next-generation mobile communication system according to an embodiment of the disclosure.

FIG. 3 is a diagram illustrating a structure of a next-generation mobile communication system according to an embodiment of the disclosure.

Referring to FIG. 3, as illustrated, a radio access network of the next generation mobile communication system (hereinafter, new radio (NR) or 5G) includes a next generation base station (new radio Node B, hereinafter, NR gNB or NR base station) 3-10 and a new radio core network (NR CN) 3-05. A user terminal (new radio user equipment, hereinafter, NR UE or terminal) 3-15 accesses an external network via the NR gNB 3-10 and the NR CN 3-05.

Referring to FIG. 3, the NR gNB 3-10 corresponds to an evolved node B (eNB) of an existing LTE system (e.g., eNB 3-30). The NR gNB 3-10 is connected to the NR UE 3-15 via a radio channel, and may provide a more superior service compared to an existing node B within cell 3-20. In the next generation mobile communication system, because all user traffic is serviced via a shared channel, a device, which collects state information, such as buffer states, available transmission power states, and channel states of the UEs, so as to perform scheduling, is required, and the NR gNB 3-10 takes on the role of the device. A single NR gNB 3-10 typically controls multiple cells. In order to implement ultra-high-speed data transmission compared to the current LTE, an existing maximum bandwidth or more may be available, and, by using orthogonal frequency division multiplexing (hereinafter, referred to as OFDM) as a radio access technology, beamforming may be additionally combined. An adaptive modulation & coding (hereinafter, referred to as AMC) method of determining a modulation scheme and a channel coding rate according to a channel state of a UE is applied. The NR CN 3-05 performs functions, such as mobility support, bearer configuration, and quality of service (QOS) configuration. The NR CN 3-05 is a device in charge of various control functions as well as a mobility management function for a UE, and is connected to multiple base stations. The next generation mobile communication system may be linked to an existing LTE system, and the NR CN 3-05 is connected to the MME 3-25 via a network interface. The MME 3-25 is connected to the eNB 3-30 that is an existing base station.

Figure 4:
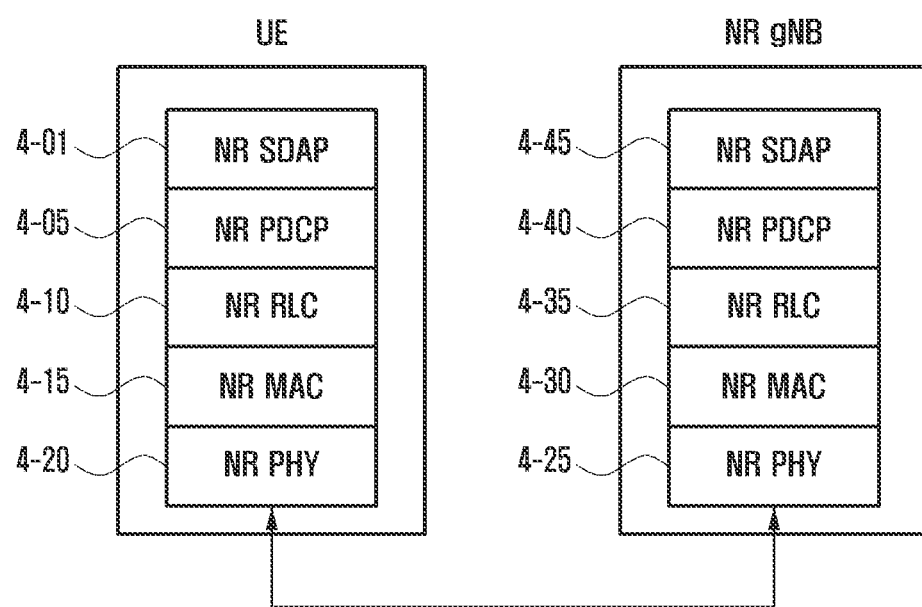
FIG. 4 is a diagram illustrating a radio protocol structure of the next-generation mobile communication system according to an embodiment of the disclosure.

FIG. 4 is a diagram illustrating a radio protocol structure of the next-generation mobile communication system according to an embodiment of the disclosure.

Referring to FIG. 4, a radio protocol of the next generation mobile communication system includes NR SDAPs 4-01 and 4-45, NR PDCPs 4-05 and 4-40, NR RLCs 4-10 and 4-35, and NR MACs 4-15 and 4-30 in a UE and an NR base station, respectively.

Main functions of the NR SDAPs 4-01 and 4-45 may include some of the following functions.

User data transfer function (transfer of user plane data)
    Function of mapping QoS flow and data bearer for uplink and downlink (mapping between a QoS flow and a data radio bearer (DRB) for both DL and UL)
    Function of marking QoS flow ID in uplink and downlink (marking QoS flow ID in both DL and UL packets)

Function of mapping reflective QoS flow to data bearer for uplink SDAP PDUs (reflective QoS flow to DRB mapping for the UL SDAP PDUs)

With respect to the SDAP layer, the UE may be configured, via an RRC message, whether to use a header of the SDAP layer or whether to use a function of the SDAP layer for each PDCP layer, for each bearer, or for each logical channel, and if the SDAP header is configured, the UE may be indicated to update or reconfigure mapping information for data bearers and QoS flows in uplink and downlink, by a non-access stratum (NAS) QoS reflection configuration 1-bit indicator (NAS reflective QoS) and an AS QoS reflection configuration 1-bit indicator (AS reflective QoS) in the SDAP header. The SDAP header may include QoS flow ID information indicating QoS. The QoS information may be used as a data processing priority, scheduling information, etc. to support a smooth service.

Main functions of the NR PDCPs 4-05 and 4-40 may include some of the following functions.

Header compression and decompression function (ROHC only)
User data transmission function (transfer of user data)
In-sequence delivery function (in-sequence delivery of upper layer PDUs)
Out-of-sequence delivery function (out-of-sequence delivery of upper layer PDUs)
Reordering function (PDCP PDU reordering for reception)
Duplicate detection function (duplicate detection of lower layer SDUs)
Retransmission function (retransmission of PDCP SDUs)
Encryption and decryption function (ciphering and deciphering)
Timer-based SDU discard function (timer-based SDU discard in uplink)

The reordering function of an NR PDCP device refers to a function of rearranging PDCP PDUs, which are received in a lower layer, in order based on PDCP sequence numbers (SN), where the reordering function may include a function of delivering data to an upper layer in the rearranged order or may include a function of directly delivering data without considering the order, may include a function of rearranging the order and recording lost PDCP PDUs, may include a function of reporting states of the lost PDCP PDUs to a transmission side, and may include a function of requesting to retransmit the lost PDCP PDUs.

Main functions of the NR RLCs 4-10 and 4-35 may include some of the following functions.

Data transmission function (transfer of upper layer PDUs)
In-sequence delivery function (in-sequence delivery of upper layer PDUs)
Out-of-sequence delivery function (out-of-sequence delivery of upper layer PDUs)
ARQ function (error correction through ARQ)
Concatenation, segmentation, and reassembly function (concatenation, segmentation, and reassembly of RLC SDUs)
Re-segmentation function (re-segmentation of RLC data PDUs)
Reordering function (reordering of RLC data PDUs)
Duplicate detection function (duplicate detection)
Error detection function (protocol error detection)
RLC SDU discard function (RLC SDU discard)
RLC re-establishment function (RLC re-establishment)

The in-sequence delivery function (in-sequence delivery) of an NR RLC device refers to a function of delivering RLC SDUs, which are received from a lower layer, to an upper layer in order, where the in-sequence delivery function may include a function of, when originally one RLC SDU is divided into multiple RLC SDUs and then received, reassembling the divided RLC SDUs and delivering the same, may include a function of rearranging the received RLC PDUs on the basis of RLC sequence numbers (SNs) or PDCP sequence numbers (SNs), may include a function of rearranging the order and recording lost RLC PDUs, may include a function of reporting states of the lost RLC PDUs to a transmission side, may include a function of requesting to retransmit the lost RLC PDUs, and may include a function of, when there is a lost RLC SDU, delivering only RLC SDUs before the lost RLC SDU to an upper layer in order. Alternatively, the in-sequence delivery function may include a function of, although there is a lost RLC SDU, if a predetermined timer has been expired, delivering all RLC SDUs received before starting of the timer to an upper layer in order, or may include a function of, although there is a lost RLC SDU, if a predetermined timer has been expired, delivering all RLC SDUs received up to the present time to an upper layer in order. The RLC PDUs may be processed in the order of reception thereof (in order of arrival regardless of the order of the sequence numbers or serial numbers) and may be delivered to a PDCP device regardless of the order (out-of-sequence delivery). In the case of segments, segments stored in a buffer or to be received at a later time may be received, reconfigured into one complete RLC PDU, processed, and then may be delivered to the PDCP device. The NR RLC layer may not include a concatenation function, and the function may be performed in an NR MAC layer or may be replaced with a multiplexing function of the NR MAC layer.

The out-of-sequence delivery function of the NR RLC device refers to a function of delivering RLC SDUs received from a lower layer to an immediate upper layer in any order, may include a function of, when originally one RLC SDU is divided into multiple RLC PDUs and then received, reassembling the divided RLC SDUs and delivering the same, and may include a function of storing RLC SNs or PDCP SNs of the received RLC PDUS, arranging the order thereof, and recording lost RLC PDUs.

The NR MACs 4-15 and 4-30 may be connected to multiple NR RLC layers configured for one UE, and main functions of the NR MACs may include some of the following functions.

Mapping function (mapping between logical channels and transport channels)
Multiplexing and demultiplexing function (multiplexing/demultiplexing of MAC SDUs)
Scheduling information reporting function (scheduling information reporting)
HARQ function (error correction through HARQ)
Function of priority handling between logical channels (priority handling between logical channels of one UE)
Function of priority handling between UEs (priority handling between UEs by means of dynamic scheduling)
MBMS service identification function (MBMS service identification)
Transmission format selection function (transport format selection)
Padding function (padding)

NR PHY layers 4-20 and 4-25 may perform channel-coding and modulation of upper layer data, make the channel-coded and modulated upper layer data into OFDM symbols, and transmit the OFDM symbols via a radio channel, or the NR PHY layers 4-20 and 4-25 may perform demodulation and channel-decoding of the OFDM symbols received through the radio channel, and transfer the same to the upper layer.

The next-generation mobile communication system may use a very high frequency band, and thus a frequency bandwidth may also be very wide. However, supporting all of very wide bandwidths in UE implementation requires high implementation complexity and incurs high cost. Therefore, in the next-generation mobile communication system, the concept of a bandwidth part (BWP) can be introduced, where a base station may configure multiple bandwidth parts for one cell (SPCell or SCell) configured for a UE, and the UE may transmit or receive data in one or multiple bandwidth parts.

In the disclosure, when a dormant bandwidth part (dormant BWP) proposed in the disclosure is introduced, a specific operation for state transition (shifting) or bandwidth part switching is proposed in consideration of a state of an SCell and multiple bandwidth parts configured for the SCell. The disclosure proposes each of bandwidth part state transition or bandwidth part switching by managing a dormant mode in a bandwidth part level, and proposes a specific bandwidth part operation according a state of each SCell or a state or mode (active, deactivated, or dormant) of each bandwidth part.

In the disclosure, multiple bandwidth parts are configured for one cell (SPCell, PCell, PSCell, or SCell) for each downlink or uplink, and operations may be performed by switching a bandwidth part to an active bandwidth part (active DL BWP or active UL BWP), a dormant bandwidth part (dormant BWP or dormant DL BWP), or an inactive bandwidth part (inactive DL BWP or inactive UL BWP) (or deactivated DL BWP or deactivated UL BWP). That is, for the one cell, a data transmission rate may be increased in a method similar to carrier aggregation, by shifting a downlink bandwidth part or an uplink bandwidth part to an active state (alternatively, by switching to an active bandwidth part). Further, by shifting the downlink bandwidth part to a dormant state (or switching to a dormant bandwidth part), the UE may not perform PDCCH monitoring for the cell, thereby saving battery power. In this case, the UE may perform channel measurement on the downlink bandwidth part and may report a channel measurement result, so that quick activation of a cell or bandwidth part may be supported later. The battery power of the UE may be saved by shifting the downlink (or uplink) bandwidth part to an inactive state in the one cell. State transition for each bandwidth part or bandwidth part switching for each cell may be configured and indicated via a radio resource control (RRC) message, a medium access control (MAC) control element (CE), or downlink control information (DCI) of PDCCH. The dormant bandwidth part may also be extended and applied to dual connectivity. For example, the dormant bandwidth part may be applied to a PSCell of a secondary cell group. As another method, the dormant bandwidth part is extended to the concept of cell group suspension or cell group deactivation, and cell group suspension or cell group deactivation is indicated to one cell group (e.g., secondary cell group) of a UE for which dual connectivity has been configured, so that the UE may reduce power consumption thereof by suspending data transmission or reception, suspending PDCCH monitoring, or intermittently performing PDCCH monitoring on the basis of a very long cycle in the indicated cell group. When the cell group suspension or deactivation is indicated to the UE, the UE may perform channel measurement in a cell group for which cell group suspension or deactivation has been indicated, and may report a channel measurement result to a network (e.g., to a master cell group or a secondary cell group), so as to support quick activation of dual connectivity. With respect to the cell group for which cell group suspension or deactivation has been indicated, the UE performs procedures as described above, and in this case, the UE may maintain and store cell group configuration information without discarding (or clearing) the same, and when a cell group activation or resumption indication is received from the network, the UE may restore the cell group configuration information. For example, the cell group configuration information (e.g., configuration information, bearer configuration information, or cell-specific configuration information of each of PDCP, RLC, or MAC layer) configured for the UE may be stored or maintained as it is. If the UE receives a cell group resumption or activation indication for the cell group for which cell group suspension or deactivation has been indicated, the UE may resume, restore, or reapply configuration information of the cell group (operating according to the cell group configuration information). In this case, a bearer may be resumed, data transmission or reception may be resumed, PDCCH monitoring may be resumed, channel measurement reporting may be performed, or a periodically configured transmission resource may be reactivated.

First channel measurement configuration information (e.g., configuration information for a channel state information reference signal (CSI-RS), a synchronization signal block (SSB), or a radio resource or reference signal (RS)) for quick activation of the cell group may be included in the cell group configuration information, previously configured cell group configuration information, or a message (e.g., RRC message or RRCReconfiguration message) indicating cell group activation or resumption, so as to be configured for the UE. As another method, a first channel measurement configuration information (e.g., configuration information for a channel state information reference signal (CSI-RS), a synchronization signal block (SSB), or a radio resource or reference signal (RS)) for quick activation of the cell group may be included in a message (e.g., RRC message or RRCReconfiguration message) indicating cell group deactivation, suspension, or releasing, so as to be configured for the UE in advance. The first channel measurement configuration information may include information for quick activation of the cell group. For example, cell (e.g., PCell, PSCell, or SCells) configuration information of the cell group may include configuration information so that the base station is able to transmit many channel measurement signals or transmit a channel measurement signal frequently to enable quick channel measurement in the cell, the configuration information may include a period for a frequent channel measurement signal (e.g., radio resources), transmission resource information for transmission (frequency or time transmission resource via which the frequent channel measurement signal is transmitted), an interval or frequency (the number of times the frequent channel measurement signal is transmitted), a timer value (time at which the frequent channel measurement signal is transmitted), a time interval (interval in which the frequent channel measurement signal is transmitted (e.g., time unit (slot, subframe, symbol, or the like)), or a transmission resource, cycle, interval, timing, or the like via which the UE should report a measurement result. The first channel measurement configuration information may allow not only simple configuration of a short reporting cycle (or transmission resource) in which the UE may report a channel measurement result, but also configuration of a transmission resource for channel measurement so that the base station is able to transmit many channel measurement signals (or transmission resources) or transmit a channel measurement signal (or transmission resources) frequently so as to support the UE to perform fast channel measurement or more signal measurements.

Second channel measurement configuration information (e.g., configuration information for a channel state information reference signal (CSI-RS), a synchronization signal block (SSB), or a radio resource or reference signal (RS)) for measuring a signal of the cell (PSCell, PCell, or SCell) of the cell group may be included in the cell group configuration information, previously configured cell group configuration information, or a message (e.g., RRC message or RRCReconfiguration message) indicating cell group activation or resumption. Alternatively, second channel measurement configuration information (e.g., configuration information for a channel state information reference signal (CSI-RS), a synchronization signal block (SSB), or a radio resource or reference signal (RS)) for measuring a signal of the cell (PSCell, PCell, or SCell) of the cell group may be included in advance in the cell group configuration information, previously configured cell group configuration information, or a message (e.g., RRC message or RRCReconfiguration message) indicating cell group deactivation, suspension, or releasing. The second channel measurement configuration information may include general channel measurement configuration information, such as a transmission resource, cycle, time interval, or frequency of the channel measurement signal, or a transmission resource, cycle, or time interval for channel measurement reporting.

In the disclosure, the UE may perform channel measurement by applying the first channel measurement configuration information or the second channel measurement configuration information according to the following conditions, and may report a measurement result to the base station.

1> If the UE has received a message (e.g., PDCCH indicator, MAC control information, or RRC message) indicating to activate (or resume) a cell (PCell, PSCell, or SCell) or a cell group, 2> If the first channel measurement configuration information is configured for the UE, 3> The UE determines that the base station is to transmit many channel measurement signals or transmit a channel measurement signal frequently according to the first channel measurement configuration information, and may temporarily (for example, up to a time interval (e.g., subframe, slot, or symbol) configured in the first channel measurement configuration information, during an appointed (or predetermined) time interval, for a specific time (e.g., while a timer is running), or until a first condition is satisfied) measure many channel measurement signals or measure a channel measurement signal frequently according to the first channel measurement configuration information. Also, the UE may report an obtained channel measurement result according to the cycle or transmission resource configured in the first channel measurement configuration information, up to a time interval (e.g., subframe, slot, or symbol) configured in the first channel measurement configuration information, during an appointed (or predetermined) time interval, for a specific time (e.g., while a timer is running), or until the first condition is satisfied. Therefore, as the UE is able to quickly measure the channel measurement signal frequently transmitted from the base station and quickly report the measurement result to the base station, the cell (PCell, SCell, or PSCell) or the cell group may be quickly activated (or resumed), or scheduling information may be quickly indicated. If second channel measurement configuration information is configured for the UE after the time interval (e.g., subframe, slot, or symbol) configured in the first channel measurement configuration information, after the appointed (or predetermined) time interval, after the specific time (e.g., when or after the timer expires), or after the first condition is satisfied, the UE may suspend or release application of the first channel measurement configuration information, and may measure the channel measurement signal according to the second channel measurement configuration information. For example, fallback may be performed from the first channel measurement configuration information to the second channel measurement information, or the second channel information may be applied instead of the first channel measurement configuration information. The obtained channel measurement result may be reported according to the cycle or transmission resource configured in the second channel measurement configuration information. If the second channel measurement configuration information is not configured, channel measurement may not be performed.

2> Otherwise (if the first channel measurement configuration information is not configured for the UE), 3> If the second channel measurement configuration information is configured for the UE, a channel measurement signal may be measured according to the second channel measurement configuration information. The obtained channel measurement result may be reported according to the period or transmission resource configured in the second channel measurement configuration information. If the second channel measurement configuration information is not configured, channel measurement may not be performed.

The first channel measurement configuration information of the disclosure may be extended, configured, and used in a case of activating or resuming a cell group (e.g., PSCell), activating an SCell, or resuming an RRC connection in an RRC inactive mode.

The first condition of the disclosure may be one of the following conditions. Hereinafter, the disclosure proposes conditions under which the base station is required to transmit neither an unnecessarily large amount of transmission resources nor unnecessarily frequent transmission resources when, under the first condition, a cell is activated, a cell group is activated or resumed, or the UE in an RRC inactive mode resumes a connection in RRC connection resumption. For example, channel measurement or channel measurement reporting may be performed by applying the first channel measurement configuration information until one of the following conditions is satisfied.

The UE may determine that the first condition is satisfied, when the UE successfully completes random access in the cell (e.g., PCell, SCell, or PSCell) or in a cell (e.g., PSCell or SCell) of the cell group, when random access is successfully completed and a first uplink transmission resource is allocated, or when an uplink transmission resource is indicated to the UE for the first time.

More specifically, for example, if the UE performs contention-free random access (CFRA) (for example, if a dedicated preamble or a UE cell identifier (e.g., C-RNTI) is assigned), it may be considered that random access is successfully completed when the UE transmits a dedicated preamble to the cell and receives a random access response (RAR) message or receives an indication of PDCCH for the random access response, and therefore the UE may determine that the first condition is satisfied. As another method, when an uplink transmission resource is received for the first time after RAR reception, the UE may determine that the first condition is satisfied.

If the UE performs contention-based random access (CBRA) (e.g., if neither a dedicated preamble nor a UE cell identifier (e.g., C-RNTI) is assigned), when the UE transmits a preamble (e.g., random preamble) to the cell, receives a random access response (RAR) message, transmits Message 3 (e.g., handover completion message) by using an uplink transmission resource allocated (or included or indicated) in the random access response message, and receives, from a target base station via Message 4, a MAC CE (contention resolution MAC CE) indicating that contention has been resolved, or when an uplink transmission resource is received via PDCCH corresponding to C-RNTI of the UE, it may be considered that random access to the target base station has been successfully completed, and the UE may thus determine that the first condition is satisfied. As another method, if the size of the uplink transmission resource allocated in the random access response message is sufficient so that the UE may transmit Message 3 (msg3) and may additionally transmit uplink data, the UE may determine that the uplink transmission resource is received for the first time and may determine that the first condition is satisfied. That is, when the RAR is received, the UE may determine that the uplink transmission resource is received for the first time, and may determine that the first condition is satisfied.

1> If the UE performs two-step random access (2-step random access) as configured or indicated,
1> or when the UE supports two-step random access in a UE capability even if two-step random access (2-step random access) is not configured or indicated in the message, and when two-step random access is supported in system information of the cell, and information (e.g., random access resource, threshold value for determination of whether to perform or not perform two-step random access, or the like) for two-step random access is broadcasted in system information, or when the UE receives the system information, and the UE performs two-step random access for the cell due to a signal strength that is sufficient or is greater than the threshold value broadcast in the system information,
2> when two-step random access is successfully completed, the UE may determine that the first condition is satisfied.
2> The two-step random access may be performed specifically by one of contention-based random access (CBRA) or contention-free random access (CFRA).
3> If the UE performs CBRA-based two-step random access,
4> the UE may transmit a preamble in a transmission resource (e.g., PRACH occasion, transmission resource configured by the base station via the RRC message, or transmission resource broadcast in the system information) for two-step random access, and may transmit data (e.g., MsgA MAC PDU) in a transmission resource (e.g., PUSCH occasion) for data transmission. The data may include MAC control information (C-RNTI MAC CE) including a UE identifier (C-RNTI) or an RRC message (RRCReconfiguration-Complete message or handover completion message).
4> The UE may monitor PDCCH scrambled with the UE identifier (C-RNTI) or with a first identifier (MsgB-RNTI) derived by a time or frequency at which the preamble is transmitted.
4> If the UE receives PDCCH scrambled with the UE identifier, receives an allocation of a downlink transmission resource via the PDCCH, or receives MAC control information (timing advance command MAC CE) for timing adjustment in the downlink transmission resource,
5> the UE may determine that the two-step random access has been successfully completed, and may determine that the first condition is satisfied.
4> If the UE receives PDCCH scrambled with the first identifier (MsgB-RNTI), if the UE receives an allocation of a downlink transmission resource via the PDCCH, or if a fallback random access response for the preamble transmitted by the UE is received in the downlink transmission resource, (that is, when the base station has received the preamble but has failed to receive MsgA, if a fallback RAR indicating to transmit MsgA via another transmission resource is received),
5> the UE may transmit data (MsgA MAC PDU) via the transmission resource indicated in the fallback random access response.
5> The UE may monitor PDCCH scrambled with the UE identifier (C-RNTI).
5> If the UE receives PDCCH scrambled with the UE identifier, or receives an allocation of an uplink transmission resource via the PDCCH, the UE may determine that the two-step random access has been successfully completed, and may determine that the first condition is satisfied.
3> If the UE performs CFRA-based two-step random access,
4> the UE may transmit a preamble in a transmission resource (e.g., PRACH occasion, or transmission resource designated by the base station via the RRC message) for two-step random access, and may transmit data (e.g., MsgA MAC PDU) in a transmission resource (e.g., PUSCH occasion) for data transmission. The data may include MAC control information (C-RNTI MAC CE) including a UE identifier (C-RNTI) or an RRC message (RRCReconfiguration-Complete message or handover completion message).
4> The UE may monitor PDCCH scrambled with the UE identifier (C-RNTI) or with the first identifier (MsgB-RNTI) derived by a time or frequency at which the preamble is transmitted.
4> If the UE receives PDCCH scrambled with the UE identifier, receives an allocation of a downlink transmission resource via the PDCCH, or receives MAC control information (timing advance command MAC CE) for timing adjustment in the downlink transmission resource,
5> the UE may determine that the two-step random access has been successfully completed, and may determine that the first condition is satisfied.
4> If the UE receives PDCCH scrambled with the first identifier (MsgB-RNTI), if the UE receives an allocation of a downlink transmission resource via the PDCCH, or if a fallback random access response for the preamble transmitted by the UE is received in the downlink transmission resource, (that is, when the base station has received the preamble but has failed to receive MsgA, if a fallback RAR indicating to transmit MsgA via another transmission resource is received), 5> the UE may determine that the two-step random access has been successfully completed, and may determine that the first condition is satisfied.

5> The UE may transmit data (MsgA MAC PDU) via the transmission resource indicated in the fallback random access response.

1> When random access is started or when a preamble for random access is transmitted, the UE may determine that the first condition is satisfied.

1> As another method, if two-step random access (2-step random access) is configured or indicated for the UE via the message, the UE may determine that the first condition is satisfied. For example, in the above case, before starting two-step random access, the UE may determine that the first condition is satisfied.

1> As another method, if two-step random access (2-step random access) is configured or indicated for the UE via the message, and a transmission resource (PUSCH) configured for data transmission in two-step random access is greater than a first threshold, or if a configuration value (timing advance value) for timing adjustment is included in the RRC message, the UE may determine that the first condition is satisfied. The first threshold value may be configured by the base station via the RRC message (e.g., RRCReconfiguration message), may be broadcast in the system information, or may be configured to the size of data that the UE has for transmission. For example, in the above case, before starting two-step random access, the UE may determine that the first condition is satisfied. As another method, if a configuration value (timing advance value) for timing adjustment is included in the RRC message, or if two-step random access is configured, the UE may transmit data directly from the configured transmission resource (e.g., transmission resource configured via the RRC message, or transmission resource indicated by PDCCH of the target base station, where the UE monitors the PDCCH) without transmitting a preamble. Therefore, in the above case, before starting two-step random access, when transmitting the data, or before transmitting the data, the UE may determine that the first condition is satisfied. As another method, if a configuration value (timing advance value) for timing adjustment is included in the RRC message, or if two-step random access is configured, the UE may transmit data directly via the configured transmission resource (PUSCH) (e.g., transmission resource configured via the RRC message, or transmission resource indicated by PDCCH of the target base station, where the UE monitors the PDCCH) without transmitting a preamble. In the above case, if the configured transmission resource (PUSCH) (e.g., transmission resource configured via the RRC message, or transmission resource indicated by PDCCH of the target base station, where the UE monitors the PDCCH) is greater than the first threshold value, or if the RRC message includes the configuration value (timing advance value) for timing adjustment, the UE may determine that the first condition is satisfied, before starting two-step random access, when transmitting the data, or before transmitting the data.

1> When the UE in the RRC inactive mode transmits an RRCResumeRequest message and then receives an RRCResume message (or RRCSetup message) in response thereto, the UE may determine that the first condition is satisfied.

1> Alternatively, up to time point n+X, when time point n+X is reached, or when time point n+X has passed, where n denotes a point in time, at which resumption or activation of the cell group is indicated via the RRC message, MAC control information, or DCI information of PDCCH (the time unit of n or X may be a time unit, such as a symbol unit, a subframe unit, a millisecond (ms) unit, or a slot unit, and the X may be configured in the RRC message, and may be a value predefined and appointed by another method), If the first condition is satisfied, an upper layer (upper entity) (e.g., RRC layer (RRC entity)) may perform indication using an indicator to a lower layer (lower entity) (e.g., PDCP layer (PDCP entity), RLC layer (RLC entity), MAC layer (MAC entity), or PHY layer (PHY entity)), or the lower layer (e.g., PDCP layer, RLC layer, MAC layer, or PHY layer) may perform indication to the upper layer (e.g., RRC layer).

In the disclosure, a bandwidth part (BWP) may be used regardless of distinction between an uplink and a downlink, and the bandwidth part may indicate each of an uplink bandwidth part and a downlink bandwidth part according to context.

In the disclosure, a link may be used regardless of distinction between an uplink and a downlink, and the link may indicate each of an uplink and a downlink according to context.

In the disclosure, a cell may indicate a PCell, an SCell (e.g., SCell configured in a master cell group (MCG)), a PSCell (e.g., PCell of a secondary cell group (SCG)), or an SCell (e.g., SCell configured in a secondary cell group (SCG)). In the disclosure, for an SCell or PSCell of the UE performing carrier aggregation or dual connectivity, a dormant bandwidth part (dormant BWP) may be configured (or introduced), and battery consumption may be thus reduced by preventing the UE from performing PDCCH monitoring in the dormant bandwidth part. The UE may perform channel measurement in the dormant bandwidth part, may report (e.g., channel state information (CSI) or channel quality information (CQI) measurement or reporting) a channel measurement result to the base station, and may perform beam measurement, beam tracking, or beam operation, so that, when data transmission is required, the UE may perform switching to a normal bandwidth part (normal BWP) or perform activation to the normal bandwidth part, so as to quickly start data transmission in the normal bandwidth part. The dormant bandwidth part may be neither configured for nor applied to an SPCell (PCell of MCG or PCell (or PSCell) of SCG) or an SCell for which PUCCH has been configured, where the SPCell needs to continuously monitor a signal, transmit or receive feedback, or check and maintain synchronization.

If the UE receives, via a PCell, an indication of switching to a dormant bandwidth part or activation to a dormant bandwidth part with respect to an SCell of a master cell group, the UE may perform channel measurement for the dormant bandwidth part of the SCell, and may report an obtained channel measurement result via a transmission resource of a PCell of the master cell group (MCG) (e.g., via a physical uplink control channel (PUCCH) transmission resource of the PCell) or via a transmission resource of the SCell (e.g., via a physical uplink control channel (PUCCH) transmission resource) for which PUCCH of the master cell group is configured. A transmission resource (e.g., PUCCH or PUSCH) of a cell, via which a channel measurement result for a certain cell or bandwidth part thereof is to be reported, may be configured for the UE via an RRC message for each cell or each bandwidth part.

If the UE receives, via the PSCell, an indication of switching to a dormant bandwidth part or activation to a dormant bandwidth part with respect to a SCell of a secondary cell group, the UE may perform channel measurement for the dormant bandwidth part of the SCell, and may report an obtained channel measurement result via a transmission resource of the PSCell of the secondary cell group (SCG) (e.g., via a physical uplink control channel (PUCCH) transmission resource of the PSCell) or via a transmission resource of the SCell (e.g., via a physical uplink control channel (PUCCH) transmission resource) for which PUCCH of the secondary cell group is configured. A transmission resource (e.g., PUCCH or PUSCH) of a cell, via which a channel measurement result for a certain cell or bandwidth part thereof is to be reported, may be configured for the UE via an RRC message for each cell or each bandwidth part.

If the UE receives, via the PCell, an indication of switching to a dormant bandwidth part or activation to a dormant bandwidth part with respect to the PSCell or SCell of the secondary cell group, or if the UE receives a cell group suspension (SCG suspension or cell group suspension) indication for the secondary cell group (SCG or PSCell), the UE may perform channel measurement for the bandwidth part (bandwidth part configured via the RRC message or last active bandwidth part) or the dormant bandwidth part of the PSCell or SCell, and may report an obtained channel measurement result via a transmission resource (e.g., via a physical uplink control channel (PUCCH) transmission resource of the PCell) of the PCell of the master cell group (MCG), via a transmission resource (e.g., via a physical uplink control channel (PUCCH) transmission resource) of the SCell for which PUCCH of the master cell group is configured, or via a transmission resource (e.g., via a physical uplink control channel (PUCCH) transmission resource of the PSCell) of the PSCell of the secondary cell group (SCG). A transmission resource (e.g., PUCCH or PUSCH) of a cell, via which a channel measurement result for a certain cell or bandwidth part thereof is to be reported, may be configured for the UE via an RRC message for each cell or each bandwidth part.

The disclosure proposes various embodiments of operations performed based on DCI of PDCCH, a MAC CE, or an RRC message in order to operate the dormant bandwidth part or cell group suspension state, proposed above, with respect to an SCell (SCell of a master cell group when carrier aggregation is configured, or SCell of a secondary cell group when dual connectivity is configured) or a PSCell (PCell of a secondary cell group when dual connectivity is configured) of the UE.

A network or a base station may configure an SPCell (PCell and PSCell) and multiple SCells for a UE. The SPCell may indicate a PCell when the UE communicates with one base station, and may indicate a PCell of a master base station or a PSCell of a secondary base station when the UE communicates with two base stations (master base station and secondary base station). The PCell or PSCell indicates a main cell used when the UE and the base station communicate in each MAC layer, and refers to a cell in which timing is performed for synchronization, random access is performed, HARQ ACK/NACK feedback is transmitted via a PUCCH transmission resource, and most control signals are exchanged. A technology, in which a base station operates multiple SCells with an SPCell so as to increase transmission resources and increase uplink or downlink data transmission resources, is referred to as carrier aggregation technique or dual connectivity.

When an SPCell and multiple SCells are configured via an RRC message, a state (or mode) may be configured for the UE via the RRC message, MAC CE, or DCI of PDCCH with respect to each cell (PCell, PSCell, or SCells), each SCell, a bandwidth part of each SCell, or a cell group. The state (or mode) of the cell may be configured to be one of an active mode (or activated state) or a deactivated mode (or deactivated state). A cell being in an active mode (or active state) may represent that, in a cell in the active mode or in an activated cell, the UE may exchange uplink or downlink data with the base station in an activated bandwidth part, an activated normal bandwidth part, or a bandwidth part other than an activated dormant bandwidth part of the cell, may perform PDCCH for checking an indication of the base station, may perform channel measurement for downlink of the cell (or activated bandwidth part, activated normal bandwidth part, or bandwidth part other than activated dormant bandwidth part of the cell) in the active mode or in the active state, may report measurement information periodically to the base station, and may transmit a pilot signal (sounding reference signal (SRS)) periodically to the base station so that the base station can perform uplink channel measurement. Alternatively, the UE may activate or switch the bandwidth part of the activated cell to the dormant bandwidth part according to an indication (e.g., PDCCH, MAC CE, or RRC message) of the base station. If the dormant bandwidth part is activated in the activated cell, the UE may report channel measurement and may report a channel measurement result without PDCCH monitoring in the cell.

As another method, if the cell, in which the dormant bandwidth part is activated, is the SCell, the UE may: not monitor PDCCH; not receive downlink data; perform channel measurement or measurement result reporting; suspend a configured periodic transmission resource (e.g., type 1 periodic transmission resource (configured uplink grant type 1)); clear or initialize a configured periodic transmission resource (e.g., type 2 periodic transmission resource (configured uplink grant type 2)); not transmit a sounding reference signal (SRS); not transmit uplink data; or not transmit PUCCH (e.g., scheduling request (SR) or preamble for random access). If the cell, in which the dormant bandwidth part is activated or cell group suspension is indicated, is the PSCell, the UE may: not monitor PDCCH; monitor PDCCH in a very long cycle; not receive downlink data; perform channel measurement or measurement result reporting; suspend the configured periodic transmission resource (e.g., type 1 periodic transmission resource (configured uplink grant type 1)); clear or initialize the configured periodic transmission resource (e.g., type 2 periodic transmission resource (configured uplink grant type 2)); transmit a sounding reference signal (SRS); not transmit uplink data; transmit PUCCH (e.g., scheduling request (SR) or preamble for random access); or perform random access.

If the cell, in which activation is performed to the bandwidth part other than the dormant bandwidth part, is the SCell, the UE may: monitor PDCCH; receive downlink data; perform channel measurement or measurement result reporting; resume the configured periodic transmission resource (e.g., type 1 periodic transmission resource (configured uplink grant type 1)); configure or activate the configured periodic transmission resource (e.g., type 2 periodic transmission resource (configured uplink grant type 2)); transmit a sounding reference signal (SRS); transmit uplink data; transmit PUCCH (e.g., scheduling request (SR) or preamble for random access); or perform random access.

If the cell, in which activation is performed to the bandwidth part other than the dormant bandwidth part or cell group resumption (SCG resumption) is indicated, is the PSCell, the UE may: monitor PDCCH; receive downlink data; perform channel measurement or measurement result reporting; resume the configured periodic transmission resource (e.g., type 1 periodic transmission resource (configured uplink grant type 1)); configure or activate the configured periodic transmission resource (e.g., type 2 periodic transmission resource (configured uplink grant type 2)); transmit a sounding reference signal (SRS); transmit uplink data; transmit PUCCH (e.g., scheduling request (SR) or preamble for random access); or perform random access.

The deactivated mode or deactivated state of the cell is a state in which bandwidth parts configured for the cell are inactive, the configured bandwidth parts are not active, or the configured bandwidth parts have no activated bandwidth part, so that the deactivated mode or deactivated state of the cell may represent that the UE cannot exchange data with the base station, does not perform PDCCH monitoring to check an indication of the base station, performs neither channel measurement nor measurement reporting, or transmits no pilot signal.

Therefore, in order to activate cells in a deactivated mode, the base station first configures frequency measurement configuration information for the UE via an RRC message, and the UE performs cell or frequency measurement on the basis of the frequency measurement configuration information. The base station may receive a cell or frequency measurement report of the UE, and then may activate the deactivated cells on the basis of the frequency/channel measurement information. Accordingly, a lot of latency occurs for the base station to activate carrier aggregation or dual connectivity for the UE and start data transmission or reception.

The disclosure proposes a dormant bandwidth part (dormant BWP) or a dormant state for a bandwidth part of each activated cell (e.g., activated Scell or activated PSCell) so as to save a battery power of the UE and quickly start data transmission or reception. Alternatively, the disclosure proposes configuration (or introduction) of a dormant bandwidth part (dormant BWP) for each activated cell. Alternatively, the disclosure proposes configuration (or introduction) of an active state, a dormant state, a suspended state, a deactivated state, or a resumed state of a cell group state for each cell group when dual connectivity is configured for the UE, and proposes a method of performing an indication of cell group resumption (or SCG resumption) or cell group suspension (or SCG suspension), which indicates state transition of the cell group, and UE operations according thereto.

In the dormant bandwidth part (dormant BWP in activated SCell) or the bandwidth part in the dormant mode of the activated cell, or when the dormant bandwidth part is activated, the UE cannot exchange data with the base station, does not perform PDCCH monitoring to check an indication of the base station, or does not transmit a pilot signal, but the UE performs channel measurement and reports a measurement result for a measured frequency/cell/channel periodically or when an event occurs, according to a configuration by the base station. Therefore, since the UE neither monitors PDCCH nor transmits a pilot signal in the dormant bandwidth part (dormant BWP) of the activated cell, the UE can save a battery power compared to a normal bandwidth part (or bandwidth part other than the dormant bandwidth part) of the activated cell or compared to when the normal bandwidth part (or bandwidth part other than the dormant bandwidth part) of the activated cell is activated, and since the UE performs channel measurement reporting unlike when the cell is deactivated, the base station may quickly activate the normal bandwidth part of the activated cell on the basis of a measurement report or on the basis of a measurement report of the dormant bandwidth part of the activated cell, and may allow carrier aggregation to be used quickly, so as to reduce transmission latency.

Therefore, in the disclosure, the cell being in the active mode or active state may represent that, in the cell in the active mode or in the activated cell, the UE may exchange uplink or downlink data with the base station in an activated bandwidth part, an activated normal bandwidth part, or a bandwidth part other than an activated dormant bandwidth part of the cell, may perform PDCCH monitoring to check an indication of the base station, may perform channel measurement for downlink of the cell (or activated bandwidth part, activated normal bandwidth part, or activated bandwidth part other than the dormant bandwidth part of the cell) in the active mode or in the active state, may report measurement information periodically to the base station, and may transmit a pilot signal (sounding reference signal (SRS)) periodically to the base station so that the base station can perform uplink channel measurement. In the disclosure, the cell being in the active mode or active state may represent that, in the cell in the active mode or in the activated cell, the UE, in the dormant bandwidth part of the activated cell, cannot exchange uplink or downlink data with the base station or does not perform PDDCH monitoring to check an indication of the base station, but may perform channel measurement for downlink of the activated dormant bandwidth part of the cell in the active mode or active state, and may report measurement periodically to the base station.

If the cell, in which the dormant bandwidth part is activated or cell group suspension is indicated, is the PSCell, the UE may: not monitor PDCCH; monitor PDCCH in a very long cycle; not receive downlink data; perform channel measurement or measurement result reporting; suspend the configured periodic transmission resource (e.g., type 1 periodic transmission resource (configured uplink grant type 1)); clear or initialize the configured periodic transmission resource (e.g., type 2 periodic transmission resource (configured uplink grant type 2)); transmit a sounding reference signal (SRS); not transmit uplink data; transmit PUCCH (e.g., scheduling request (SR) or preamble for random access); or perform random access.

In the disclosure, a dormant bandwidth part may indicate a state of a bandwidth part or may be used as a name of a logical concept indicating a specific bandwidth part. Therefore, the dormant bandwidth part may be activated, deactivated, or switched. For example, an indication of switching an activated second bandwidth part to a dormant bandwidth part in a first cell, an indication of shifting the first cell to a dormant state or a dormant mode, or an indication of activating the dormant bandwidth part of the first cell may be interpreted in the same way.

In the disclosure, a normal bandwidth part may indicate bandwidth parts other than a dormant bandwidth part from among bandwidth parts configured for each cell of the UE via an RRC message. In the normal bandwidth part, the UE may exchange uplink or downlink data with the base station, may monitor PDCCH to check an indication of the base station, may perform channel measurement for a downlink, may periodically report measurement information to the base station, and may periodically transmit a pilot signal (sounding reference signal, SRS) to the base station so as to enable the base station to perform uplink channel measurement. The normal bandwidth part may indicate a first active bandwidth part, a default bandwidth part, a first active bandwidth part activated from dormancy, or an initial bandwidth part.

Only one dormant bandwidth part may be configured from among bandwidth parts configured for each cell of the UE, and the dormant bandwidth part may be configured for downlink. As another method, one dormant bandwidth part may be configured for uplink or downlink from among bandwidth parts configured for each cell of the UE.

In the disclosure, a state of a cell group may be configured to be activated, suspended, or deactivated. The state of the cell group may be indicated by a bitmap or an indicator of DCI of PDCCH, may be indicated via MAC control information, or may indicated by an indicator of an RRC message. When the state of the cell group is indicated to be active, configuration information of the cell group configured or indicated via an RRC message (e.g., RRCReconfiguration message, RRCSetup message, or RRCResume message) may be stored and applied to the UE, or may be restored or resumed, and the UE may: perform PDCCH monitoring according to the configuration via the RRC message in the PCell, PSCell, or configured SCell of the cell group; receive downlink data; perform channel measurement or measurement result reporting; resume the configured periodic transmission resource (e.g., type 1 periodic transmission resource (configured uplink grant type 1)); configure or activate the configured periodic transmission resource (e.g., type 2 periodic transmission resource (configured uplink grant type 2)); transmit a sounding reference signal (SRS); transmit uplink data; transmit PUCCH (e.g., scheduling request (SR) or preamble for random access); or perform random access.

When the state of the cell group is indicated to be suspended (suspended state) or deactivated, configuration information of the cell group configured or indicated via the RRC message (e.g., RRCReconfiguration message, RRCSetup message, or RRCResume message) may be stored in the UE, or the configuration information may be not discarded but application thereof to the UE may be suspended, and the UE may: not perform PDCCH monitoring according to the configuration via the RRC message in the PCell, PSCell, or configured SCell of the cell group; perform PDCCH monitoring in a very long cycle; not receive downlink data; perform channel measurement or measurement result reporting; suspend the configured periodic transmission resource (e.g., type 1 periodic transmission resource (configured uplink grant type 1)); clear or initialize the configured periodic transmission resource (e.g., type 2 periodic transmission resource (configured uplink grant type 2)); transmit a sounding reference signal (SRS); not transmit uplink data; transmit PUCCH (e.g., scheduling request (SR) or preamble for random access); or perform random access.

When the state of the cell group is indicated to be deactivated, or release of cell group configuration information is indicated, the UE may clear or discard the configuration information of the cell group configured or indicated via the RRC message (e.g., RRCReconfiguration message, RRCSetup message, or RRCResume message).

Figure 5:
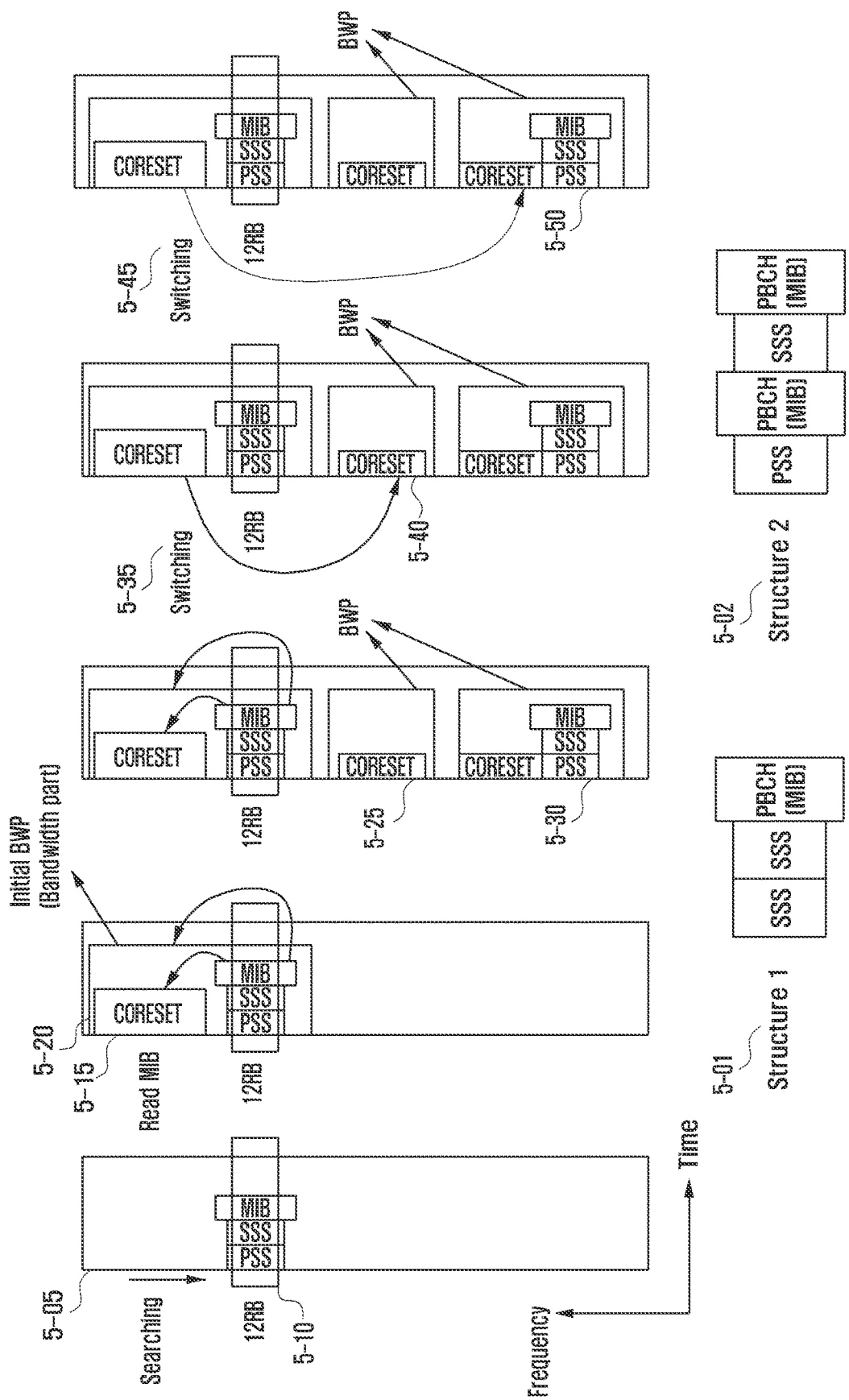
FIG. 5 is a diagram illustrating a procedure for providing a service to a UE by efficiently using a wide frequency bandwidth in the next-generation mobile communication system according to an embodiment of the disclosure.

FIG. 5 is a diagram illustrating a procedure for providing a service to a UE by efficiently using a wide frequency bandwidth in the next-generation mobile communication system according to an embodiment of the disclosure.

Referring to FIG. 5, it describes a method of providing services to UEs having multiple different capabilities (or categories) and enabling battery saving by the next-generation mobile communication system by efficiently using a very wide frequency bandwidth.

One cell in which a base station provides a service may service a very wide frequency band, as shown in 5-05. However, in order to provide services to UEs having different capabilities, one cell, in which the wide frequency band is divided into multiple bandwidth parts, may be managed.

First, a UE initially powered on may search the entire frequency band provided by a service provider (PLMN) in a unit of certain resource blocks (e.g., in a unit of 12 resource blocks (RBs)). That is, the UE may start searching for a primary synchronization sequence (PSS)/secondary synchronization sequence (SSS) in the entire system bandwidth in a unit of the resource blocks, 5-10. If the UE detects the PSS/SSS 5-01 or 5-02 while searching for the signals in the unit of resource blocks, the UE may read and interpret (decode) the signals, and may identify a boundary between a subframe and a radio transmission resource frame (radio frame). Accordingly, the UE may distinguish subframes in a unit of 1 ms, and may synchronize a downlink signal with the base station. A resource block (RB) corresponds to the size of a predetermined frequency resource and predetermined time resource, and may be defined to be a two-dimensional unit. For example, a unit of 1 ms may be defined for a time resource, and a unit of 12 subcarriers (1 carrier×15 kHz=180 kHz) may be defined for a frequency resource. When the UE completes synchronization, the UE may identify a master system information block (MIB) or minimum system information (MSI) to identify control resource set (CORESEST) information, and may identify initial access bandwidth part (initial BWP), 5-15 and 5-20. The CORESEST information refers to a location of a time/frequency transmission resource, via which a control signal is transmitted from the base station, and indicates, for example, a location of a resource via which PDCCH is transmitted. That is, the Control Resource Set (CORESET) information is information indicating from where first system information (system information block 1, SIB1) is transmitted, and indicates a frequency/time resource via which PDCCH is transmitted. The UE may check information on an initial bandwidth part (initial BWP) when reading the first system information. As described above, when the UE completes synchronization of the downlink signal with the base station and is able to receive a control signal, the UE may perform random access in an initial bandwidth part (initial BWP) of a cell on which the UE camps, may request an RRC connection configuration, and may receive an RRC message so as to perform RRC connection configuration.

In the RRC connection configuration, multiple bandwidth parts may be configured for one cell (PCell, PSCell, SPCell, or SCell). Multiple bandwidth parts may be configured for downlink within one cell, and regardless thereof, multiple bandwidth parts may be separately configured for uplink.

The multiple bandwidth parts may be indicated and configured by a bandwidth part identifier (BWP identifier) so as to be used as an initial bandwidth part (initial BWP), a default bandwidth part (default BWP), a first active bandwidth part (first active BWP), a dormant bandwidth part (dormant BWP), or a first active bandwidth part activated from dormancy (first active BWP from dormant).

The initial bandwidth part (initial BWP) may be used as a bandwidth part determined at a cell level (cell-specific) existing one for each cell, and may be used as a bandwidth part in which a UE accessing the cell for the first time may configure a connection to the cell via random access, or a UE having configured a connection may perform synchronization. The base station may configure, for each cell, each of an initial downlink bandwidth part (initial downlink BWP) to be used in downlink and an initial uplink bandwidth part (initial uplink BWP) to be used in uplink. Configuration information for the initial bandwidth part may be broadcast in the first system information (system information 1, SIB1) indicated by CORESET, and may be reconfigured for a connected UE by the base station via an RRC message. The initial bandwidth part may be designated with a bandwidth part identifier of 0 so as to be used in each of uplink and downlink. That is, all UEs accessing the same cell may use the same initial bandwidth part by designating the same bandwidth part identifier of 0. This is because, when random access is performed, the base station may transmit a random access response (RAR) message via the initial bandwidth part, which enables all UEs to read the RAR message, so that there may be an advantage in facilitating contention-based random access.

The first active bandwidth part (first active BWP) may be configured to be different for each UE (UE-specific), and may be designated and indicated by a bandwidth part identifier from among multiple bandwidth parts. The first active bandwidth part may be configured for each of downlink and uplink, and may be configured, by a bandwidth part identifier, as each of a first active downlink bandwidth part (first active downlink BWP) and a first active uplink bandwidth part (first active uplink BWP). The first active bandwidth part may be used for the purpose of indicating a bandwidth part which is to be initially activated and used, when multiple bandwidth parts are configured in one cell. For example, when a PCell or a PSCell and multiple SCells are configured for a UE, and multiple bandwidth parts are configured for each of the PCell, PSCell, or SCells, if the PCell, PSCell, or SCells are activated, the UE may activate and use a first active bandwidth part (first active BWP) among the multiple bandwidth parts configured for the PCell, PSCell, or SCells. That is, the first active downlink bandwidth part (first active downlink BWP) 5-25 may be activated and used for downlink, and the first active uplink bandwidth part (first active uplink BWP) 5-30 may be activated and used for uplink.

An operation 5-35 in which the UE switches the current or activated downlink bandwidth part of the cell so as to activate the first active downlink bandwidth part (or bandwidth part configured or indicated via an RRC message) 5-40, or an operation 5-45 in which the UE switches the current or activated uplink bandwidth part so as to activate the first active uplink bandwidth part (or bandwidth part configured or indicated via an RRC message) 5-50, may be performed when the UE receives an indication of activating the cell or the bandwidth part, which has been deactivated, via an RRC message, MAC control information, or DCI. An operation may be also performed when an indication of shifting the cell or the bandwidth part to a dormant state or an indication of activation to a dormant bandwidth part is received via an RRC message, MAC control information, or DCI. It is because, when the cell or the bandwidth part is activated, the current or activated downlink bandwidth part is switched 5-35 to activate the first active downlink bandwidth part (or bandwidth part configured or indicated by an RRC message) 5-40, or the uplink bandwidth part is switched 5-45 to activate the first active uplink bandwidth part (or bandwidth part configured or indicated by an RRC message) 5-50, and therefore the base station can efficiently use carrier aggregation only if a frequency/channel should be measured and reported for the first active downlink/ uplink bandwidth part even when channel measurement reporting is performed in a dormant state. The default bandwidth part (default BWP) may be configured to be different for each UE (UE-specific), and may be designated and indicated by a bandwidth part identifier from among multiple bandwidth parts. The default bandwidth part may be configured only for downlink. The default bandwidth part may be used as a bandwidth part, to which an activated bandwidth part among multiple downlink bandwidth parts falls back after a certain time. For example, a bandwidth part inactivity timer (BWP inactivity timer) may be configured for each cell or each bandwidth part via an RRC message, and the timer may start or restart when data transmission or reception occurs in an active bandwidth part other than the default bandwidth part, or the timer may start or restart when the activated bandwidth part is switched to another bandwidth part. When the timer expires, the UE may cause the downlink bandwidth part activated for the cell to fall back or switch to the default bandwidth part. The switching may refer to deactivating a currently activated bandwidth part and activating a bandwidth part indicated for switching, and the switching may be triggered by an RRC message, MAC control information (MAC control element), or L1 signaling (downlink control information (DCI) of PDCCH). The switching may be triggered by indicating a bandwidth part to be switched or to be activated, and the bandwidth part may be indicated by a bandwidth part indicator (e.g., 0, 1, 2, 3, or 4).

The default bandwidth part is applied and used only for downlink because the base station may cause the UE to fall back to the default bandwidth part for each cell after a certain time to receive an indication (e.g., DCI of PDCCH) from the base station, thereby facilitating base station scheduling. For example, if the base station configures, as initial bandwidth parts, default bandwidth parts of UEs accessing one cell, the base station may continuously indicate scheduling only for the initial bandwidth parts after a certain time. If the default bandwidth parts are not configured in an RRC message, initial bandwidth parts may be considered as the default bandwidth parts, and fallback may be performed to the initial bandwidth parts when a bandwidth part inactivity timer expires.

As another method, in order to enhance the freedom of implementation of the base station, a default bandwidth part may be also defined and configured for uplink and may be used as a default bandwidth part of downlink.

The dormant bandwidth part (dormant BWP) refers to a bandwidth part in a dormant mode or a dormant bandwidth part (dormant BWP in activated SCell) in an activated cell, or when the dormant bandwidth part is activated, the UE cannot exchange data with the base station, does not perform PDCCH monitoring to check an indication of the base station, or does not transmit a pilot signal, but the UE performs channel measurement and reports a measurement result for a measured frequency/cell/channel periodically or when an event occurs, according to a configuration by the base station. Therefore, since the UE neither monitors PDCCH nor transmits a pilot signal in the dormant bandwidth part (BWP) of the activated cell, the UE can save a battery power compared to a normal bandwidth part (or bandwidth part other than the dormant bandwidth part) of the activated cell or compared to when the normal bandwidth part (or bandwidth part other than the dormant bandwidth part) of the activated cell is activated, and since the UE performs channel measurement reporting unlike when the cell is deactivated, the base station may quickly activate the normal bandwidth part of the activated cell on the basis of a measurement report or on the basis of a measurement report of the dormant bandwidth part of the activated cell, and may allow carrier aggregation to be used quickly, so as to reduce transmission latency.

For a first active bandwidth part (or first active non-dormant bandwidth part, or bandwidth part configured or indicated via an RRC message) that is activated by switching from a dormant state or a dormant bandwidth part, when the UE is operating, as a dormant bandwidth part, a bandwidth part of one activated cell, when an activated bandwidth part is a dormant bandwidth part in the activated cell, or when a bandwidth part other than a dormant bandwidth part is switched to a dormant bandwidth part in the cell, if the base station indicates, via DCI of PDCCH, a MAC CE, or an RRC message, the UE to switch the dormant bandwidth part, which is the bandwidth part of the activated cell, to a normal bandwidth part (or bandwidth part other than the dormant bandwidth part), indicates the UE to switch (or change) the active bandwidth part in the dormant bandwidth part to the normal bandwidth part, or indicates the UE to switch (or change) or activate the active bandwidth part in the dormant bandwidth part to a normal bandwidth part (e.g., first active bandwidth part activated from dormancy), the first active bandwidth part may be a bandwidth part, which should be activated by switching the current or activated bandwidth part of the activated cell by the UE according to the indication, or a bandwidth part which should be activated from the dormant state configured via the RRC message.

Figure 6:
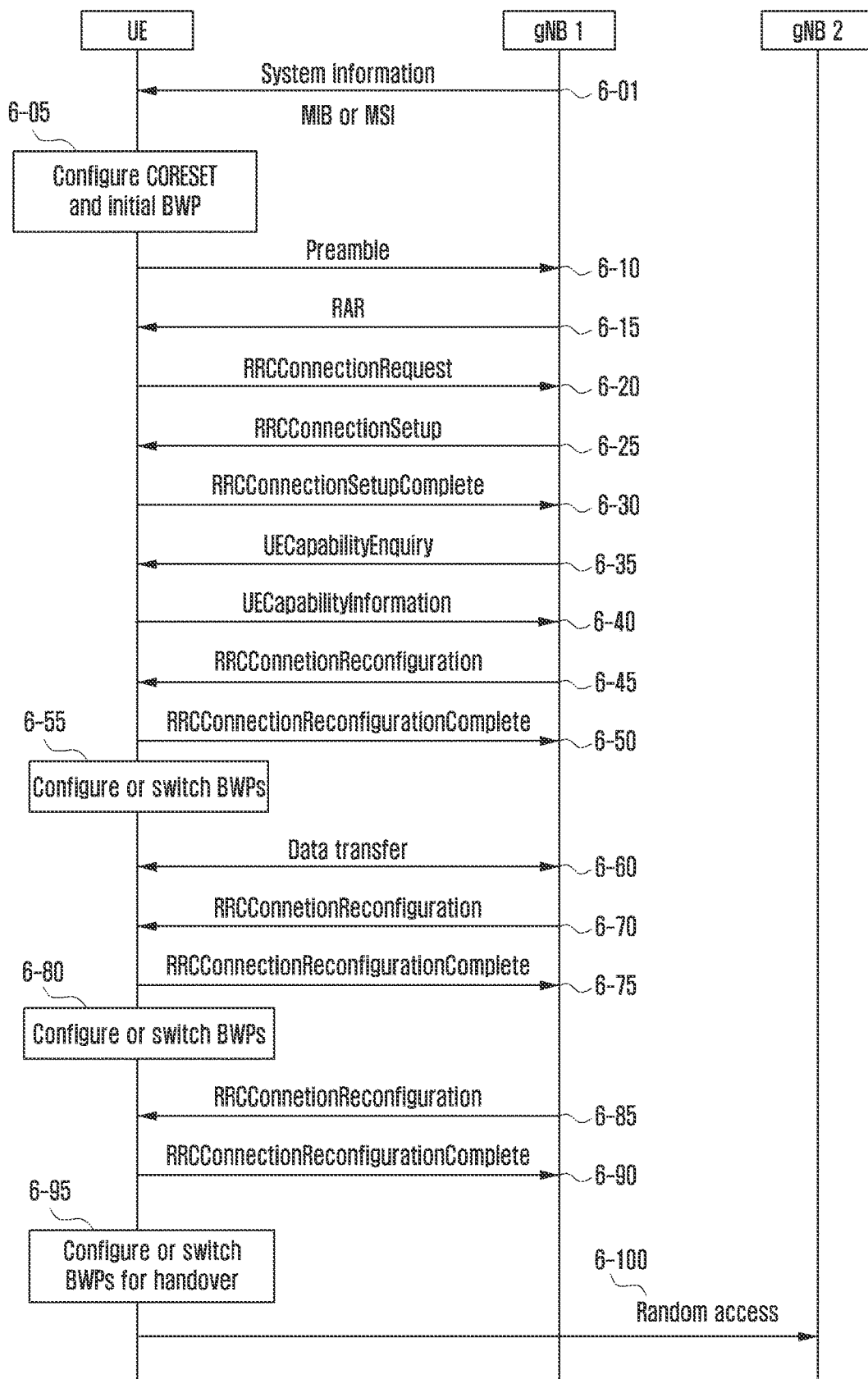
FIG. 6 is a diagram illustrating a procedure for a user equipment (UE) to switch from an RRC idle mode to an RRC connected mode, and a method of configuring multiple bandwidth parts (BWPs) and configuring a default bandwidth part (default BWP) or a first active bandwidth part (first active BWP), in the next-generation mobile communication system according to an embodiment of the disclosure.

FIG. 6 is a diagram illustrating a procedure for a UE to switch from an RRC idle mode to an RRC connected mode, and a method of configuring multiple bandwidth parts (BWPs) and configuring a default bandwidth (default BWP) or a first active bandwidth (first active BWP), in the next-generation mobile communication system according to an embodiment of the disclosure.

Referring to FIG. 6, one cell in which a base station provides a service may service a very wide frequency band. First, a UE may search the entire frequency band provided by a service provider (PLMN) in a unit of certain resource blocks (e.g., in a unit of 12 resource blocks (RBs)). That is, the UE may start searching for a primary synchronization sequence (PSS)/secondary synchronization sequence (SSS) in the entire system bandwidth in a unit of the resource blocks. If the UE detects the PSS/SSS while searching for the signals in a unit of the resource blocks, the UE may read and interpret (decode) the signals, and may identify a boundary between a subframe and a radio transmission resource frame (radio frame). When the UE completes synchronization, the UE may read system information of a cell on which the UE currently camps 6-01. That is, information of a control resource set (CORESET) may be identified by identifying a master system information block (MIB) or minimum system information (MSI), and initial bandwidth part (initial BWP) information may be identified by reading system information, in 6-05. The CORESEST information refers to a location of a time/frequency transmission resource, via which a control signal is transmitted from the base station, and may indicate, for example, a location of a resource via which PDCCH is transmitted.

As described above, if the UE completes synchronization of a downlink signal with the base station and may receive a control signal, the UE, in an initial bandwidth part, may perform random access (e.g., the UE transmits a random access preamble) in 6-10, may receive a random access response in 6-15, may request an RRC connection configuration in 6-20, may receive an RRC message 6-25, and may transmit a message to the base station indicating that the RRC Connection set up is complete in 6-30 so as to configure an RRC connection.

If basic RRC connection configuration is completed, the base station may transmit, to the UE, an RRC message (UECapabilityEnquiry, 6-35) to inquire about the capability of the UE, so as to identify the capability of the UE (UE capability). As another method, the base station may inquire about the capability of the UE to an MME or an AMF so as to identify the capability of the UE. This is because the MME or the AMF may have stored capability information of the UE if the UE had been previously connected. If there is no UE capability information desired by the base station, the base station may request UE capability from the UE. When the UE reports the UE capability, the UE may report the following information as the UE capability to the base station, where the information includes whether the UE supports a dormant bandwidth part for an SCell of each cell group (master cell group or secondary cell group), whether the UE supports the first, second, third, or fourth embodiment, whether the UE supports a dormant bandwidth part for a PSCell of each cell group, whether the UE supports cell group suspension or resumption for the PSCell of each cell group, the number of supporting cell groups, or the like. The UE may also report the following information as the UE capability to the base station, where the information includes whether it is possible, in RRC connection resumption, to save and restore, discard, partially reconfigure, or activate configuration information of an SCell of a master cell group, an SCell of a secondary cell group, or a PSCell of a secondary cell group via an RRCResume message.

The base station transmits an RRC message to the UE to identify the capability of the UE, and the capability of the UE may be thus identified, for example, a frequency band which the UE is capable of read, or a readable frequency band area may be determined. After the capability of the UE is identified, an appropriate bandwidth part (BWP) may be configured for the UE. When the UE receives an RRC message inquiring about the capability of the UE, in response to the reception of the RRC message, the UE may indicate, using an offset from a reference center frequency, a range of a bandwidth supported by the UE, a range of a bandwidth supported by a current system bandwidth, or the like, may directly indicate a start point and an end point of a supported frequency bandwidth, or may indicate the start and end points by using a center frequency and a bandwidth, in 6-40.

A bandwidth part may be configured via an RRCSetup message (or RRCConnectionSetup message) 6-25, an RRCResume message, or an RRCReconfiguration message 6-45 and 6-70 of RRC connection configuration, and the RRC message may include configuration information for a PCell, a PSCell, or multiple SCells, and may configure multiple bandwidth parts for each of the cells (PCell, PSCell, or SCells). When multiple bandwidth parts are configured for each of the cells, multiple bandwidth parts to be used in downlink of each of the cells may be configured. In a case of an FDD system, multiple bandwidth parts to be used in uplink of each cell may be configured separately from the downlink bandwidth parts. In a case of a TDD system, multiple bandwidth parts to be commonly used in downlink and uplink of each of the cells may be configured.

Information for configuring bandwidth parts of each of the cells (PCell, PSCell, or SCells) may include some of the following information.

Downlink bandwidth part configuration information of the cell

Initial downlink bandwidth part (initial downlink BWP) configuration information Multiple pieces of bandwidth part configuration information, and bandwidth part identifier (BWP ID) corresponding to each bandwidth part Initial state configuration information of the cell or downlink bandwidth part (e.g., active state, dormant state, or deactivated state)

Bandwidth part identifier indicating a first active downlink bandwidth part (first active downlink BWP)

Bandwidth part identifier indicating a default bandwidth part (default BWP)

Configuration information for PDCCH monitoring for each bandwidth part. For example, CORESET information, search space resource information, PDCCH transmission resource, cycle, subframe number information, or the like Bandwidth part identifier indicating a dormant bandwidth part Bandwidth part identifier indicating a first active bandwidth part activated from dormancy Bandwidth part inactivity timer configuration and timer value Uplink bandwidth part configuration information of the cell Initial uplink bandwidth part (initial uplink BWP) configuration information Multiple pieces of bandwidth part configuration information, and a bandwidth part identifier (BWP ID) corresponding to each bandwidth part Initial state configuration information of the cell or uplink bandwidth part (e.g., active state, dormant state, or deactivated state)

Bandwidth part identifier indicating a first active uplink bandwidth part (first active uplink BWP)

Configuration information relating to a transmission resource via which channel measurement is performed in a dormant bandwidth part or in a bandwidth part other than the dormant bandwidth part, and a measurement result is reported (e.g., PUCCH transmission resource information of a PCell, a PUCCH SCell, or a PSCell).

The UE may transmit an RRCConnectionReconfigurationComplete message 6-50, 6-75, and 6-90 after receiving an RRCConnectionReconfiguration message in 6-45, 6-70, and 6-85, respectively. The UE may configure or switch BWPs in 6-55 or 6-80 and the UE may configure or switch BWPs for handover in 6-95. After the UE configures or switches BWPs for handover in 6-95, the UE may perform random access in 6-100.

The configured initial bandwidth part (initial BWP), default bandwidth part (default BWP), or first active bandwidth part (first active BWP) may be used for the following purposes, and may operate as follows according to the purposes.

The initial bandwidth part (initial BWP) may be used as a bandwidth part determined at a cell level (cell-specific) existing one for each cell, and may be used as a bandwidth part in which a UE accessing the cell for the first time may configure a connection to the cell via random access, or a UE having configured a connection may perform synchronization. The base station may configure, for each cell, each of an initial downlink bandwidth part (initial downlink BWP) to be used in downlink and an initial uplink bandwidth part (initial uplink BWP) to be used in uplink. Configuration information for the initial bandwidth part may be broadcast in the first system information (system information 1, SIB1) indicated by CORESET, and may be reconfigured for a connected UE by the base station via an RRC message. The initial bandwidth part may be designated with a bandwidth part identifier of 0 so as to be used in each of uplink and downlink. That is, all UEs accessing the same cell may use the same initial bandwidth part by designating the same bandwidth part identifier of 0. This is because, when random access is performed, the base station may transmit a random access response (RAR) message via the initial bandwidth part, which enables all UEs to read the RAR message, so that there may be an advantage in facilitating contention-based random access.

The first active bandwidth part (first active BWP) may be configured to be different for each UE (UE-specific), and may be designated and indicated by a bandwidth part identifier from among multiple bandwidth parts. The first active bandwidth part may be configured for each of downlink and uplink, and may be configured, by a bandwidth part identifier, as each of a first active downlink bandwidth part (first active downlink BWP) and a first active uplink bandwidth part (first active uplink BWP). The first active bandwidth part may be used for the purpose of indicating a bandwidth part which is to be initially activated and used, when multiple bandwidth parts are configured in one cell. For example, when a PCell or a PSCell and multiple SCells are configured for a UE, and multiple bandwidth parts are configured for each of the PCell, PSCell, or SCells, if the PCell, PSCell, or SCells are activated, the UE may activate and use a first active bandwidth part (first active BWP) among the multiple bandwidth parts configured for the PCell, PSCell, or SCells. That is, the first active downlink bandwidth part (first active downlink BWP) may be activated and used for downlink, and the first active uplink bandwidth part (first active uplink BWP) may be activated and used for uplink.

An operation in which the UE switches the current or activated downlink bandwidth part of the cell so as to activate the first active downlink bandwidth part (or bandwidth part configured or indicated via an RRC message), or an operation in which the UE switches the current or activated uplink bandwidth part so as to activate the first active uplink bandwidth part (or bandwidth part configured or indicated via an RRC message), may be performed when the UE receives an indication of activating a bandwidth part of an activated cell or a cell, which has been deactivated or dormant, or when the UE receives an indication of switching or activating a deactivated or dormant bandwidth part to a normal bandwidth part, where the indications are received via an RRC message, MAC control information, or DCI of PDCCH. When the UE receives, via an RRC message, MAC control information, or DCI of PDCCH, an indication of shifting an activated cell or an activated bandwidth part to a dormant state, or receives an indication of switching or activating the same a dormant bandwidth part, the UE may switch or activate the bandwidth part to the dormant bandwidth part or may make the bandwidth part dormant.

In the above description, making the bandwidth part dormant, switching to the dormant bandwidth part, or activating to the dormant bandwidth part may refer to performing operations proposed in the dormant state in the disclosure. That is, in the dormant bandwidth part, the UE does not perform PDCCH monitoring, but may perform channel measurement for a downlink bandwidth part (or dormant bandwidth part) and may report a channel measurement result to the base station. As another method, when the activated cell or activated bandwidth part is activated or switched to a normal bandwidth part, a downlink bandwidth part is switched so as to be activated to a first active downlink bandwidth part, and an uplink bandwidth part is switched so as to be activated to a first active uplink bandwidth part, and therefore the dormant bandwidth part may be configured as a default bandwidth part or the first active downlink or uplink bandwidth part. The default bandwidth part (default BWP) may be configured to be different for each UE (UE-specific), and may be designated and indicated by a bandwidth part identifier from among multiple bandwidth parts. The default bandwidth part may be configured only for downlink. The default bandwidth part may be used as a bandwidth part, to which an activated bandwidth part among multiple downlink bandwidth parts falls back after a certain time. For example, a bandwidth part inactivity timer (BWP inactivity timer) may be configured for each cell or each bandwidth part via an RRC message, and the timer may start or restart when data transmission or reception occurs in an active bandwidth part other than the default bandwidth part, or the timer may start or restart when the activated bandwidth part is switched to another bandwidth part. When the timer expires, the UE may cause the downlink bandwidth part activated for the cell to fall back or switch to the default bandwidth part. The switching may refer to deactivating a currently activated bandwidth part and activating a bandwidth part indicated for switching, and the switching may be triggered by an RRC message, MAC control information (MAC control element), or L1 signaling (downlink control information (DCI) of PDCCH). The switching may be triggered by indicating a bandwidth part to be switched or to be activated, and the bandwidth part may be indicated by a bandwidth part indicator (e.g., 0, 1, 2, 3, or 4).

The default bandwidth part is applied and used only for downlink because the base station may cause the UE to fall back to the default bandwidth part for each cell after a certain time to receive an indication (e.g., DCI of PDCCH) from the base station, thereby facilitating base station scheduling. For example, if the base station configures, as initial bandwidth parts, default bandwidth parts of UEs accessing one cell, the base station may continuously indicate scheduling only for the initial bandwidth parts after a certain time. If the default bandwidth parts are not configured in an RRC message, initial bandwidth parts may be considered as the default bandwidth parts, and fallback may be performed to the initial bandwidth parts when a bandwidth part inactivity timer expires.

In another method, in order to enhance the freedom of implementation of the base station, a default bandwidth part may be also defined and configured for uplink and may be used as a default bandwidth part of downlink.

The dormant bandwidth part (dormant BWP) refers to a bandwidth part in a dormant mode or a dormant bandwidth part (dormant BWP in activated SCell) in an activated cell, or when the dormant bandwidth part is activated, the UE cannot exchange data with the base station, does not perform PDCCH monitoring to check an indication of the base station, or does not transmit a pilot signal, but the UE performs channel measurement and reports a measurement result for a measured frequency/cell/channel periodically or when an event occurs, according to a configuration by the base station. Therefore, since the UE neither monitors PDCCH nor transmits a pilot signal in the dormant bandwidth part (BWP) of the activated cell, the UE can save a battery power compared to a normal bandwidth part (or bandwidth part other than the dormant bandwidth part) of the activated cell or compared to when the normal bandwidth part (or bandwidth part other than the dormant bandwidth part) of the activated cell is activated, and since the UE performs channel measurement reporting unlike when the cell is deactivated, the base station may quickly activate the normal bandwidth part of the activated cell on the basis of a measurement report or on the basis of a measurement report of the dormant bandwidth part of the activated cell, and may allow carrier aggregation to be used quickly, so as to reduce transmission latency.

For a first active bandwidth part (or first active non-dormant bandwidth part) that is activated from dormancy, when the UE is operating, as a dormant bandwidth part, a bandwidth part of one activated cell, when an activated bandwidth part is the dormant bandwidth part in the activated cell, or when a bandwidth part other than the dormant bandwidth part is switched to the dormant bandwidth part in the cell, if the base station indicates, via DCI of PDCCH, a MAC CE, or an RRC message, the UE to switch the bandwidth part of the activated cell from the dormant bandwidth part to a normal bandwidth part (or bandwidth part other than the dormant bandwidth part), indicates UE to switch (or change) the active bandwidth part in the dormant bandwidth part to the normal bandwidth part, or indicates the UE to switch (or change) or activate the active bandwidth part in the dormant bandwidth part to the normal bandwidth part (e.g., first active bandwidth part activated from dormancy), a bandwidth part, to which the UE should switch or activate the bandwidth part of the activated cell according to the indication, may be the first active bandwidth part activated from dormancy configured via the RRC message.

In the disclosure, switching a first bandwidth part to a second bandwidth part may be interpreted as activating the second bandwidth part, or may be interpreted as deactivating the activated first bandwidth part and activating the second bandwidth part.

In the RRCSetup message 6-25 RRCResume message, or RRCReconfiguration message 6-45 of the RRC connection configuration, a state shift timer may be configured so that the UE may perform state transition by itself even if the UE does not receive, from the base station, an indication via an RRC message, MAC control information, or DCI of PDCCH. For example, a cell deactivation timer (ScellDeactivationTimer) may be configured for each cell, and if the cell deactivation timer expires, the cell may be shifted to a deactivated state. Alternatively, a downlink (or bandwidth uplink) part hibernation timer (DLBWPHibernationTimer or ULBWPHibernationTimer) may be configured for each cell or for each bandwidth part of each cell, or a cell hibernation timer (ScellHibernationTimer) may be configured for each cell, and if the cell hibernation timer or the downlink (or uplink) bandwidth part hibernation timer expires, the cell or a downlink (or uplink) bandwidth part may be shifted to a dormant state or may be switched to a dormant bandwidth part. For example, when the cell hibernation timer or the downlink (or uplink) bandwidth part hibernation timer expires, an activated cell or downlink (or uplink) bandwidth part may be shifted to a dormant state or may be switched to a dormant bandwidth part, and a deactivated or dormant cell or dormant downlink (or uplink) bandwidth part may be neither shifted to a dormant state nor switched to a dormant bandwidth part. The bandwidth part hibernation timer may start when an indication of switching or activating a bandwidth part (e.g., bandwidth part other than a dormant bandwidth part) is received via an RRC message, a MAC CE, or DCI of PDCCH, or the bandwidth part hibernation timer may suspend when an indication of switching to a dormant bandwidth part, an indication of dormancy, or an indication of activating a dormant bandwidth part is received via an RRC message, a MAC CE, or DCI of PDCCH. For each cell or downlink (or uplink) bandwidth part, a dormant state cell deactivation timer (dormantScellDeactivationTimer) or a dormant state deactivation timer or downlink (or uplink) dormant bandwidth part deactivation timer (dormantDLDeactivationTimer or dormantULDeactivationTimer) may be configured, so as to shift a cell or downlink (or uplink) dormant bandwidth part in a dormant state to a deactivated state. When the dormant state cell deactivation timer or the dormant state deactivation timer or downlink (or uplink) dormant bandwidth part deactivation timer expires, only a dormant cell or a downlink (or uplink) dormant bandwidth part is shifted to a deactivated state, and an active or deactivated cell or downlink (or uplink) bandwidth part is not shifted to a deactivated state. The dormant bandwidth part hibernation timer may start when an indication of switching to a dormant bandwidth part, an indication of dormancy, or an indication of activating a dormant bandwidth part is received via an RRC message, a MAC CE, or DCI of PDCCH, or the dormant bandwidth part hibernation timer may suspend when an indication of deactivating or activating a bandwidth part or cell or an indication of activating a normal bandwidth part (e.g., bandwidth part other than a dormant bandwidth part, which is configured via RRC) is received via an RRC message, a MAC CE, or DCI of PDCCH. If the cell deactivation timer (ScellDeactivationTimer) (or downlink (or uplink) bandwidth part hibernation timer) and the cell hibernation timer (ScellHibernationTimer) (or downlink (or uplink) dormant bandwidth part deactivation timer)) are configured together, the cell hibernation timer (ScellHibernationTimer) (or downlink (or uplink) dormant bandwidth part hibernation timer) is prioritized. That is, when the cell hibernation timer (ScellHibernationTimer) (or downlink (or uplink) bandwidth part hibernation timer) is configured, even if the cell deactivation timer (ScellDeactivationTimer) (or downlink (or uplink) dormant bandwidth part deactivation timer) expires, a corresponding cell or downlink (or uplink) bandwidth part is not deactivated. In other words, when the cell hibernation timer (or downlink (or uplink) bandwidth part hibernation timer) is configured, the cell or downlink (or uplink) bandwidth part is, due to expiration of the timer, first shifted from an active state to a dormant state or is switched to a dormant bandwidth part, and the cell or bandwidth part shifted to the dormant state is gradationally re-shifted to the deactivated state due to expiration of the dormant state cell deactivation timer or bandwidth part inactivity timer. Therefore, if the cell hibernation timer or the bandwidth part hibernation timer is configured, the cell deactivation timer or the dormant bandwidth part deactivation timer does not affect state transition of the cell or downlink (or uplink) bandwidth part, and if the cell hibernation timer or the bandwidth part hibernation timer is configured, even if the cell deactivation timer or the dormant bandwidth part deactivation timer expires, the cell or downlink (or uplink) bandwidth part is not immediately shifted to the deactivated state.

If the cell deactivation timer (or downlink (or uplink) bandwidth part hibernation timer) is not configured in the RRC message, the UE may consider that the cell deactivation timer (or downlink (or uplink) bandwidth part hibernation timer) is configured in an infinite value.

In the RRCSetup message 6-25, RRCResume message, or RRCReconfiguration message 6-45 of the RRC connection configuration, frequency measurement configuration information (measurement configuration), frequency measurement gap information (measurement gap information), and the like may be configured, and frequency measurement object (measurement object) information may be included. In the RRCSetup message 6-25, RRCResume message, or RRCReconfiguration message 6-45 of the RRC connection configuration, a function (power saving mode) for reducing power consumption of the UE may be configured, and configuration information, such as a discontinuous reception (DRX) cycle, an offset, an on-duration time (time during which the UE needs to monitor PDCCH), or time information, etc., information on a time at which PDCCH from the base station is monitored or detected before the on-duration time in the DRX cycle, short time cycle information, or the like may be configured in addition to the function for reducing power consumption. If the function for reducing power consumption of the UE is configured, the UE may configure a DRX cycle, and may detect a wake-up signal (WUS) in a period configured for monitoring of PDCCH of the base station before the on-duration time, and the base station may indicate, via DCI of PDCCH of the WUS, to the UE whether to skip (or not perform) or perform PDCCH monitoring in an immediately following on-duration time. The UE always needs to monitor PDCCH in the on-duration time, where the base station indicates, via the WUS, to the UE not to perform PDCCH monitoring in the on-duration time, so as to enable reduction of battery consumption.

When the RRC connection configuration is completed as described above, the UE may configure multiple bandwidth parts according to an indication configured via an RRC message. In order to save battery, one or a small number of bandwidths among the multiple configured bandwidth parts may be activated. For example, the base station may indicate, to the UE, one bandwidth part to be activated. The base station may indicate activation of the bandwidth part via an RRC message, MAC control information (MAC CE), or L1 signaling (PHY layer control signal such as DCI of PDCCH), so as to indicate switching from an initial access bandwidth part to a new bandwidth part. As another method, new bitmap information may be defined in DCI of PDCCH, and whether to activate a normal bandwidth part (or bandwidth part other than a dormant bandwidth part), whether to activate a dormant bandwidth part, or whether to deactivate a bandwidth part may be indicated. As another method, the bitmap may indicate whether to activate a normal bandwidth part (e.g., first active bandwidth part to be activated from dormancy), whether to active a dormant bandwidth part, whether to switch to a dormant bandwidth part, or whether to perform bandwidth part switching. Since there may be many other new users accessing the initial access bandwidth part, it may be more advantageous, in terms of scheduling, to assign a new bandwidth part and separately manage connected users. This is because the initial access bandwidth part is not configured for each UE, but may be shared and used in common for all UEs. Further, in order to reduce signaling overhead, a default bandwidth part (default BWP) may be dynamically indicated by MAC control information, L1 signaling, or system information.

In the RRC message (RRCSetup message 6-25, RRCResume message, or RRCReconfiguration message 6-70), configuration information for a cell group may also be included. The configuration information for a cell group may include some or multiple pieces of information from the following information, or may indicate a state, procedure, application or releasing of configuration information, or the like for each cell group.

Cell group identifier indicating a cell group (e.g., cell group identifier or index)

Indicator indicating a state of a cell group (e.g., active state, suspended state, or deactivated state)

Indicator indicating a state of a cell group (e.g., indicator for suspending (or deactivating) a cell group (e.g., cellgroup (SCG) suspension indicator) or indicator for resuming (or activating) a cell group (e.g., cellgroup (SCG) resumption indicator))

Indicator for triggering a procedure of a corresponding protocol layer (e.g., SDAP layer, PDCP layer, RLC layer, or MAC layer) according to the indicator indicating a state of a cell group (e.g., PDCP re-establishment indicator, PDCP data recovery indicator, indicator triggering a new procedure, RLC re-establishment indicator, MAC layer initialization indicator, or MAC layer partial initialization indicator).

When an indicator for suspending (or deactivating) a state of a cell group is included, second DRX configuration information (e.g., monitoring time, active time (on duration) length, cycle, offset, or the like) which enables PDCCH monitoring to be performed with a very long cycle in a PSCell of the cell group may be configured. For example, when the UE receives an indicator for suspending the cell group, the UE may perform PDCCH monitoring based on a very long period by applying the second DRX configuration information, so as to save power of the UE. As another method, when the UE receives the indicator for suspending the cell group, the UE may, by applying bandwidth part configuration information for the PSCell of the cell group, activate or switch a downlink bandwidth part of the PSCell of the cell group to a dormant bandwidth part, and may perform UE operations, in a cell for which a dormant bandwidth part is activated, which are proposed in the disclosure. When the UE receives the indicator for suspending the cell group, the UE may deactivate all SCells configured in the cell group. As another method, when the UE receives the indicator for suspending the cell group, the UE may activate or switch a downlink bandwidth part to a dormant bandwidth part with respect to an SCell, for which a dormant bandwidth part is configured, among the SCells configured in the cell group, and may perform UE operations, in a cell for which a dormant bandwidth part is activated, which are proposed in the disclosure, or may perform deactivation for an SCell for which a dormant bandwidth part is not configured. As another method, when the UE receives, via the RRC message, the indicator for suspending the cell group, the UE may, according to the indicator or configuration information on each SCell of the cell group, which is included in the RRC message, activate or deactivate each SCell, make each SCell dormant, or activate a dormant bandwidth part, or the UE may activate or deactivate each SCell of the cell group, make each SCell dormant, or activate a dormant bandwidth part, via the indicator (e.g., bitmap) of the DCI of PDCCH, the MAC control information, or the RRC message before or after reception of the indicator for suspending the cell group.

Configuration information relating to a transmission resource via which channel measurement is performed in a dormant bandwidth part or in a bandwidth part other than the dormant bandwidth part, and a measurement result is reported (e.g., PUCCH transmission resource information of a PCell, a PUCCH SCell, or a PSCell)

When an indicator for resuming (or activating) a state of a cell group is included, first DRX configuration information (e.g., monitoring time, active time (on duration) length, cycle, offset, or the like) which enables PDCCH monitoring to be performed again in a PSCell of the cell group may be configured. Alternatively, the first DRX configuration information stored for the cell group may be restored and applied. For example, when the UE receives an indicator for resuming the cell group, the UE may perform PDCCH monitoring by applying the stored first DRX configuration information or the first DRX configuration information received via the RRC message, thereby resuming data transmission or reception. As another method, when the UE receives an indicator for resuming the cell group, the UE may activate or switch a downlink bandwidth part of the PSCell of the group to a bandwidth part (e.g., bandwidth part configured via an RRC message) other than a dormant bandwidth part, by applying bandwidth part configuration information for the PSCell of the cell group, and the UE may perform UE operations, in a cell for which a normal bandwidth part (bandwidth part other than a dormant bandwidth part) is activated, which are proposed in the disclosure. Alternatively, when the UE receives an indicator for resuming the cell group, the UE may trigger random access in the PSCell of the cell group by applying stored random access configuration information or random access configuration information received via the RRC message, where the random access configuration information includes random access transmission resource information (time or frequency transmission resource), dedicated preamble information for transmission of a preamble, or the like. As another method, when the UE receives an indicator for resuming the cell group, if the RRC message includes the random access configuration information (random access transmission resource information (time or frequency transmission resource), dedicated preamble information for transmission of a preamble, or the like), the UE may trigger random access (e.g., contention-free random access) in the PSCell of the cell group by applying the random access configuration information, and if the RRC message for indicating resumption or activation of the cell group does not include the random access configuration information (random access transmission resource information (time or frequency transmission resource), dedicated preamble information for transmission of a preamble, or the like), the UE may trigger random access (e.g., contention-based random access) in the PSCell of the cell group, or may trigger random access (contention-based random access or 2-step random access) on the basis of system information. If there is random access configuration information (random access transmission resource information (time or frequency transmission resource), dedicated preamble information for transmission of a preamble, or the like) stored in the UE before reception of the indicator for resuming the cell group, the stored random access configuration information may be released or discarded. As another method, the UE may perform PDCCH monitoring in the indicated or configured cell group or cell, and may trigger and perform random access as indicated in PDCCH.

If the indicator for resuming (or activating) a state of the cell group is included, or when the UE receives an indicator for resuming the cell group, all SCells configured in the cell group may be activated. As another method, when the UE receives an indicator for resuming the cell group, the UE may activate or switch a downlink bandwidth part to a bandwidth part (e.g., first active bandwidth part or bandwidth part configured via an RRC message) other than a dormant bandwidth part with respect to an SCell, for which a dormant bandwidth part is configured, among SCells configured in the cell group, and may perform UE operations, in a cell for which a bandwidth part other than a dormant bandwidth part is activated, which are proposed in the disclosure, or may perform activation for an SCell for which a dormant bandwidth part is not configured. As another method, when the UE receives, via the RRC message, an indicator for resuming the cell group, the UE may, according to the indicator or configuration information on each SCell of the cell group, which is included in the RRC message, activate or deactivate each SCell, make each SCell dormant, or activate a dormant bandwidth part, or the UE may activate or deactivate each SCell of the cell group, make the each SCell dormant, or activate a dormant bandwidth part, via the indicator (e.g., bitmap) of PDCCH, the MAC control information, or the RRC message before or after reception of the indicator for resuming the cell group.

Indicator for adding cell group configuration

Indicator for releasing cell group configuration

Security configuration information (security key information, security key information for a cell group, or additional information (e.g., sk-counter)

Indicator indicating handover, cell group addition, or cell group change (e.g., Reconfiguration WithSync indicator or mobilitycontrolInfo indicator)

First channel measurement configuration information or second channel measurement configuration information for quick activation of a cell group or a cell It is proposed to include no indicator (e.g., Reconfiguration WithSync indicator or mobilitycontrolInfo indicator) indicating handover, cell group addition, or cell group change if the RRC message (e.g., RRCReconfiguration message) includes an indicator for suspending a cell group, and it is proposed to include an indicator (e.g., Reconfiguration WithSync indicator or mobilitycontrolInfo indicator) indicating handover, cell group addition, or cell group change if the RRC message includes an indicator for resuming a cell group or configuration information for configuring a cell group. This is because, when a cell group is resumed, a connection with the cell group should be performed again, and therefore synchronization should be performed, system information should be received, or random access should be performed if necessary.

Hereinafter, a dormant bandwidth part is newly proposed in the next-generation mobile communication system to which the disclosure is applicable, and UE operations in each bandwidth part when each bandwidth part is shifted or switched is specifically proposed.

Figure 7:
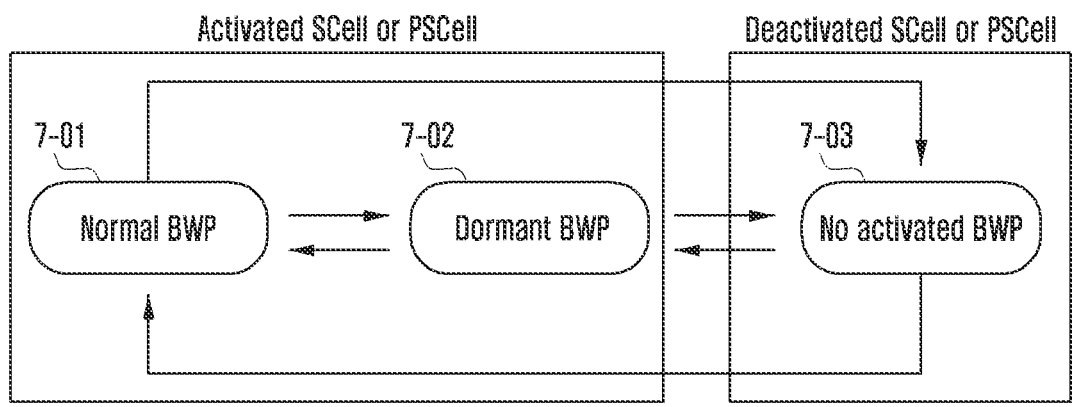
FIG. 7 is a diagram illustrating a bandwidth part-specific state transition procedure or a bandwidth part switching procedure according to an embodiment of the disclosure.

FIG. 7 is a diagram illustrating a bandwidth part-specific state transition procedure or a bandwidth part switching procedure according to an embodiment of the disclosure.

Referring to FIG. 7, a bandwidth part of each cell (e.g., SCell or PSCell) of each cell group of a UE may be activated to a normal bandwidth part 7-01, may be activated to a dormant bandwidth part 7-02, or may be deactivated 7-03, and a normal bandwidth part or a dormant bandwidth part may be activated or deactivated via indication by DCI of PDCCH, MAC control information, or configuration information of an RRC message.

State transition (activation, deactivation, or making dormant) for each bandwidth part of a cell, activating a normal bandwidth part, activating a dormant bandwidth part, activating a first active bandwidth part activated from dormancy, or deactivating a normal bandwidth part or a dormant bandwidth part, which are proposed in the disclosure, may be performed based on one indication of configuration in the following cases.

If a bandwidth part state of a cell is configured via an RRC message, if a bandwidth part of each cell is configured via an RRC message and a dormant bandwidth part is configured for the cell, or if a first active bandwidth part is configured as a dormant bandwidth part, the cell starts by switching or activating to the dormant bandwidth part, and an operation in the dormant bandwidth part is performed.

If a cell activation, deactivation, or dormancy MAC CE is received, if a MAC CE indicating activation or deactivation of a first active bandwidth part or a dormant bandwidth part from a normal bandwidth part or dormancy is received, if DCI of PDCCH indicating activation, deactivation, or switching of a first active bandwidth part or a dormant bandwidth part from a normal bandwidth part or dormancy is received, if a cell hibernation timer is not configured for an active state cell, and a configured cell deactivation timer expires, and if a bandwidth part hibernation timer is not configured for an active state bandwidth part, and a configured bandwidth part state inactivity timer (e.g., bwpInactivityTimer) expires, then the state transition operation or dormant bandwidth part operation method proposed in the disclosure may has the following characteristics.

For an SPCell (PCell or PSCell) (or downlink bandwidth part or uplink bandwidth part of the cell), a dormant bandwidth part cannot be configured, and only normal bandwidth part is configured and is always activated. Since synchronization is performed and a main control signal is transmitted or received in an SPCell, if a bandwidth part of the SPCell is dormant or deactivated, or is operated as a dormant bandwidth part, a connection with a base station may be disconnected, so that the bandwidth part of the SPCell should always be kept active.

If PUCCH is configured despite an SCell or a bandwidth part of an SCell, a dormant state or a dormant bandwidth part cannot be configured. Since there may be another cell that needs to transmit feedback, such as HARQ ACK/NACK via PUCCH, an active state or a normal bandwidth part should be activated and used.

Due to the above characteristics, neither the cell deactivation timer (ScellDeactivationTimer) nor the bandwidth part hibernation timer is applied to an SCell or a bandwidth part of an SCell, for which PUCCH is configured, and an SPCell or a bandwidth part of an SPCell, and the timers may be operated only for other SCells.

The cell hibernation timer (ScellHibernationTimer) or the bandwidth part hibernation timer (BWPHibernationTimer) has priority over the cell deactivation timer (ScellDeactivationTimer) or the bandwidth part state deactivation timer (bwp inactivity Timer). For a timer value, if one timer value is configured via an RRC message, the same value may be applied to all cells. As another method, a base station may configure a different timer value for each SCell or for each BWP in consideration of characteristics of each SCell or each BWP.

Unless a cell or a bandwidth part is indicated to be active or dormant via an RRC message, the cell or bandwidth part operates initially in a deactivated state by default.

In the disclosure, an uplink may indicate an uplink bandwidth part, and a downlink may indicate a downlink bandwidth part. This is because only one active or dormant bandwidth part is operable for each uplink or downlink.

Hereinafter, a proposed method capable of operating state shifting or switching in a bandwidth part-level is specifically proposed, so as to enable quick activation of carrier aggregation or dual connectivity and saving of a UE battery power.

In the disclosure, a bandwidth part may be configured for each cell, as follows, via an RRCSetup message, an RRCReconfiguration message, or an RRCResume message as described with reference to FIG. 6. The RRC message may include configuration information for a PCell, a PSCell, or multiple SCells, and multiple bandwidth parts may be configured for each of the cells (PCell, PSCell, or SCells). When multiple bandwidth parts are configured for each of the cells via the RRC message, multiple bandwidth parts to be used in downlink of each of the cells may be configured. In a case of an FDD system, multiple bandwidth parts to be used in uplink of each cell may be configured separately from the downlink bandwidth parts. In a case of a TDD system, multiple bandwidth parts to be commonly used in downlink and uplink of each of the cells may be configured.

In a first method of an information configuration method for configuring a bandwidth part for each of the cells (PCell, PSCell, or SCells), one or multiple pieces of the following information is included, and a new indicator is introduced to a bandwidth part, so as to indicate whether each bandwidth part is a normal bandwidth part (e.g., bandwidth part that may be configured to or may operate in an active state or a deactivated state) or a dormant bandwidth part (e.g., bandwidth part that may be configured to or may operate in a dormant state). For example, a bandwidth part identifier may be used to indicate whether a bandwidth part is a dormant bandwidth part.

- Downlink bandwidth part configuration information of each cell
- Initial downlink bandwidth part (initial downlink BWP) configuration information
- Multiple pieces of bandwidth part configuration information, and bandwidth part identifier (BWP ID) corresponding to each bandwidth part
- Downlink initial state configuration information of the cell (e.g., active state, dormant state, or deactivated state)
- Bandwidth part identifier indicating a first active downlink bandwidth part (first active downlink BWP)
- Bandwidth part identifier indicating a default bandwidth part (default BWP)
- Bandwidth part identifier indicating dormant bandwidth part, or 1-bit indicator indicating a dormant bandwidth part for each bandwidth part in the bandwidth part configuration information
- If a first active downlink bandwidth part is configured to be a dormant bandwidth part, a first active uplink bandwidth part may also need to be configured to be a dormant bandwidth part.
- Bandwidth part inactivity timer configuration and timer value
- Bandwidth part identifier that is first activated from a dormant bandwidth part
- Uplink bandwidth part configuration information of each cell
- Initial uplink bandwidth part (initial uplink BWP) configuration information
- Multiple pieces of bandwidth part configuration information, and bandwidth part identifier (BWP ID) corresponding to each bandwidth part
- Uplink initial state configuration information of the cell (e.g., active state, dormant state, or deactivated state)
- Bandwidth part identifier indicating a first active uplink bandwidth part (first active uplink BWP)
- Bandwidth part identifier indicating dormant bandwidth part, or 1-bit indicator indicating a dormant bandwidth part for each bandwidth part in the bandwidth part configuration information
- If a first active downlink bandwidth part is configured to be a dormant bandwidth part, a first active uplink bandwidth part may also need to be configured to be a dormant bandwidth part.
- Bandwidth part identifier that is first activated from a dormant bandwidth part SRS-related configuration information may be configured in the following method.

First embodiment to configure SRS

- First SRS configuration information (SRS configuration information for a normal bandwidth part, a bandwidth part other than a dormant bandwidth part, a PSCell (or SCell) of a cell group that is not suspended, a PSCell (or SCell) of a resumed or activated cell group, or a bandwidth part of the PSCell (or SCell) (e.g., SRS transmission resource, cycle, or offset, or indicator indicating whether SRS configuration information is for a dormant bandwidth part))
- Second SRS configuration information (SRS configuration information for a dormant bandwidth part, a PSCell (or SCell) of a suspended or deactivated cell group, a PSCell (or SCell) of a cell group that is not resumed, or a bandwidth part thereof (e.g., SRS transmission resource, cycle, or offset, or indicator indicating whether SRS configuration information is for a dormant bandwidth part))
- The first SRS configuration information and the second SRS configuration information may be distinguished on the basis of an indicator indicating whether the SRS configuration information is for a dormant bandwidth part or a PSCell (or SCell) of a suspended or deactivated cell group. For example, the first SRS configuration information and the second SRS configuration information may be distinguished according to an indicator value, or may be distinguished on the basis of whether an indicator value is configured or not, or the presence or absence of an indicator value. As another method, the first SRS configuration information and the second SRS configuration information may be distinguished by differently defining a name of the first SRS configuration information and a name of the second SRS configuration information.

In the first embodiment, if a dormant bandwidth part (e.g., dormant bandwidth part identifier in downlink bandwidth part configuration information) is configured for a serving cell (PSCell or SCell), or if cell group suspension is indicated (or supported or configured), the second SRS configuration information is always configured. Alternatively, if a dormant bandwidth part (e.g., dormant bandwidth part identifier in downlink bandwidth part configuration information) is configured for a serving cell (PSCell or SCell), or if cell group suspension is indicated (or supported or configured), an indicator indicating whether SRS configuration information is the first SRS configuration information or the second SRS configuration information is configured. For example, if a dormant bandwidth part identifier is configured in downlink bandwidth part configuration information, or cell group suspension is indicated (or supported or configured), the second SRS configuration information should be configured in each uplink bandwidth part configuration information. For example, if a dormant bandwidth part identifier is configured in downlink bandwidth part configuration information, or cell group suspension is indicated (or supported or configured), the second SRS configuration information should be configured in the uplink bandwidth part configuration information with respect to an uplink bandwidth part having the same bandwidth part identifier as that of an uplink dormant bandwidth part or a downlink dormant bandwidth part. As another method, in a case of TDD or unpaired spectrum, if a dormant bandwidth part identifier is configured in downlink bandwidth part configuration information, the second SRS configuration information should be configured in the uplink bandwidth part configuration information with respect to an uplink bandwidth part having the same bandwidth part identifier as that of an uplink dormant bandwidth part or a downlink dormant bandwidth part.

For example, in the first embodiment, when the UE switches or activates a downlink bandwidth part of an activated cell to a bandwidth part (or normal bandwidth part) other than a dormant bandwidth part, if cell group suspension is not indicated, if a cell group is active, or if cell group resumption is indicated, the UE may apply the first SRS configuration information in an uplink bandwidth part of the activated cell (SCell or PSCell) and may perform SRS transmission on the basis of an SRS transmission resource, cycle, or offset corresponding to the first SRS configuration information. However, if the downlink bandwidth part of the activated cell is switched or activated to a dormant bandwidth part, if cell group suspension is indicated, or if the cell group is inactive (or deactivated or suspended), the UE may apply the second SRS configuration information in the uplink bandwidth part of the cell (PSCell or SCell) of the suspended or deactivated cell group, and may perform SRS transmission on the basis of an SRS transmission resource, cycle, or offset corresponding to the second SRS configuration information. For example, power saving effects in the UE may be improved in a dormant bandwidth part or in a suspended cell group by configuring SRS transmission resources configured in the second SRS configuration information for a dormant bandwidth part to be much less than SRS transmission resources configured in the first SRS configuration information for a normal bandwidth part, or by configuring an SRS transmission resource cycle configured in the second SRS configuration information to be much longer than an SRS transmission resource cycle configured in the first SRS configuration information. For example, in the second SRS configuration information, the SRS transmission cycle may be configured to 100 ms or longer. As another method, when the downlink bandwidth part is activated to the dormant bandwidth part, when cell group suspension is indicated, or when the cell group is inactive (or deactivated or suspended), if the second SRS configuration information is not configured, the UE may apply the first SRS configuration information to the uplink bandwidth part, and may perform SRS transmission on the basis of an SRS transmission resource, cycle, or offset corresponding to the first SRS configuration information. As another method, when the downlink bandwidth part is activated to the dormant bandwidth part, when cell group suspension is indicated, or when the cell group is inactive (or deactivated or suspended), if the second SRS configuration information is not configured, the UE may not perform SRS transmission.

Second embodiment to configure SRS

In the second embodiment, first SRS configuration information and second SRS configuration information may be included in one SRS configuration information, and may be separately configured as SRS configuration information (e.g., SRS transmission resource, cycle, or offset) for a normal bandwidth part, a bandwidth part other than a dormant bandwidth part, a PSCell (or SCell) of a cell group that is not suspended, a PSCell (or SCell) of a resumed or activated cell group, or a bandwidth part of the PSCell (or SCell), and SRS configuration information (e.g., SRS transmission resource, cycle, or offset) for a dormant bandwidth part, a PSCell (or SCell) of a suspended (or deactivated) cell group, a PSCell (or SCell) of a cell group that is not resumed, or a bandwidth part of the PSCell (or SCell).

First SRS configuration information (SRS configuration information for a normal bandwidth part, a bandwidth part other than a dormant bandwidth part, a PSCell (or SCell) of a cell group that is not suspended, a PSCell (or SCell) of a resumed or activated cell group, or a bandwidth part of the PSCell (or SCell) (e.g., SRS transmission resource, cycle, or offset, or indicator indicating whether SRS configuration information is for a dormant bandwidth part))

Second SRS configuration information (SRS configuration information for a dormant bandwidth part, a PSCell (or SCell) of a suspended (or deactivated) cell group, a PSCell (or SCell) of a cell group that is not resumed, or a bandwidth part of the PSCell (or SCell) (e.g., SRS transmission resource, cycle, or offset, or indicator indicating whether SRS configuration information is for a dormant bandwidth part))

In the second embodiment, if a dormant bandwidth part (e.g., dormant bandwidth part identifier in downlink bandwidth part configuration information) is configured for a serving cell (cell), or if cell group suspension is indicated (or supported or configured), the second SRS configuration information is always configured. Alternatively, if a dormant bandwidth part (e.g., dormant bandwidth part identifier in downlink bandwidth part configuration information) is configured for a serving cell (cell), or if cell group suspension is indicated (or supported or configured), an indicator indicating whether SRS configuration information is the first SRS configuration information or the second SRS configuration information is configured. For example, if a dormant bandwidth part identifier is configured in downlink bandwidth part configuration information, the second SRS configuration information should be configured in each uplink bandwidth part configuration information. For example, if a dormant bandwidth part identifier is configured in downlink bandwidth part configuration information, or cell group suspension is indicated (or supported or configured), the second SRS configuration information should be configured in the uplink bandwidth part configuration information with respect to an uplink bandwidth part having the same bandwidth part identifier as that of an uplink dormant bandwidth part or a downlink dormant bandwidth part. As another method, in a case of TDD or unpaired spectrum, if a dormant bandwidth part identifier is configured in downlink bandwidth part configuration information, or if cell group suspension is indicated (or supported or configured), the second SRS configuration information should be configured in the uplink bandwidth part configuration information with respect to an uplink bandwidth part having the same bandwidth part identifier as that of an uplink dormant bandwidth part or a downlink dormant bandwidth part.

For example, in the second embodiment, when the UE switches or activates a downlink bandwidth part of an activated cell to a bandwidth part (or normal bandwidth part) other than a dormant bandwidth part, if cell group suspension is not indicated, if a cell group is active, or if cell group resumption is indicated, the UE may apply the first SRS configuration information in an uplink bandwidth part of the activated cell and may perform SRS transmission on the basis of an SRS transmission resource, cycle, or offset corresponding to the first SRS configuration information. However, if the downlink bandwidth part of the activated cell is switched or activated to a dormant bandwidth part, if cell group suspension is indicated, or if the cell group is inactive (or deactivated or suspended), the UE may apply the second SRS configuration information in the uplink bandwidth part of the activated cell, and may perform SRS transmission on the basis of an SRS transmission resource, cycle, or offset corresponding to the second SRS configuration information. For example, power saving effects in the UE may be improved in a dormant bandwidth part by configuring SRS transmission resources configured in the second SRS configuration information to be much less than SRS transmission resources configured in the first SRS configuration information, or by configuring an SRS transmission resource cycle configured in the second SRS configuration information to be much longer than an SRS transmission resource cycle configured in the first SRS configuration information. For example, in the second SRS configuration information, the SRS transmission cycle may be configured to 100 ms or longer. As another method, when the downlink bandwidth part is activated to the dormant bandwidth part, when cell group suspension is indicated, or when the cell group is inactive (or deactivated or suspended), if the second SRS configuration information is not configured, the UE may apply the first SRS configuration information to the uplink bandwidth part, and may perform SRS transmission on the basis of an SRS transmission resource, cycle, or offset corresponding to the first SRS configuration information. As another method, when the downlink bandwidth part is activated to the dormant bandwidth part, when cell group suspension is indicated, or when the cell group is inactive (or deactivated or suspended), if the second SRS configuration information is not configured, the UE may not perform SRS transmission.

Third embodiment to configure SRS

In the third embodiment, second SRS configuration information, i.e., SRS configuration information (e.g., SRS transmission resource, cycle, or offset) for indicating or configuring a dormant bandwidth part or cell group suspension, may be configured only for a bandwidth part configured as an uplink dormant bandwidth part (bandwidth part indicated by a dormant bandwidth part identifier) in uplink bandwidth part configuration information. Alternatively, first SRS configuration information, i.e., SRS configuration information (e.g., SRS transmission resource, cycle, or offset) for a normal bandwidth part or a bandwidth part other than a dormant bandwidth part, may be configured only for a bandwidth part configured as a bandwidth part (bandwidth part that is not indicated by a dormant bandwidth part identifier) other than an uplink dormant bandwidth part in the uplink bandwidth part configuration information. As another method, in a case of TDD or unpaired spectrum, if a dormant bandwidth part identifier is configured in downlink bandwidth part configuration information, the second SRS configuration information should be configured in the uplink bandwidth part configuration information with respect to an uplink bandwidth part having the same bandwidth part identifier as that of an uplink dormant bandwidth part (bandwidth part indicated by a dormant bandwidth part identifier) or a downlink dormant bandwidth part.

For example, in the third embodiment, when a downlink bandwidth part of an activated cell is switched or activated to a bandwidth part (or normal bandwidth part) other than a dormant bandwidth part, the UE may apply the first SRS configuration information in an uplink bandwidth part of the activated cell, and may perform SRS transmission on the basis of an SRS transmission resource, cycle, or offset corresponding to the first SRS configuration information. However, if the downlink bandwidth part of the activated cell is switched or activated to a dormant bandwidth part, the UE may apply the second SRS configuration information in the uplink bandwidth part of the activated cell, and may perform SRS transmission on the basis of an SRS transmission resource, cycle, or offset corresponding to the second SRS configuration information. For example, power saving effects in the UE may be improved in a dormant bandwidth part by configuring SRS transmission resources configured in the second SRS configuration information for a dormant bandwidth part to be much less than SRS transmission resources configured in the first SRS configuration information for a normal bandwidth part, or by configuring an SRS transmission resource cycle configured in the second SRS configuration information for a dormant bandwidth part to be much longer than an SRS transmission resource cycle configured in the first SRS configuration information for a normal bandwidth part. For example, in the second SRS configuration information, the SRS transmission cycle may be configured to 100 ms or longer. As another method, when the downlink bandwidth part is activated to the dormant bandwidth part, if the second SRS configuration information is not configured, the UE may apply the first SRS configuration information to the uplink bandwidth part, and may perform SRS transmission on the basis of an SRS transmission resource, cycle, or offset corresponding to the first SRS configuration information. Alternatively, when the downlink bandwidth part is activated to the dormant bandwidth part, if the second SRS configuration information is not configured, the UE may not perform SRS transmission.

As another method of an information configuration method for configuring a bandwidth part for each of the cells (PCell, PSCell, or SCells), in a second method, distinction may be made so that configuration information (e.g., search space, PDCCH transmission resource, cycle, etc.) required for reading PDCCH is not configured for a bandwidth part corresponding to a dormant bandwidth part (alternatively, a very long cycle may be configured along with other configuration information), and configuration information (e.g., search space, PDCCH transmission resource, cycle, etc.) required for reading PDCCH may be configured for a normal bandwidth part. This is because a dormant bandwidth part is a bandwidth part for reducing battery consumption of the UE by preventing PDCCH reading, performing channel measurement is performed, and reporting a channel measurement result via a PCell to enable quick activation of a cell or a bandwidth part, thereby quickly allocating an uplink or downlink transmission resource. Therefore, in the disclosure, a dormant bandwidth part may indicate a bandwidth part for which configuration information (e.g., search space, PDCCH transmission resource, cycle, etc.) for PDCCH monitoring is not configured, or may refer to a bandwidth part indicated by a dormant bandwidth part identifier, or a bandwidth part for which configuration information for PDCCH monitoring is configured, but the PDCCH monitoring is configured to be performed with a very long cycle. As another method, in the disclosure, a dormant bandwidth part may indicate a bandwidth part in which: a PDCCH transmission resource, cycle, etc. in configuration information for PDCCH monitoring are not configured so as to prevent PDCCH monitoring from being performed in a cell for which the dormant bandwidth part is configured; but search space information or cross carrier scheduling configuration information is configured, and switching or indication for the dormant bandwidth part may be thus received in another cell via cross carrier scheduling, where, since data transmission or reception is impossible in the dormant bandwidth part, only PDCCH configuration information (PDCCH-config) is configured (e.g., configuring only search space information) for the dormant bandwidth part (or this may be referred to as a first bandwidth part). On the other hand, in a normal bandwidth part (or this may be referred to as a second bandwidth part) other than a dormant bandwidth part, PDCCH monitoring needs to be performed and data transmission or reception should also be possible, so that PDCCH configuration information (e.g., CORESET configuration information, search space configuration information, or PDCCH transmission resource, cycle, etc.), PDSCH configuration information, PUSCH configuration information, random access-related configuration information, or the like may be further configured.

Therefore, although an uplink or downlink normal bandwidth part should be configured for each cell as described above, a dormant bandwidth part may or may not be configured for each cell, and the configuration may be left to base station implementation according to the purpose. Depending on the base station implementation, a first active bandwidth part, a default bandwidth part, or an initial bandwidth part may be configured as a dormant bandwidth part.

In the dormant bandwidth part, a UE cannot exchange data with a base station, does not perform PDCCH monitoring to check an indication of the base station, and does not transmit a pilot signal, but the UE performs channel measurement and reports a measurement result for a measured frequency/cell/channel periodically or when an event occurs, according to a configuration by the base station. Therefore, the UE neither performs PDCCH monitoring nor transmits a pilot signal in the dormant bandwidth part, and battery consumption may be thus reduced compared to an active mode, and since the UE performs channel measurement reporting unlike in a deactivated mode, the base station may use carrier aggregation by quickly activating a cell for which the dormant bandwidth part is configured, on the basis of the measurement reporting in the dormant bandwidth part. In the disclosure, a dormant bandwidth part is configured in downlink bandwidth part configuration information, and is used only for a downlink bandwidth part.

In the disclosure, a UE operation for a dormant bandwidth part or a UE operation in an activated SCell or PSCell when a dormant bandwidth part is activated is as follows.

If a UE receives an indication of operation via (activation to) a dormant bandwidth part for a serving cell (PCell, PSCell, or SCells) from a PCell or an SPCell, if an indication of making a bandwidth part (e.g., downlink bandwidth part) of a serving cell (e.g., SCell) or the serving cell (e.g., SCell) dormant, or an indication of activating a dormant bandwidth part is received via DCI (L1 control signal) of PDCCH, a MAC CE, or an RRC message, if an indication of switching a bandwidth part (e.g., downlink bandwidth part) to a dormant bandwidth part is received via DCI (L1 control signal) of PDCCH, a MAC CE, or an RRC message (if the indication is received via an L1 control signal of PDCCH, the indication may be received on PDCCH of the serving cell by self-scheduling, or the indication may be received on PDCCH for the cell in the PCell by cross-carrier scheduling), if a bandwidth part hibernation timer is configured and the timer expires, if an activated bandwidth part of an activated cell is a dormant bandwidth part, or if an activated bandwidth part of an activated cell is not a normal bandwidth part, one or multiple of the following operations may be performed.

An uplink bandwidth part or a downlink bandwidth part is switched to a bandwidth part (e.g., dormant bandwidth part) configured via RRC, and the bandwidth part is activated or is made dormant.

A cell deactivation timer that is configured for or is running in the cell or bandwidth part is suspended.

If a bandwidth part hibernation timer is configured for the bandwidth part of the cell, the bandwidth part hibernation timer is suspended.

A dormant bandwidth part inactivity timer is started or restarted in the bandwidth part of the cell.

A bandwidth part inactivity timer configured for the bandwidth part of the cell is suspended. This is to prevent unnecessary bandwidth part switching in the cell.

A periodic downlink transmission resource (DL SPS or configured downlink assignment) or a periodic uplink transmission resource (UL SPS or configured uplink grant Type 2), configured for the bandwidth part of the cell, may be cleared. The clearing of the transmission resource indicates that the UE stores configuration information, such as period information configured via an RRC message, but removes and no longer uses information on the periodic transmission resource indicated or activated via L1 signaling (e.g., DCI). The method proposed above, that is, clearing the configured periodic downlink transmission resource (DL SPS or configured downlink assignment) or the configured periodic uplink transmission resource (UL SPS or configured uplink grant) may be performed only when the bandwidth part is shifted from an active state to a dormant state. This is because, when a bandwidth part is shifted from a deactivated state to a dormant state, there is no information on a periodic transmission resource indicated or activated by L1 signaling. Alternatively, only when the periodic downlink transmission resource or the periodic uplink transmission resource is configured or is configured so as to be used, the periodic transmission resources may be cleared.

The periodic uplink transmission resource (configured uplink grant Type 1 configured via RRC) configured for the bandwidth part of the cell may be suspended. The suspending of the transmission resource indicates that the UE stores but no longer uses transmission resource configuration information configured via an RRC message. The method proposed above, that is, suspending the configured periodic uplink transmission resource (configured uplink grant Type 1) may be performed only when the bandwidth part is shifted from an active state to a dormant state. This is because, when the bandwidth part is shifted from a deactivated state to a dormant state, a periodic transmission resource is not used. Alternatively, only when the periodic downlink transmission resource or the periodic uplink transmission resource is configured or is configured so as to be used, the periodic transmission resources may be cleared.

All HARQ buffers configured for the uplink or downlink bandwidth part are emptied.

The UE does not perform SRS transmission for the uplink bandwidth part for the cell.

As another method, when first SRS configuration information (SRS configuration information (e.g., SRS transmission resource, cycle, or offset) for a normal bandwidth part (bandwidth part other than a dormant bandwidth part)) or second SRS configuration information (SRS configuration information (e.g., SRS transmission resource, cycle, or offset) for a dormant bandwidth part) is configured in uplink bandwidth part configuration information, the UE may facilitate scheduling or power control of a network, or may perform SRS transmission so as to enable quick re-activation of the uplink bandwidth part of the UE. For example, when the UE switches or activates a downlink bandwidth part of an activated cell to a bandwidth part (or normal bandwidth part) other than a dormant bandwidth part (when an activated bandwidth part is not a dormant bandwidth part), the UE may apply the first SRS configuration information in an uplink bandwidth part of the activated cell, and may perform SRS transmission on the basis of an SRS transmission resource, cycle, or offset corresponding to the first SRS configuration information. However, if the downlink bandwidth part of the activated cell is switched or activated to a dormant bandwidth part (when the activated bandwidth part is a dormant bandwidth part), the UE may apply the second SRS configuration information in the uplink bandwidth part of the activated cell, and may perform SRS transmission on the basis of an SRS transmission resource, cycle, or offset corresponding to the second SRS configuration information. For example, power saving effects in the UE may be improved in a dormant bandwidth part by configuring SRS transmission resources configured in the second SRS configuration information for a dormant bandwidth part to be much less than SRS transmission resources configured in the first SRS configuration information for a normal bandwidth part, or by configuring an SRS transmission resource cycle configured in the second SRS configuration information for a dormant bandwidth part to be much longer than an SRS transmission resource cycle configured in the first SRS configuration information for a normal bandwidth part. For example, in the second SRS configuration information, the SRS transmission cycle may be configured to 100 ms or longer. As another method, when the downlink bandwidth part is activated to the dormant bandwidth part, if the second SRS configuration information is not configured, the UE may apply the first SRS configuration information to the uplink bandwidth part, and may perform SRS transmission on the basis of an SRS transmission resource, cycle, or offset corresponding to the first SRS configuration information. Alternatively, if the downlink bandwidth part is activated to the dormant bandwidth part, if the second SRS configuration information is not configured, the UE may not perform SRS transmission.

As another method, if the downlink bandwidth part of the activated cell is switched or activated to a downlink dormant bandwidth part (when the activated bandwidth part is a dormant bandwidth part), the UE may switch or activate the uplink bandwidth part to an uplink dormant bandwidth part. For the uplink dormant bandwidth part, a dormant bandwidth part may be indicated by a bandwidth part identifier in uplink bandwidth part configuration information configured via the RRC message. (For example, this may be applied in a case of FDD, unpaired spectrum, or TDD.) As another method, the same bandwidth part identifier as that of the downlink dormant bandwidth part may be the same uplink bandwidth part identifier indicating a dormant bandwidth part (for example, this may be applied in a case of unpaired spectrum or TDD). The UE may apply the second SRS configuration information configured for the uplink dormant bandwidth part, and may perform SRS transmission on the basis of an SRS transmission resource, cycle, or offset corresponding to the second SRS configuration information.

As another method, the current uplink bandwidth part or the last activated uplink bandwidth part may be activated as it is.

In a bandwidth part of the cell, the UE performs channel measurement (CSI, CQI, PMI, RI, PTI, CRI, or the like) for downlink according to a configuration of a base station, and performs measurement reporting. For example, the UE may periodically perform channel or frequency measurement reporting.

Uplink data is not transmitted on UL-SCH in the bandwidth part of the cell.

Random access is not performed for the bandwidth part of the cell.

The UE does not perform PDCCH monitoring in the bandwidth part of the cell.

The UE does not perform PDCCH monitoring for the bandwidth part of the cell. However, in a case of cross-scheduling, an indication may be received by PDCCH monitoring for the cell (e.g., SCell) in a cell (e.g., PCell) to be scheduled.

PUCCH or SPUCCH transmission is not performed in the bandwidth part of the cell.

A downlink bandwidth part dormant may be made dormant, channel measurement and reporting may be performed, and an uplink bandwidth part of the cell may be deactivated and not used. This is because, in a dormant cell, channel measurement is performed only for a downlink bandwidth part, and a measurement result is reported via an uplink bandwidth part of an SPCell (PCell or PSCell) or an SCell with PUCCH.

If, for downlink, switching or activation to a dormant bandwidth part is indicated or a bandwidth part is indicated to be dormant, random access may be performed without clearing. This is because, in the cell, when random access is performed, a preamble is transmitted via uplink, and a random access response is received via downlink of the PCell. Therefore, even if a downlink bandwidth part becomes dormant or is switched to a dormant bandwidth part, there occurs no problem.

In the disclosure, when a normal bandwidth part (active BWP) of an activated cell is activated, or when a bandwidth part other than a dormant bandwidth part is activated, a UE operates as follows.

- If an indication of activating a normal bandwidth part (e.g., downlink bandwidth part) of a current cell (PCell, PSCell, or SCells) or a normal bandwidth part other than a dormant bandwidth part, or an indication of activating the cell is received via DCI (L1 control signal) of PDCCH, a MAC CE, or an RRC message, if an indication of switching a bandwidth part (e.g., downlink bandwidth part) to an active bandwidth part (or bandwidth part other than a dormant bandwidth part) is received via DCI (L1 control signal) of PDCCH, a MAC CE, or an RRC message, if an activated bandwidth part of a currently activated cell is a normal bandwidth part, or if an activated bandwidth part of a currently activated cell is not a dormant bandwidth part (if the indication is received via an L1 control signal of PDCCH, the indication may be received on PDCCH of the current cell by self-scheduling, or the indication may be received on PDCCH for the cell in the PCell by cross-carrier scheduling), one or multiple of the following operations may be performed.
- The UE performs switching and activation to the uplink or downlink bandwidth part indicated in the above. Alternatively, the UE switches the uplink or downlink bandwidth part to a designated bandwidth part (e.g., uplink or downlink first active bandwidth part), and activates the bandwidth part.
- The UE transmits a sounding reference signal (SRS) via the activated bandwidth part so as to allow a base station to perform uplink channel measurement. For example, transmission may be performed periodically.
- As another method, when first SRS configuration information (SRS configuration information (e.g., SRS transmission resource, cycle, or offset) for a normal bandwidth part (bandwidth part other than a dormant bandwidth part)) or second SRS configuration information (SRS configuration information (e.g., SRS transmission resource, cycle, or offset) for a dormant bandwidth part) is configured in uplink bandwidth part configuration information, the UE may facilitate scheduling or power control of a network, or may perform SRS transmission so as to enable quick re-activation of the uplink bandwidth part of the UE. For example, when the UE switches or activates a downlink bandwidth part of an activated cell to a bandwidth part (or normal bandwidth part) other than a dormant bandwidth part (when a first active bandwidth part is not a dormant bandwidth part), the UE may apply the first SRS configuration information in an uplink bandwidth part of the activated cell, and may perform SRS transmission on the basis of an SRS transmission resource, cycle, or offset corresponding to the first SRS configuration information. However, if the downlink bandwidth part of the activated cell is switched or activated to a dormant bandwidth part (when the first active bandwidth part is a dormant bandwidth part), the UE may apply the second SRS configuration information in the uplink bandwidth part of the activated cell, and may perform SRS transmission on the basis of an SRS transmission resource, cycle, or offset corresponding to the second SRS configuration information. For example, power saving effects in the UE may be improved in a dormant bandwidth part by configuring SRS transmission resources configured in the second SRS configuration information for a dormant bandwidth part to be much less than SRS transmission resources configured in the first SRS configuration information for a normal bandwidth part, or by configuring an SRS transmission resource cycle configured in the second SRS configuration information for a dormant bandwidth part to be much longer than an SRS transmission resource cycle configured in the first SRS configuration information for a normal bandwidth part. For example, in the second SRS configuration information, the SRS transmission cycle may be configured to 100 ms or longer. As another method, when the downlink bandwidth part is activated to the dormant bandwidth part, if the second SRS configuration information is not configured, the UE may apply the first SRS configuration information to the uplink bandwidth part, and may perform SRS transmission on the basis of an SRS transmission resource, cycle, or offset corresponding to the first SRS configuration information. Alternatively, if the downlink bandwidth part is activated to the dormant bandwidth part, if the second SRS configuration information is not configured, the UE may not perform SRS transmission.
- As another method, if the downlink bandwidth part of the activated cell is switched or activated to a bandwidth part other than a downlink dormant bandwidth part or to a normal bandwidth part (when the first active bandwidth part is not a dormant bandwidth part), the UE may switch or activate the uplink bandwidth part to a bandwidth part first activated from dormancy configured via RRC. For the bandwidth part first activated from uplink dormancy, a bandwidth part first activated from dormancy may be indicated by a bandwidth part identifier in uplink bandwidth part configuration information configured via the RRC message (e.g., in a case of FDD, unpaired spectrum, or TDD), and alternatively, the same bandwidth part identifier as that of the downlink dormant bandwidth part may be the same uplink bandwidth part identifier indicating a dormant bandwidth part (e.g., in a case of unpaired spectrum or TDD). The UE may apply the first SRS configuration information configured for the bandwidth part first activated from dormancy, and may perform SRS transmission on the basis of an SRS transmission resource, cycle, or offset corresponding to the first SRS configuration information.
- As another method, the current uplink bandwidth part or the last activated uplink bandwidth part may be activated as it is.

As another method, if a first active downlink bandwidth part is not a dormant bandwidth part,
if the cell was deactivated before reception of MAC control information indicating cell activation or deactivation, or if the cell is configured to be active in a cell configuration or configuration information via an RRC message,
the uplink bandwidth part or the downlink bandwidth part may be activated by a first active uplink bandwidth part identifier or a first active downlink bandwidth part identifier in the RRC configuration information, respectively.
As another method, if the first active downlink bandwidth part is a dormant bandwidth part,
a bandwidth part inactivity timer may be suspended.
If the cell was deactivated before reception of MAC control information indicating cell activation or deactivation, or if the cell is configured to be active in the cell configuration or configuration information via the RRC message,
the uplink bandwidth part or the downlink bandwidth part may be activated by a first active uplink bandwidth part identifier (or dormant bandwidth part identifier) or a first active downlink bandwidth part identifier (or dormant bandwidth part identifier) in the RRC configuration information, respectively. For example, if the first active downlink bandwidth part is configured to be a dormant bandwidth part, the first active uplink bandwidth part may also need to be configured to be a dormant bandwidth part.
As another method, the downlink bandwidth part may be activated to a bandwidth part indicated by a first active downlink bandwidth part identifier (or dormant bandwidth part identifier) in the RRC configuration information. The uplink bandwidth part may be activated to a bandwidth part indicated by a dormant bandwidth part identifier (or first active uplink bandwidth part identifier) in the RRC configuration information.
If PUCCH is configured for the activated bandwidth part, PUCCH transmission is performed.
For the above, a bandwidth part inactivity timer or a cell deactivation timer is started or restarted. As another method, a bandwidth part inactivity timer or a cell deactivation timer may be started or restarted only when a bandwidth part hibernation timer or a cell hibernation timer is not configured. If a bandwidth part hibernation timer or a cell hibernation timer can be configured via an RRC message, and when the timer expires, the bandwidth part or cell may be made dormant. For example, the bandwidth part inactivity timer or the cell deactivation timer may be started or restarted only in the dormant bandwidth part or cell.
If there is a suspended type 1 configuration transmission resource, a stored type 1 transmission resource may be initialized according to an original configuration so as to be used. The type 1 configuration transmission resource is a periodic transmission resource (uplink or downlink) pre-allocated via an RRC message, and refers to a transmission resource that may be activated via the RRC message so as to be used.
PHR is triggered for the bandwidth part.
In the activated bandwidth part, the UE may report a channel measurement result (CSI, CQI, PMI, RI, PTI, CRI, or the like) for downlink according to a configuration of a base station.
In the activated bandwidth part, PDCCH is monitored to read an indication of the base station.
PDCCH is monitored to read cross-scheduling for the activated bandwidth part.
A bandwidth part inactivity timer is started or restarted. As another method, a bandwidth part inactivity timer may be started or restarted only when a bandwidth part hibernation timer is not configured. If a bandwidth part hibernation timer can be configured via an RRC message, and when the timer expires, the bandwidth part may be made dormant or switched to a dormant bandwidth part. For example, the bandwidth part inactivity timer may be started or restarted only in the dormant bandwidth part.
If a bandwidth part hibernation timer is configured for the bandwidth part,
the bandwidth part hibernation timer is started or restarted for the bandwidth part.
In the disclosure, when a deactivated bandwidth part (deactivated BWP), a bandwidth part, or a cell is deactivated, a UE operates as follows.
If an indication of deactivating a bandwidth part (e.g., downlink bandwidth part) of a current cell (PCell, PSCell, or SCells) or the cell is received via DCI (L1 control signal) of PDCCH, a MAC CE, or an RRC message, an indication of deactivating a bandwidth part (e.g., downlink bandwidth part) or an indication of switching to a deactivated bandwidth part is received via DCI (L1 control signal) of PDCCH, a MAC CE, or an RRC message (if the indication is received via an L1 control signal of PDCCH, the indication may be received on PDCCH of the current cell by self-scheduling, or the indication may be received on PDCCH for the cell in the PCell by cross-carrier scheduling), a bandwidth part inactivity timer or a cell deactivation timer expires in the cell, an activated cell is deactivated, or a bandwidth part of a cell is deactivated, one or multiple of the following operations may be performed.
The uplink or downlink bandwidth part of the cell or the uplink or downlink bandwidth part indicated in the above may be deactivated.
The UE suspends a bandwidth part inactivity timer (e.g., deactivation timer for downlink bandwidth part) that is configured for or is running in the cell or bandwidth part.
A periodic downlink transmission resource (DL SPS or configured downlink assignment) or a periodic uplink transmission resource (UL SPS or configured uplink grant Type 2), configured for the cell or bandwidth part, may be cleared. The clearing of the transmission resource indicates that the UE stores configuration information, such as period information configured via an RRC message, but removes and no longer uses information on the periodic transmission resource indicated or activated via L1 signaling (e.g., DCI). The periodic transmission resource may be referred to as a type 2 configuration transmission resource. The clearing of the transmission resource may be performed only when the cell is shifted from an active state to a deactivated state. This is because, when shifting is performed from a dormant state to a deactivated state, there is no periodic transmission resource in the dormant state, and thus clearing of a periodic transmission resource is not required. As another method, only when the periodic downlink transmission resource or the periodic uplink transmission resource is configured or is configured so as to be used, the periodic transmission resources may be cleared.

The periodic uplink transmission resource (configured uplink grant Type 1 configured via RRC) configured for the cell or bandwidth part may be suspended. The suspending of the transmission resource indicates that the UE stores but no longer uses transmission resource configuration information configured via an RRC message. The periodic transmission resource may be referred to as a type 1 configuration transmission resource. The clearing of the transmission resource may be performed only when the cell is shifted from an active state to a deactivated state. This is because, when shifting is performed from a dormant state to a deactivated state, there is no periodic transmission resource in the dormant state, and thus clearing of a periodic transmission resource is not required. As another method, only when the periodic downlink transmission resource or the periodic uplink transmission resource is configured or is configured so as to be used, the periodic transmission resources may be cleared.

All HARQ buffers configured for the cell or bandwidth part are emptied.

If there is a PUSCH transmission resource configured for a periodic channel measurement report (semi-persistent CSI reporting) for the cell or bandwidth part, the PUSCH transmission resource is cleared.

the UE does not perform SRS transmission for the cell or bandwidth part.

For the cell or bandwidth part, the UE neither performs channel measurement (CSI, CQI, PMI, RI, PTI, CRI, or the like) for downlink, nor performs measurement reporting.

Uplink data is not transmitted on UL-SCH in the cell or bandwidth part.

Random access is not performed for the cell or bandwidth part.

The UE does not perform PDCCH monitoring in the cell or bandwidth part.

The UE does not perform PDCCH monitoring for the cell or bandwidth part. In addition, even in a case of cross-scheduling, PDCCH monitoring for the cell is not performed in a cell to be scheduled.

PUCCH or SPUCCH transmission is not performed in the cell or bandwidth part.

In the disclosure, an active state, a deactivated state, or a dormant state is operated, and when a cell or a bandwidth part is shifted or switched, shifting or switching is performed in bandwidth part level, where, when state shifting or switching occurs according to a bandwidth part level, a bandwidth part (downlink bandwidth part or uplink bandwidth part), for which state shifting or switching is indicated, performs state shifting or switching according to an indication. For example, if a bandwidth part (downlink bandwidth part or uplink bandwidth part) is shifted from an active state to a dormant state or is switched (activated) to a dormant bandwidth part, the bandwidth part may be shifted to a dormant state or may be switched (or activated) to a dormant bandwidth part.

In the disclosure, bandwidth part switching (BWP switching) refers to cases where: when bandwidth part switching is indicated via DCI of PDCCH, if the switching is indicated by a bandwidth part identifier during downlink assignment allocation, a downlink bandwidth part is switched to a bandwidth part indicated by the bandwidth part identifier; and when bandwidth part switching is indicated via DCI of PDCCH, if the switching is indicated by a bandwidth part identifier during UL grant allocation, an uplink bandwidth part is switched to a bandwidth part indicated by the bandwidth part identifier. Since a DCI format of PDCCH itself is different from a format (format1) for downlink assignment and a format (format0) for UL grant, even if an uplink and a downlink are not separately described, the UE may operate according to the DCI format.

The method of performing state transition according to a bandwidth part level, and the bandwidth part operations according to respective states, proposed in the disclosure, may be extended and applied to various embodiments. In the following of the disclosure, specific embodiments, in which the contents proposed in the disclosure are extended and applied, will be described.

Figure 8:
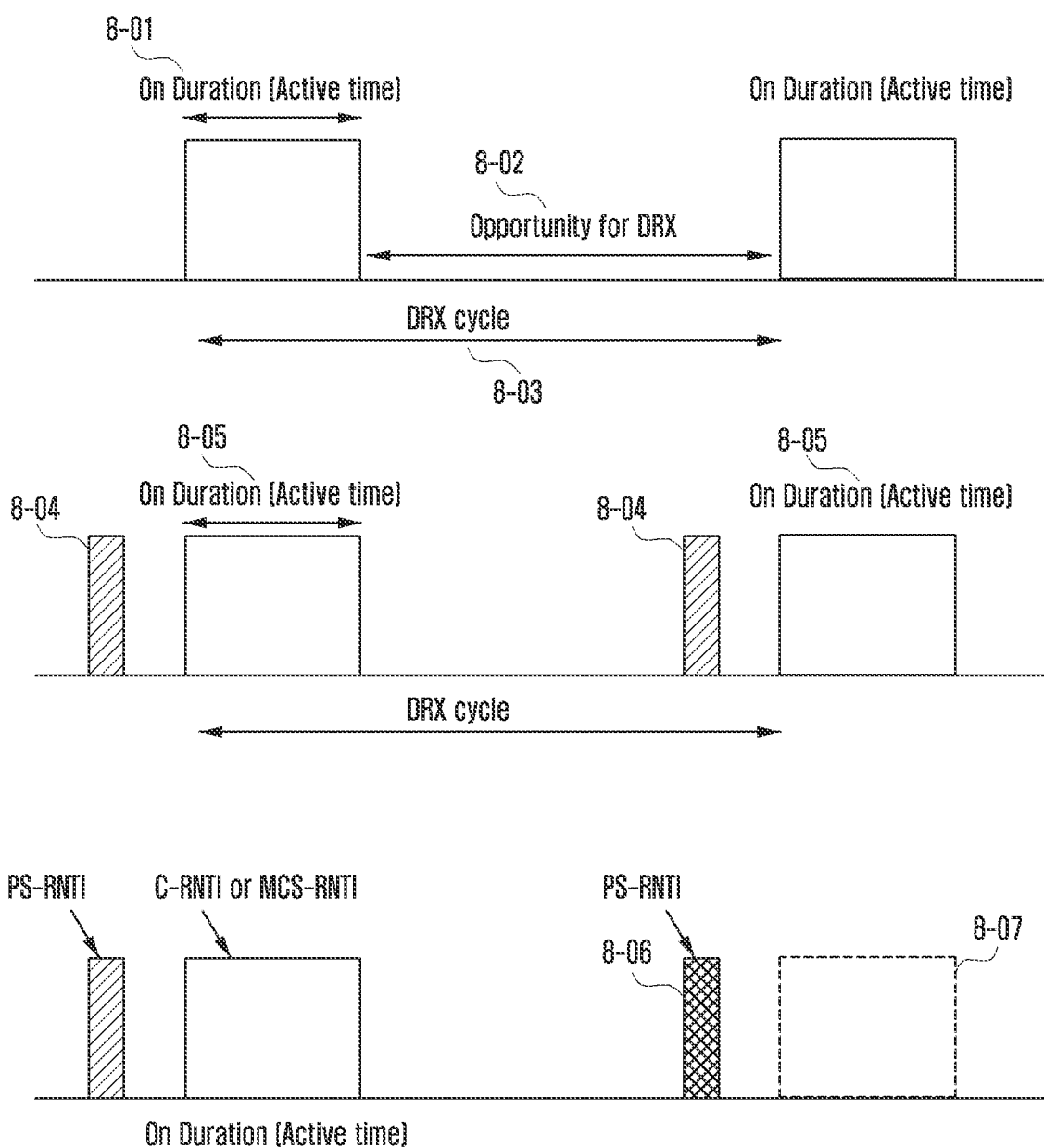
FIG. 8 is a diagram illustrating a discontinuous reception (DRX) configuration or a DRX operation method capable of saving a battery power of a UE according to an embodiment of the disclosure.

FIG. 8 is a diagram illustrating a discontinuous reception (DRX) configuration or a DRX operation method capable of saving a battery power of a UE according to an embodiment of the disclosure.

Referring to FIG. 8, a base station may configure a UE with a DRX function, such as a DRX cycle, start point, offset, or on-duration (active time), for a PCell, an SCell, or PSCell via an RRC message, as shown in FIG. 6. In the disclosure, it is considered to configure the DRX function for a PCell, an SPCell, or a PSCell.

If the DRX function is configure for a PCell (or SPCell or PSCell), the UE may apply the DRX function in consideration of a DRX cycle 8-03, a DRX start time, or an offset. When the DRX function is applied, the UE may monitor PDCCH or DCI of PDCCH, which may be received from the base station, in the PCell only in an activation time interval of DRX (on-duration or active time) 8-01. The UE may reduce battery consumption by preventing the UE from monitoring PDCCH or DCI of PDCCH outside the activation time interval of the DRX function (outside active time for an opportunity to receive DRX) 8-02.

The base station may configure a power saving function (power saving mode) for the UE via an RRC message (e.g., illustrated in FIG. 6) in order to further improve battery consumption of the UE. If the power saving function is configured together with the DRX function, the UE monitors PDCCH outside the activation time interval for a short time interval 8-04 configured via RRC before the active time 8-01, at which the UE needs to monitor PDCCH, in the DRX function, and the UE monitors and receives a wake up signal (WUS) outside the activation time interval. The base station may indicate, using a bit of DCI of PDCCH for the WUS signal, whether the UE should perform PDCCH monitoring or not at subsequent active times 8-05 and 8-07.

That is, the UE, for which the power saving function or the DRX function has been configured, may monitor a WUS signal for the short time interval 8-04 configured via an RRC message before every active time 8-05, and if a bit value of DCI of PDCCH relating to the subsequent active times 8-05 and 8-07 has 0 (or 1) in the received WUS signal, the UE may be indicated not to monitor PDCCH for the subsequent active time 8-07, or the UE may be indicated not to monitor PDCCH, by preventing a timer corresponding to the subsequent active time from operating in a MAC layer. If the bit value of DCI of PDCCH relating to the subsequent active times 8-05 and 8-07 has 1 (or 0) in the received WUS signal, the UE may be indicated to monitor PDCCH for the subsequent active time 8-05, or may be indicated to monitor PDCCH, by causing the timer corresponding to the subsequent active time to operate in the MAC layer.

The UE may not monitor a WUS signal or PDCCH for detecting a WUS signal in an activation time interval.

When monitoring a WUS signal for the short time interval 8-04 configured via an RRC message before every active time 8-05, the UE, for which the power saving function or the DRX function has been configured, may detect the signal by checking PDCCH by using a first RNTI identifier (e.g., PS-RNTI). The first RNTI identifier (e.g., PS-RNTI) may be configured for multiple UEs, and the base station may concurrently indicate 8-06, using the first RNTI identifier (e.g., PS-RNTI), to multiple UEs whether or not to perform PDCCH monitoring at a subsequent activation time interval 8-07.

When monitoring and detecting PDCCH in the active time 8-05, the UE, for which the power saving function or the DRX function has been configured, may detect a signal on the basis of a second RNTI (e.g., C-RNTI), a third RNTI (e.g., MCS-C-RNTI), or a fourth RNTI (e.g., SPS-C-RNTI or CS-RNTI) uniquely configured for the UE via an RRC message. The second RNTI (e.g., C-RNTI) may be used for indicating general UE scheduling, the third RNTI (e.g., MCS-C-RNTI) may be used for indicating a modulation and coding scheme of the UE, and the fourth RNTI (SPS-C-RNTI or CS-RNTI) may be used for indicating a periodic transmission resource of the UE.

Figure 9:
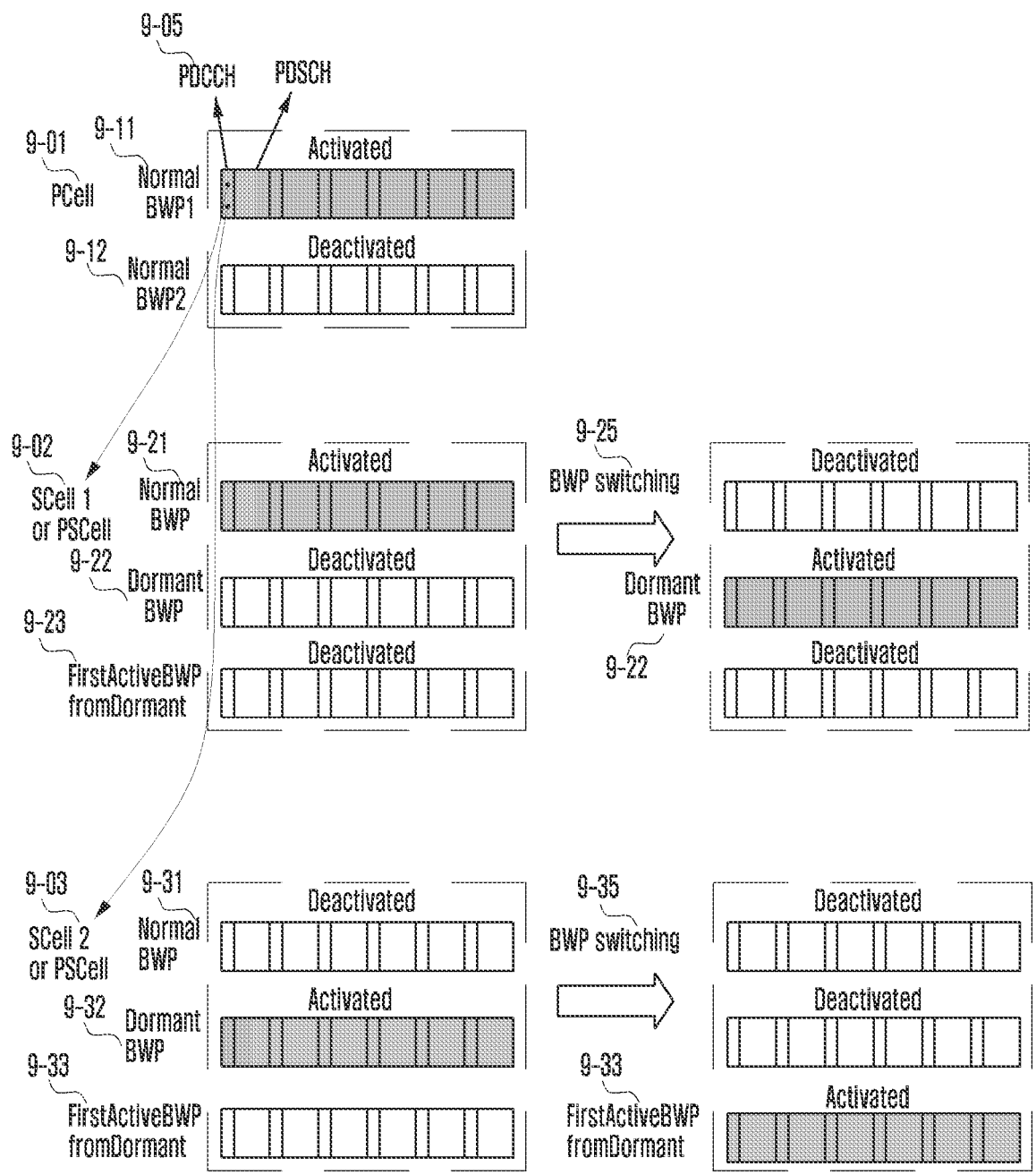
FIG. 9 is a diagram illustrating a method of operating a dormant bandwidth part in an activated SCell according to an embodiment of the disclosure.

FIG. 9 is a diagram illustrating a method of operating a dormant bandwidth part in an activated SCell according to an embodiment of the disclosure.

Referring to FIG. 6, a base station, for a UE via an RRC message, may, for carrier aggregation, configure multiple SCells, allocate respective SCell identifiers, and configure a dormant bandwidth part for each SCell, or may, for dual connectivity, configure multiple cell groups, allocate cell group identifiers, and configure or indicate a cell group suspension indicator or configure a dormant bandwidth part for each cell group or a PSCell of each cell group. The multiple SCells may be included in each SCell group so as to be configured, and each SCell group may include multiple SCells. An SCell group identifier may be allocated to each SCell group, and multiple SCell identifiers may be configured to be included in or mapped to each SCell group identifier. An SCell identifier value or an SCell group identifier value may be allocated with a predetermined bit value or may have an integer value (or natural number value). Alternatively, the PSCell of each cell group may be indicated by a cell group identifier.

Referring to FIG. 9, the base station may define a new bitmap for DCI of PDCCH transmitted in a PCell, may perform mapping to cause each bit value of the bitmap to indicate each SCell identifier value, each SCell group identifier value, a cell group (or secondary cell group) identifier, or a PSCell (or SCell) of a cell group (or secondary cell group), and may indicate, by defining each bit value, whether to perform switching to a dormant bandwidth part, whether to activate a dormant bandwidth part, or whether to suspend or resume a cell group, for an SCell corresponding to a bit, SCells belonging to an SCell group, a cell group (or secondary cell group), or a PSCell (or SCell) of a cell group (or secondary cell group). Whether to switch from a dormant bandwidth part to a normal bandwidth part (e.g., first active bandwidth part activated from dormancy) or whether to activate a normal bandwidth part (e.g., first active bandwidth part activated from dormancy) may be indicated for the SCell corresponding to the bit, the SCells belonging to the SCell group, the cell group (or secondary cell group) identifier, or the PSCell (or SCell) of the cell group (or secondary cell group).

Referring to FIG. 9, PCell 9-01 may include a first normal BWP 9-11 and a second normal BWP 9-12. After receiving DCI of PDCCH in a PCell 9-01, the UE may determine, while reading DCI in 9-05, the presence or absence of a bitmap including an indication (e.g., switching or activation to a dormant bandwidth part, or switching or activation to a normal bandwidth part) for bandwidth parts of SCells or SCell groups, or an indication of suspending or resuming a cell group (or secondary cell group) or a PSCell (or SCell) of a cell group (or secondary cell group). If there is the bitmap, for an SCell, SCells 9-02 and 9-03 belonging to an SCell group, a cell group (or secondary cell group), or a PSCell (or SCell) of a cell group (or secondary cell group), indicated by each bit of the bitmap, a bandwidth part may be switched or activated, or the cell group may be suspended or resumed according to the bit value. For example, if the bit of the bitmap indicates a first SCell (or first SCell identifier) 9-02, a cell group (or secondary cell group), or a PSCell (or SCell) of a cell group (or secondary cell group), or indicates a SCell group including the first SCell (or first SCell identifier), and the bit value is 0 (or 1), the UE may, for the first SCell 9-02, the cell group (or secondary cell group), or the PSCell (or SCell) of the cell group (or secondary cell group), activate a bandwidth part 9-21 to a dormant bandwidth part 9-22, or switch a current bandwidth part to the dormant bandwidth part 9-22, or when the current bandwidth part is not a dormant bandwidth part, the UE may switch or activate 9-25 the currently activated bandwidth part 9-21 to the dormant bandwidth part 9-22, or may suspend or deactivate a cell group. As another method, power consumption of the UE may be reduced by maintaining a cell group (or secondary cell group) or a PSCell (or SCell) of a cell group (or secondary cell group) as it is, applying the second DRX configuration information or second SRS configuration information proposed in the disclosure, and performing PDCCH monitoring or SRS transmission in a long cycle.

Referring to FIG. 9, after receiving DCI of PDCCH in the PCell 9-01, the UE may determine, while reading DCI, the presence or absence of a bitmap including an indication (e.g., switching or activation to a dormant bandwidth part, or switching or activation to a normal bandwidth part) for bandwidth parts of SCells or SCell groups, an indication for a bandwidth part of a cell group (or secondary cell group) or a bandwidth part of a PSCell (or SCell) of a cell group (or secondary cell group), or an indication of suspending or resuming the cell group. If there is the bitmap, for an SCell, SCells 9-02 and 9-03 belonging to an SCell group, a cell group (or secondary cell group), or a PSCell (or SCell) of a cell group (or secondary cell group), indicated by each bit of the bitmap, a bandwidth part may be switched or activated, or the cell group may be suspended or resumed according to the bit value. For example, when the bit of the bitmap indicates a second SCell (or second SCell identifier) 9-03 or indicates an SCell group (or SCell group identifier) including the second SCell, a cell group (or secondary cell group), or a PSCell (or SCell) of a cell group (or secondary cell group), and the bit value is 1 (or 0), if a currently activated bandwidth part of the second SCell 9-03 is a dormant bandwidth part 9-32, if the currently activated bandwidth part is not a normal bandwidth part, or if the current bandwidth part (or cell) is activated and the current bandwidth part is activated to the dormant bandwidth part 9-32 (or activated to a bandwidth part other than a normal bandwidth part), the UE may switch or activate 9-35 the bandwidth part of the second SCell 9-03 to a bandwidth part 9-33 (e.g., first active bandwidth part activated from dormancy) configured via an RRC message or may resume or activate the cell group. When, due to the bit value of 1 (or 0), the SCell, the SCells belonging to an SCell group, the cell group (or secondary cell group), or the PSCell (or SCell) of the cell group (or secondary cell group), indicated by the bit, should be switched or activated to a bandwidth part other than a dormant bandwidth part, or the cell group should be resumed, if the SCell is deactivated or if the SCell is activated and an activated bandwidth part is not a dormant bandwidth part (or is a normal bandwidth part), then the bit value may not be applied (or may be disregarded or may not be read) for the SCell or each of the SCells belonging to the SCell group, or if the cell group (or secondary cell group) or the PSCell (or SCell) of the cell group (or secondary cell group) has already been active or resumed, then the bit value may not be applied (or may be disregarded or may not be read). When, due to the bit value of 0 (or 1), the SCell, the SCells belonging to an SCell group, the cell group (or secondary cell group), or the PSCell (or SCell) of the cell group (or secondary cell group), indicated by the bit) should be switched or activated to a dormant bandwidth part, or the cell group should be resumed, if the SCell is active and an activated bandwidth part is a dormant bandwidth part, then the bit value may not be applied (or may be disregarded or may not be read) for the SCell or each of the SCells belonging to the SCell group, or if the cell group (or secondary cell group) or the PSCell (or SCell) of the cell group (or secondary cell group) has already been suspended or deactivated, then the bit value may not be applied (or may be disregarded or may not be read).

Figure 10:
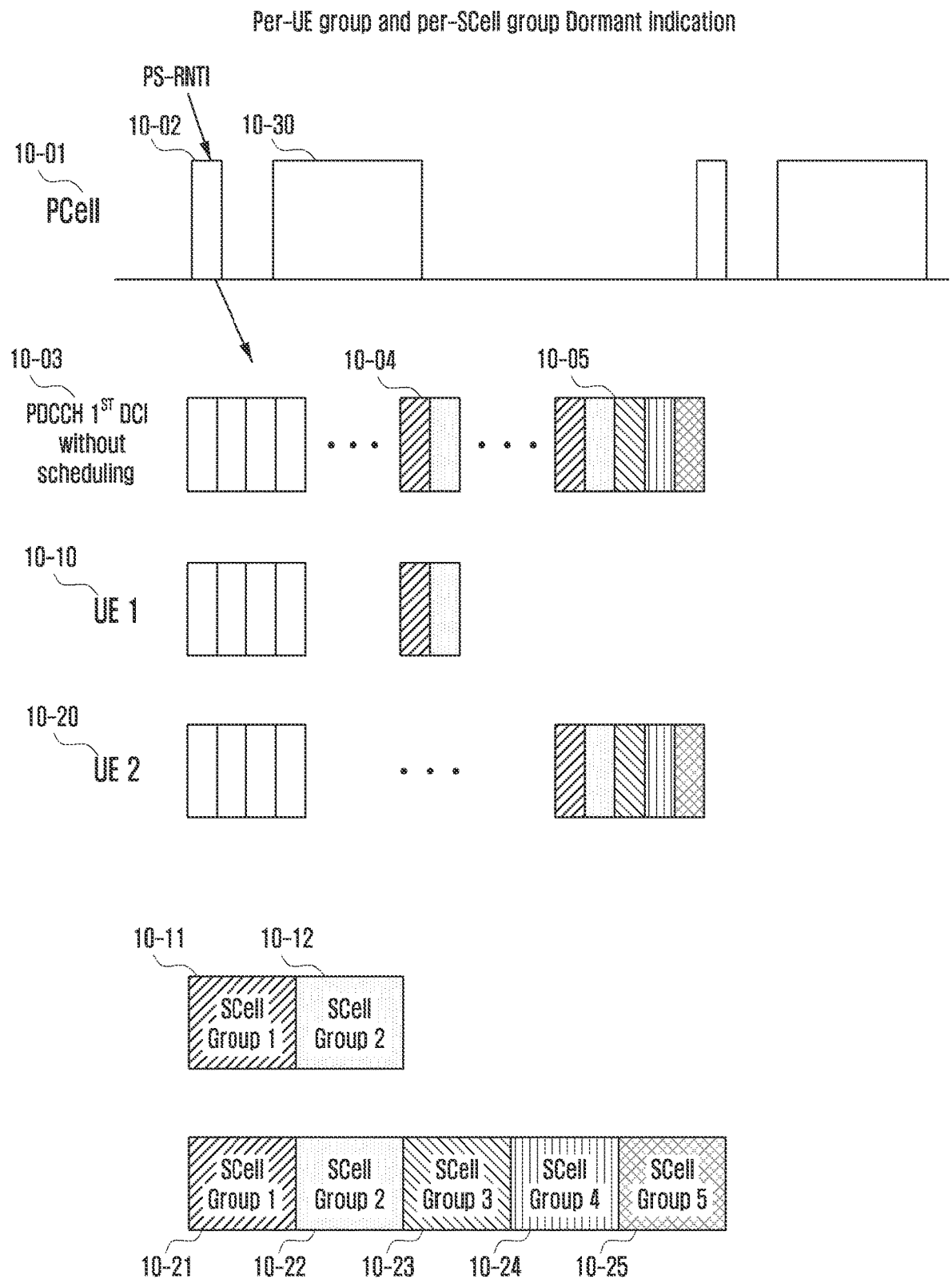
FIG. 10 is a diagram illustrating a first embodiment realizing the method of operating a dormant bandwidth part in an activated SCell, described with reference to FIG. 9 according to an embodiment of the disclosure.

FIG. 10 is a diagram illustrating a first embodiment realizing the method of operating a dormant bandwidth part in an activated SCell, described with reference to FIG. 9 according to an embodiment of the disclosure.

In the first embodiment, referring to FIG. 6, a base station may, for carrier aggregation, configure multiple SCells for a UE via an RRC message, allocate respective SCell identifiers, configure dormant bandwidth parts for the respective SCells, and may not configure bandwidth parts for some SCells, or the base station may, for dual connectivity, configure one or multiple cell groups and configure cell group identifiers or cell group states respectively, or may configure a dormant bandwidth part for a PSCell (or SCell) of each cell group, and may not configure a dormant bandwidth part for some cells. The multiple SCells may be included in each SCell group so as to be configured, and each SCell group may include multiple SCells. An SCell group identifier may be allocated to each SCell group, and multiple SCell identifiers may be configured to be included in or mapped to each SCell group identifier. An SCell identifier value, an SCell group identifier value, or a cell group (or secondary cell group) identifier may be allocated with a predetermined bit value or may have an integer value (or natural number value). SCell groups or SCell group identifiers configured for or to apply the first embodiment may be indicated as first SCell groups. In the first embodiment, in the first SCell groups, the UE may monitor DCI of PDCCH in a short time interval (out of active time) or a time interval outside an activation time interval, and group identifiers for application of operations indicated by bitmap values of received DCI may be indicated.

Referring to FIG. 10, a base station may configure a power saving function or a DRX function for each UE of multiple UEs via an RRC message, as shown in FIG. 6. Before an activation time interval 10-30 of a DRX cycle in a PCell 10-1 or SPCell, the base station may configure time information for a short time interval 10-02, in which a first DCI format or a WUS signal should be detected, or configuration information for the first DCI format for each UE via the RRC message, and when a UE detects the first DCI format in the short time interval 10-02 in the PCell or the SPCell, the base station may configure a location of a bitmap, including indications for the first SCell groups, in the first DCI format for each UE via the RRC message. The base station may configure a UE identifier (e.g., PS-RNTI) or a search space (searchspace) of PDCCH monitoring for detecting the first DCI format during the short time interval 10-02, for a UE via the RRC message. Since the UE does not monitor DCI of PDCCH when switching or activation is performed to a dormant bandwidth part for the SCell or PSCell, it is very inefficient for the UE to receive the DCI or bitmap of PDCCH proposed in the disclosure in an SCell rather than a PCell or SPCell. Therefore, it is proposed to monitor DCI of PDCCH proposed in the disclosure in a PCell or SPCell.

For example, the base station may configure the power saving function or the DRX function for multiple UEs as in the above, may transmit the first DCI format in a PDCCH transmission resource in the short time interval 10-02 configured before a subsequent activation time interval 10-03 of the DRX cycle configured for the UEs, and the first DCI format may include bitmaps 10-04 and 10-05 including indication information for dormant bandwidth parts for the first SCell groups configured for each UE of the multiple UEs, or an indication of suspension or resumption of a cell group (or secondary cell group) or a PSCell (or SCell) of a cell group (or secondary cell group).

As described above, a first UE 10-10, to which information configured via the RRC message has been applied, may perform PDCCH monitoring and may detect the first DCI format from the base station in the search space, on the basis of a PS-RNTI that is an identifier configured in the short time interval 10-02 configured before the subsequent activation time interval 10-30 of the DRX cycle. If the first DCI format 10-03 is detected, the first UE may read, from the first DCI format 10-03 via time information or location information configured in the RRC message, the bitmap 10-04 including indication information for dormant bandwidth parts for the first SCell groups of the first UE, cell group (or secondary cell group), or PSCell (or SCell) of the cell group (or secondary cell group), or information indicating suspension or resumption of the cell group (or secondary cell group) or the PSCell (or SCell) of the cell group (or secondary cell group). The length of the bitmap may be configured to be equal to the number of the first SCell groups, cell groups (or secondary cell groups), or PSCells (or SCells) of the cell groups (or secondary cell groups) configured for the first UE, and may be configured to be a maximum predetermined number (e.g., five). Each bit value of the bitmap may be mapped with each first SCell group in ascending order of SCell group identifier values of the respective first SCell groups configured for the first UE from the right bit (e.g., from least significant bit (LSB)) of the bitmap, so as to be indicated. As another method, each bit value of the bitmap may be mapped with each first SCell group in descending order of SCell group identifier values of the respective first SCell groups configured for the first UE from the right bit (e.g., from least significant bit (LSB)) of the bitmap, so as to be indicated. As another method, each bit value of the bitmap may be mapped with each first SCell group in ascending order of SCell group identifier values of the respective first SCell groups configured for the first UE from the left bit (e.g., from most significant bit (MSB)) of the bitmap, so as to be indicated. As another method, each bit value of the bitmap may be mapped with each first SCell group in descending order of SCell group identifier values of the respective first SCell groups configured for the first UE from the left bit (e.g., from most significant bit (MSB)) of the bitmap, so as to be indicated. A new bit is defined in the first DCI format of PDCCH, and the new bit may be used as information indicating suspension or resumption of the cell group (or secondary cell group) or the PSCell (or SCell) of the cell group (or secondary cell group).

A second UE 10-20 may perform PDCCH monitoring and may detect the first DCI format from the base station in the search space, on the basis of a PS-RNTI that is an identifier configured in the short time interval 10-02 configured before the subsequent activation time interval 10-30 of the DRX cycle. If the first DCI format 10-03 is detected, the first UE may read, from the first DCI format 10-03 via time information or location information configured in the RRC message, the bitmap 10-05.

If bit values of bitmaps 10-11 and 10-12 are 0, the bit value of 0 may indicate to perform switching or activation to a dormant bandwidth part for each activated SCell (if a dormant bandwidth part is configured) among SCells included in a first SCell group corresponding to the bit. As another method, if the bit value of the bitmap is 0, the UE may indicate, according to the bit value of 0, to perform switching or activation to a dormant bandwidth part if an activated bandwidth part is not a dormant bandwidth part (or is a normal bandwidth part) for each activated SCell among SCells included in the first SCell group corresponding to the bit.

When the bit value of the bitmap is 1, the bit value of 1 may indicate to perform switching or activation to a normal bandwidth part (e.g., first active bandwidth part activated from dormancy) for each activated SCell among SCells included in the first SCell group corresponding to the bit. As another method, when the bit value of the bitmap is 1, the UE may indicate, according to the bit value of 1, to perform switching or activation to a normal bandwidth part (e.g., first active bandwidth part activated from dormancy) if a current or activated bandwidth part is a dormant bandwidth part (or is not a normal bandwidth part) for each activated SCell among SCells included in the first SCell group corresponding to the bit, and otherwise (if a current or activated bandwidth part is not a dormant bandwidth part (or is a normal bandwidth part) for each activated SCell among SCells included in the first SCell group corresponding to the bit), the UE may maintain (or continue to use, apply, or activate) the current active bandwidth part as it is. As another method, when the bit value of the bitmap is 1, the UE may indicate, according to the bit value of 1, to perform switching or activation from a dormant bandwidth part to a normal bandwidth part (e.g., first active bandwidth part activated from dormancy) for each activated SCell among SCells included in the first SCell group corresponding to the bit, or may indicate to maintain (or continue to use, apply, or activate) the current active bandwidth part as it is.

After receiving DCI of PDCCH in the PCell, the UE may determine, while reading DCI, the presence or absence of a bitmap including an indication for a bandwidth part of a cell group (or secondary cell group) or a bandwidth part of a PSCell (or SCell) of a cell group (or secondary cell group), or an indication of suspending or resuming the cell group. If there is the bitmap, for a cell group (or secondary cell group) or a PSCell (or SCell) of a cell group (or secondary cell group), indicated by each bit of the bitmap, a bandwidth part may be switched or activated, or the cell group may be suspended or resumed according to the bit value. For example, if the bit of the bitmap indicates a cell group (or secondary cell group) or a PSCell (or SCell) of a cell group (or secondary cell group), and the bit value is 1 (or 0), the UE may resume or activate the cell group. When, due to the bit value of 1 (or 0), the cell group (or secondary cell group) or the PSCell (or SCell) of the cell group (or secondary cell group), indicated by the bit, should be switched or activated to a bandwidth part other than a dormant bandwidth part, or when the cell group should be resumed, if the cell group (or secondary cell group) or the PSCell (or SCell) of the cell group (or secondary cell group) has already been resumed, the bit value may not be applied (or may be disregarded or may not be read). For example, if the bit of the bitmap indicates a cell group (or secondary cell group) or a PSCell (or SCell) of a cell group (or secondary cell group), and the bit value is 0 (or 1), the UE may switch or activate a bandwidth part of the cell group (or secondary cell group) or a bandwidth part of the PSCell (or SCell) of the cell group (or secondary cell group) to a dormant bandwidth part, or may suspend or deactivate the cell group. When, due to the bit value of 0 (or 1), the cell group (or secondary cell group) or the PSCell (or SCell) of the cell group (or secondary cell group), indicated by the bit, should be switched or activated to a dormant bandwidth part, or the cell group should be resumed, if the SCell is active and an activated bandwidth part is a dormant bandwidth part, then the bit value may not be applied (or may be disregarded or may not be read) for the SCell or each of the SCells belonging to the SCell group, or if the cell group (or secondary cell group) or the PSCell (or SCell) of the cell group (or secondary cell group) has already been suspended or deactivated, then the bit value may not be applied (or may be disregarded or may not be read).

The first embodiment operates as described above, the first DCI format of PDCCH proposed in the first embodiment may be used in the short time interval, and the UE is not accompanied by a downlink transmission resource (e.g., PDSCH) or an uplink transmission resource (e.g., PUSCH). Accordingly, in the first embodiment, the UE may receive the first DCI format of PDCCH, and may not transmit ACK or NACK information (e.g., HARQ ACK or NACK) in response thereto.

Figure 11:
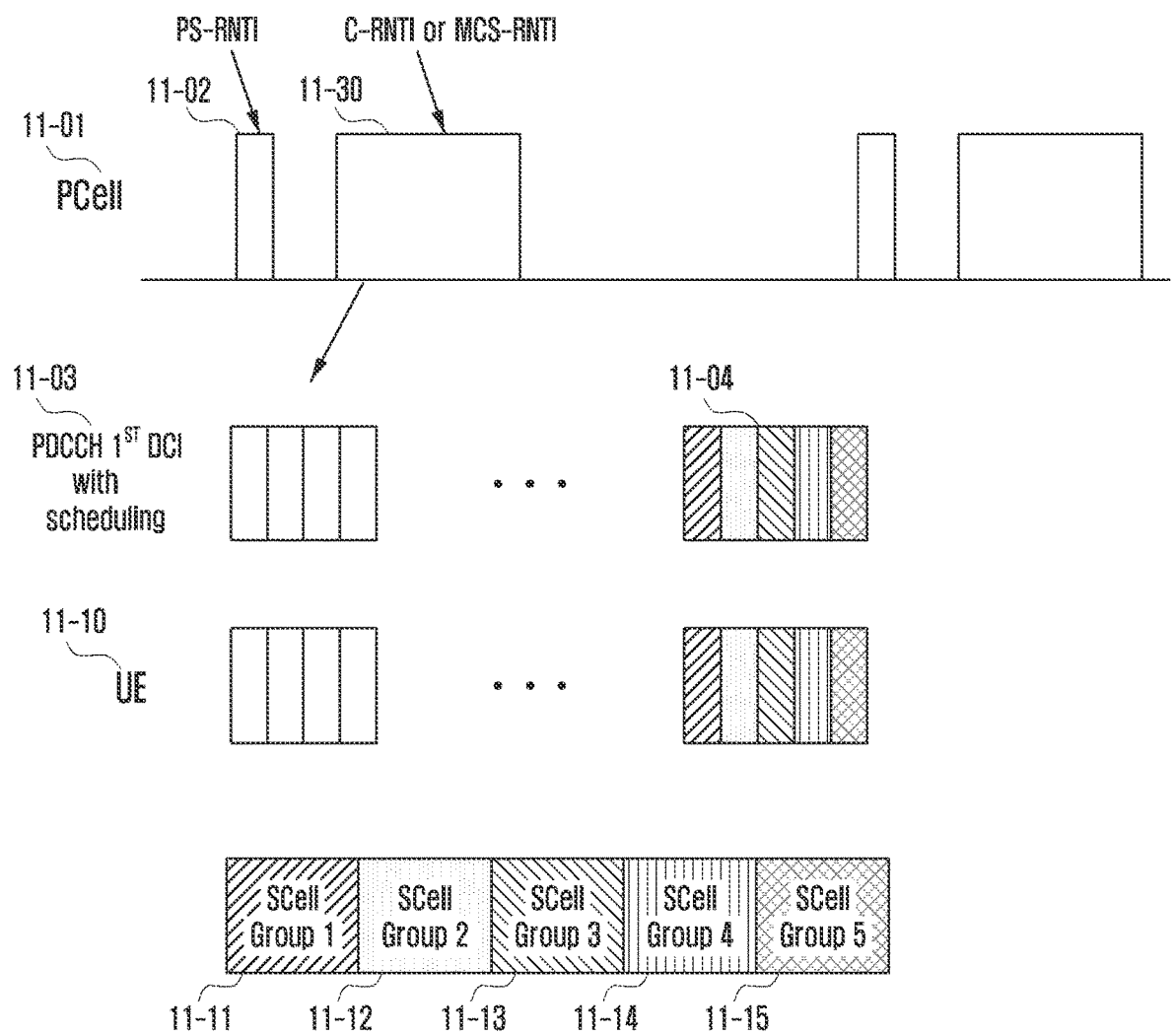
FIG. 11 is a diagram illustrating a second embodiment realizing the method of operating a dormant bandwidth part in an activated SCell, described with reference to FIG. 9 according to an embodiment of the disclosure.

FIG. 11 is a diagram illustrating a second embodiment realizing the method of operating a dormant bandwidth part in an activated SCell, described with reference to FIG. 9 according to an embodiment of the disclosure.

In the second embodiment, referring to FIG. 6, a base station may, for carrier aggregation, configure multiple SCells for a UE via an RRC message, and allocate respective SCell identifiers, or the base station may, for dual connectivity, configure one or multiple cell groups and configure cell group identifiers or cell group states respectively, or may configure a dormant bandwidth part for a PSCell (or SCell) of each cell group, and may not configure a dormant bandwidth part for some cells. A dormant bandwidth part may be configured for each cell, and a bandwidth part may not be configured for some cells. The multiple SCells may be included in each SCell group so as to be configured, and each SCell group may include multiple SCells. An SCell group identifier may be allocated to each SCell group, and multiple SCell identifiers may be configured to be included in or mapped to each SCell group identifier. An SCell identifier value, an SCell group identifier value, or a cell group (or secondary cell group) identifier may be allocated with a predetermined bit value or may have an integer value (or a natural number value). SCell groups or SCell group identifiers configured for or to apply the second embodiment may be indicated as second SCell groups. In the second embodiment, in the second SCell groups, the UE may monitor DCI of PDCCH in an activation time interval (within active time), and group identifiers for application of operations indicated by bitmap values of received DCI may be indicated.

Referring to FIG. 11, a base station may configure a power saving function or a DRX function for a UE via an RRC message, as shown in FIG. 6. Configuration information for a second DCI format (e.g., DCI format 0_1 or DCI format 1_1) that the UE should detect in an activation time interval 11-30 of a DRX cycle for a PCell 11-01 or SPCell may be configured via the RRC message. When the UE detects the second DCI format in the PCell or SpCell, the UE may determine whether the second DCI format includes a bitmap including an indication for second SCell groups for the UE. The base station may configure, for the UE via the RRC message, a UE identifier 11-02 (e.g., C-RNTI, MCS-C-RNTI, or SPS-C-RNTI (or CS-RNTI)) or a search space (searchspace) of PDCCH monitoring for detecting the second DCI format in the activation time interval 11-30. Since the UE does not monitor DCI of PDCCH when switching or activation is performed to a dormant bandwidth part for the SCell or PSCell, it is very inefficient for the UE to receive the DCI or bitmap of PDCCH proposed in the disclosure in an SCell rather than a PCell or SPCell. Therefore it is proposed to monitor DCI of PDCCH proposed in the disclosure in a PCell or SPCell.

For example, the base station may transmit 11-03 the second DCI format in a transmission resource of PDCCH of the activation time interval 11-30 in the PCell or SPCell as described above, and the second DCI format may include a bitmap 11-04 including indication information for dormant bandwidth parts for the second SCell groups configured for the UE or an indication of suspension or resumption of a cell group (or secondary cell group) or a PSCell (or SCell) of a cell group (or secondary cell group).

As described above, a first UE 11-10, to which information configured via the RRC message has been applied, may perform PDCCH monitoring and may detect 11-03 the second DCI format from the base station in the search space, on the basis of a UE identifier (e.g., C-RNTI, MCS-C-RNTI, or SPS-C-RNTI (or CS-RNTI)) that is an identifier configured in the activation time interval 11-30 of the DRX cycle. If the second DCI format 11-03 is detected, the first UE may read, from the second DCI format 11-03, the bitmap 11-04 including indication information for dormant bandwidth parts for the second SCell groups of the first UE, cell group (or secondary cell group), or PSCell (or SCell) of the cell group (or secondary cell group), or information indicating suspension or resumption of the cell group (or secondary cell group) or the PSCell (or SCell) of the cell group (or secondary cell group). The length of the bitmap may be configured to be equal to the number of the second SCell groups, cell groups (or secondary cell groups), or PSCells (or SCells) of the cell groups (or secondary cell groups) configured for the first UE, and may be configured to be a maximum predetermined number (e.g., five). Each bit value of the bitmap may be mapped with each second SCell group in ascending order of SCell group identifier values of the respective second SCell groups configured for the first UE from the right bit (e.g., from least significant bit (LSB)) of the bitmap, so as to be indicated. As another method, each bit value of the bitmap may be mapped with each second SCell group in descending order of SCell group identifier values of the respective second SCell groups configured for the first UE from the right bit (e.g., from least significant bit (LSB)) of the bitmap, so as to be indicated. As another method, each bit value of the bitmap may be mapped with each second SCell group in ascending order of SCell group identifier values of the respective second SCell groups configured for the first UE from the left bit (e.g., from most significant bit (MSB)) of the bitmap, so as to be indicated. As another method, each bit value of the bitmap may be mapped with each second SCell group in descending order of SCell group identifier values of the respective second SCell groups configured for the first UE from the left bit (e.g., from most significant bit (MSB)) of the bitmap, so as to be indicated. A new bit is defined in the second DCI format of PDCCH, and the new bit may be used as information indicating suspension or resumption of the cell group (or secondary cell group) or the PSCell (or SCell) of the cell group (or secondary cell group).

If bit values of bitmaps 11-11, 11-12, 11-13, 11-14, or 11-15 is 0, the bit value of 0 may indicate to perform switching or activation to a dormant bandwidth part for each activated SCell (if a dormant bandwidth part is configured) among SCells included in a second SCell group corresponding to the bit. As another method, if the bit value of the bitmap is 0, the UE may indicate, according to the bit value of 0, to perform switching or activation to a dormant bandwidth part if an activated bandwidth part is not a dormant bandwidth part (or is a normal bandwidth part) for each activated SCell among SCells included in the second SCell group corresponding to the bit.

When the bit value of the bitmap is 1, the bit value of 1 may indicate to perform switching or activation to a normal bandwidth part (e.g., first active bandwidth part activated from dormancy) for each activated SCell among SCells included in the second SCell group corresponding to the bit. As another method, when the bit value of the bitmap is 1, the UE may indicate, according to the bit value of 1, to perform switching or activation to a normal bandwidth part (e.g., first active bandwidth part activated from dormancy) if a current or activated bandwidth part is a dormant bandwidth part (or is not a normal bandwidth part) for each activated SCell among SCells included in the second SCell group corresponding to the bit, and otherwise (if a current or activated bandwidth part is not a dormant bandwidth part (or is a normal bandwidth part) for each activated SCell among SCells included in the second SCell group corresponding to the bit), the UE may maintain (or continue to use, apply, or activate) the current active bandwidth part as it is. As another method, when the bit value of the bitmap is 1, the UE may indicate, according to the bit value of 1, to perform switching or activation from a dormant bandwidth part to a normal bandwidth part (e.g., first active bandwidth part activated from dormancy) for each activated SCell among SCells included in the second SCell group corresponding to the bit, or may indicate to maintain (or continue to use, apply, or activate) the current active bandwidth part as it is.

After receiving DCI of PDCCH in the PCell, the UE may determine, while reading DCI, the presence or absence of a bitmap including an indication for a bandwidth part of a cell group (or secondary cell group) or a bandwidth part of a PSCell (or SCell) of a cell group (or secondary cell group), or an indication of suspending or resuming the cell group. If there is the bitmap, for a cell group (or secondary cell group) or a PSCell (or SCell) of a cell group (or secondary cell group), indicated by each bit of the bitmap, a bandwidth part may be switched or activated, or the cell group may be suspended or resumed according to the bit value. For example, if the bit of the bitmap indicates a cell group (or secondary cell group) or a PSCell (or SCell) of a cell group (or secondary cell group), and the bit value is 1 (or 0), the UE may resume or activate the cell group. When, due to the bit value of 1 (or 0), the cell group (or secondary cell group)

or the PSCell (or SCell) of the cell group (or secondary cell group), indicated by the bit, should be switched or activated to a bandwidth part other than a dormant bandwidth part, or when the cell group should be resumed, if the cell group (or secondary cell group) or the PSCell (or SCell) of the cell group (or secondary cell group) has already been resumed, the bit value may not be applied (or may be disregarded or may not be read). For example, if the bit of the bitmap indicates a cell group (or secondary cell group) or a PSCell (or SCell) of a cell group (or secondary cell group), and the bit value is 0 (or 1), the UE may switch or activate a bandwidth part of the cell group (or secondary cell group) or a bandwidth part of the PSCell (or SCell) of the cell group (or secondary cell group) to a dormant bandwidth part, or may suspend or deactivate the cell group. When, due to the bit value of 0 (or 1), the cell group (or secondary cell group) or the PSCell (or SCell) of the cell group (or secondary cell group), indicated by the bit, should be switched or activated to a dormant bandwidth part, or the cell group should be resumed, if the SCell is active and an activated bandwidth part is a dormant bandwidth part, then the bit value may not be applied (or may be disregarded or may not be read) for the SCell or each of the SCells belonging to the SCell group, or if the cell group (or secondary cell group) or the PSCell (or SCell) of the cell group (or secondary cell group) has already been suspended or deactivated, then the bit value may not be applied (or may be disregarded or may not be read).

The second embodiment operates as described above, the second DCI format of PDCCH proposed in the second embodiment may be used in the activation time interval, and the PCell of the UE also accompanies a downlink transmission resource (e.g., PDSCH) or an uplink transmission resource (e.g., PUSCH) for the SPCell. Therefore, in the second embodiment, the UE may receive the second DCI format of PDCCH, and may transmit ACK or NACK information (e.g., HARQ ACK or NACK) for scheduling information (downlink transmission resource or uplink transmission resource) of the PCell or SPCell indicated by the second DCI format, and thus the base station may determine whether the UE has successfully received an indication of the second DCI format in the second embodiment.

Referring to FIG. 6 of the disclosure, the base station may configure, for the UE, each of first SCell group configuration information applicable to the first embodiment and second SCell group configuration information applicable to the second embodiment, which are proposed in the disclosure, in the RRCSetup message 6-25, RRCResume message, or RRCReconfiguration message 6-45 of the RRC connection configuration. In the RRC message, the base station may allocate an SCell identifier to each SCell of the UE, may allocate a first SCell group identifier to each group of the first SCell groups, and may allocate a second SCell group identifier to each group of the second SCell groups. The base station may allocate first SCell group set identifiers indicating the first SCell groups and may allocate second SCell group set identifiers indicating the second SCell groups. The SCell identifiers may be included in or mapped to the first SCell groups or second SCell groups, respectively. Only when a dormant bandwidth part (e.g., downlink dormant bandwidth part) is configured for an SCell, the base station may configure the SCell or an SCell identifier to be included in or mapped to the first SCell groups or the second SCell groups.

Figure 12:
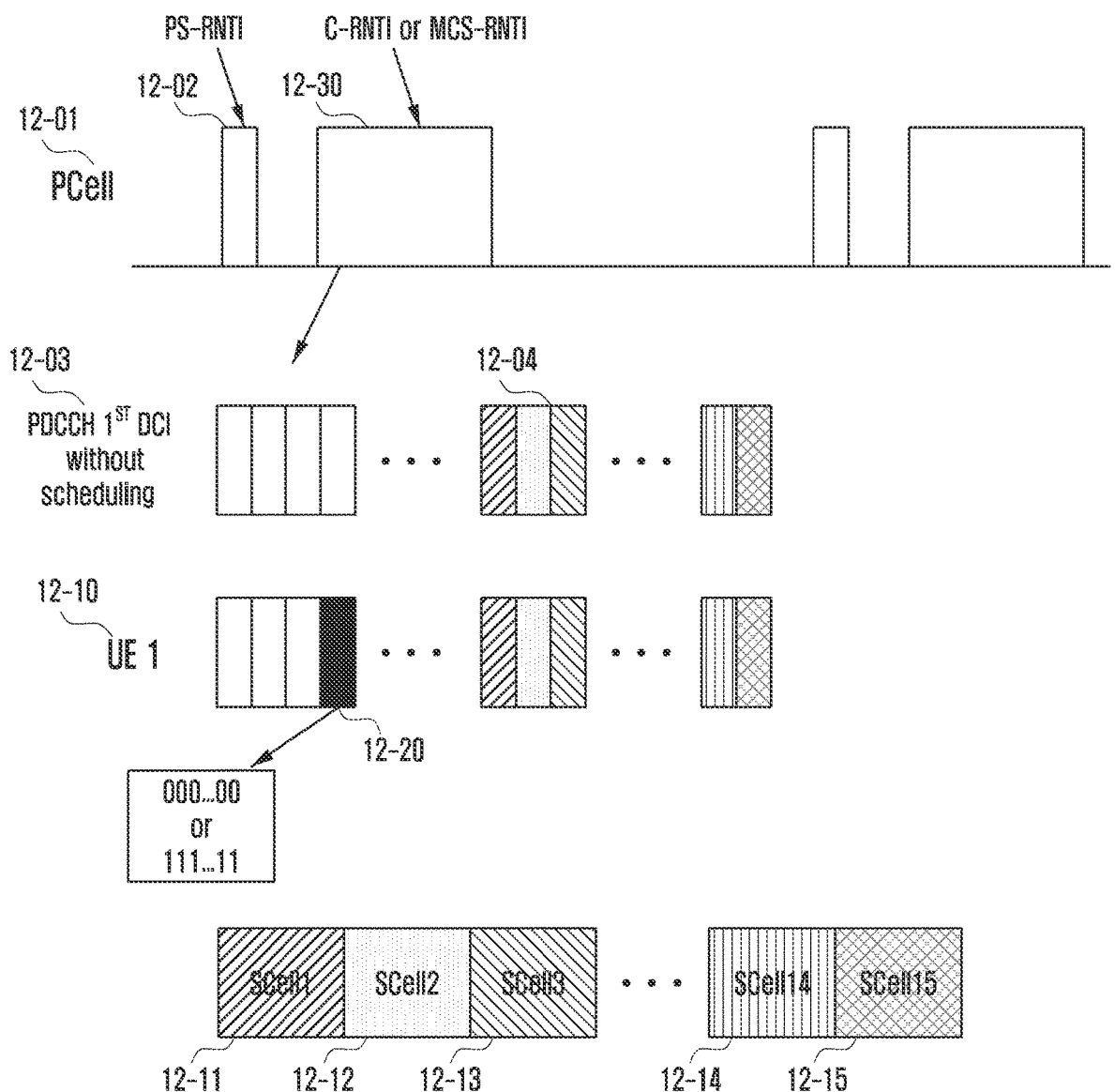
FIG. 12 is a diagram illustrating a third embodiment realizing the method of operating a dormant bandwidth part in an activated SCell, described with reference to FIG. 9 according to an embodiment of the disclosure.

FIG. 12 is a diagram illustrating a third embodiment realizing the method of operating a dormant bandwidth part in an activated SCell, described with reference to FIG. 9 according to an embodiment of the disclosure.

In the third embodiment, referring to FIG. 6, a base station may, for carrier aggregation, configure multiple SCells for a UE via an RRC message, allocate respective SCell identifiers, configure dormant bandwidth parts for the respective SCells, and may not configure bandwidth parts for some SCells, or the base station may, for dual connectivity, configure one or multiple cell groups and configure cell group identifiers or cell group state identifiers respectively, or may configure a dormant bandwidth part for a PSCell (or SCell) of each cell group, and may not configure dormant bandwidth parts for some cells. An SCell identifier value may be allocated with a predetermined bit value or may have an integer value (or natural number value). In order to operate or apply the third embodiment, SCell identifiers or a cell group (or secondary cell group) identifier, configured in the RRC message, may be used. In the third embodiment, the SCell identifiers or the cell group (or secondary cell group) identifier may indicate that the UE monitors DCI of PDCCH in an activation time interval (within active time), and may indicate an identifier of each SCell, each SCell identifier, or a cell group (or secondary cell group) for application of operations indicated by bitmap values of received DCI.

Referring to FIG. 12, a base station may configure a power saving function or a DRX function for a UE via an RRC message, as shown in FIG. 6. Configuration information for a third DCI format (e.g., DCI format 1_1) that the UE should detect in an activation time interval 12-30 of a DRX cycle for a PCell 12-01 or SpCell may be configured via the RRC message. When the UE detects the third DCI format in the PCell or SpCell, the UE may determine whether the third DCI format includes a bitmap including an indication for each SCell, PSCell, or SCell identifier of the UE.

The third DCI format may include a transmission resource type (resourceAllocation) field, a field for frequency transmission resource allocation (frequency domain resource assignment), a modulation and coding scheme (MCS) field, a new data indicator (NDI) field, a redundancy version (RV) field, an HARQ process number field, an antenna port field, a DMRS sequence initialization (DMRS SI) field, or the like.

In the detected third DCI format, if a type indicated by the transmission resource type field (e.g., resource Allocation) is a first type (e.g., resourceAllocationType0), and all bits of the field for frequency transmission resource allocation are 0 or a specific value, or if a type indicated by the transmission resource type field (e.g., resourceAllocation) is a second type (e.g., resourceAllocationType1), and all bits of the field for frequency transmission resource allocation are 1 or a specific value, the UE may not interpret subsequently located bits or fields as the modulation and coding scheme (MCS) field, the new data indicator (NDI) field, the redundancy version (RV) field, the HARQ process number field, the antenna port field, or the DMRS sequence initialization (DMRS SI) field, and the UE may perform consideration as a bitmap field, which, for each SCell or PSCell configured for the UE, indicates switching or activation to a dormant bandwidth part or indicates switching or activation from a dormant bandwidth part to a normal bandwidth part, or as bits indicating suspension or resumption of a cell group (or secondary cell group) or a PSCell (or SCell) of a cell group (or secondary cell group), may read the bitmap field and the bits, and may apply information indicated by the bitmap. However, in the detected third DCI format, if a type indicated by the transmission resource type field (e.g., resourceAllocation) is a first type (e.g., resource AllocationType0), and all bits of the field for frequency transmission resource allocation are neither 0 nor a specific value, or if a type indicated by the transmission resource type field (e.g., resource Allocation) is a second type (e.g., resourceAllocationType1), and all bits of the field for frequency transmission resource allocation are neither 1 nor a specific value, the UE may interpret subsequently located bits or fields as the modulation and coding scheme (MCS) field, the new data indicator (NDI) field, the redundancy version (RV) field, the HARQ process number field, the antenna port field, or the DMRS sequence initialization (DMRS SI) field, and may read and apply the same.

In a case where the UE has performed, when detecting a third DCI field of PDCCH, scrambling or detection with a second UE identifier (e.g., SPS-C-RNTI (or CS-RNTI)), if, in the third DCI format, a type indicated by the transmission resource type field (e.g., resourceAllocation) is a first type (e.g., resourceAllocationType0), and all bits of the field for frequency transmission resource allocation are 0, or if, in the third DCI format, a type indicated by the transmission resource type field (e.g., resourceAllocation) is a second type (e.g., resourceAllocationType1), and all bits of the field for frequency transmission resource allocation are 1, a special command to activate or clear a periodic transmission resource configured for the UE may be indicated.

Therefore, the third embodiment proposes that, only in a case where the third DCI field of PDCCH is detected by scrambling with a first UE identifier (e.g., C-RNTI or MCS-C-RNTI), if, in the third DCI format, a type indicated by the transmission resource type field (e.g., resourceAllocation) is a first type (e.g., resourceAllocationType0), and all bits of the field for frequency transmission resource allocation are 0 or a specific value, or if, in the third DCI format, a type indicated by the transmission resource type field (e.g., resource Allocation) is a second type (e.g., resourceAllocationType1), and all bits of the field for frequency transmission resource allocation are 1 or a specific value, subsequent fields may be interpreted as a bitmap indicating a dormant bandwidth part operation for each SCell of the UE or as bits indicating suspension or resumption of a cell group (or secondary cell group) or a PSCell (or SCell) of a cell group (or secondary cell group).

The base station may configure, for the UE via the RRC message, a UE identifier (e.g., C-RNTI or MCS-C-RNTI) or a search space of PDCCH monitoring for detecting the third DCI format in the activation time interval 12-30. The time information for the activation time interval 12-30 may be configured in time interval 12-02

For example, the base station may transmit 12-03 the third DCI format in a transmission resource of PDCCH of the activation time interval 12-30 in the PCell or SPCell as described above, and the third DCI format may include a bitmap 12-04 including indication information for dormant bandwidth parts for the third SCell groups configured for the UE or an indication of suspension or resumption of a cell group (or secondary cell group) or a PSCell (or SCell) of a cell group (or secondary cell group).

As described above, a first UE 12-10, to which information configured via the RRC message has been applied, may perform PDCCH monitoring and may detect 12-03 the third DCI format from the base station in the search space, on the basis of (or by scrambling with) the first UE identifier (e.g., C-RNTI or MCS-C-RNTI) that is an identifier configured in the activation time interval 12-30 of the DRX cycle. If the third DCI format 12-03 is detected, and if, in the third DCI format 12-03, a type indicated by the transmission resource type field (e.g., resourceAllocation) is a first type (e.g., resourceAllocationType0), and all bits of the field for frequency transmission resource allocation are 0, or if, in the third DCI format 12-03, a type indicated by the transmission resource type field (e.g., resourceAllocation) is a second type (e.g., resourceAllocationType1), and all bits of the field for frequency transmission resource allocation are 1 12-20, the first UE may interpret subsequent fields as a bitmap indicating a dormant bandwidth part operation for each SCell of the UE, and may read a bitmap 12-04 including indication information for dormant bandwidth parts for multiple SCells (or SCell identifiers) configured for the first UE, or bits indicating suspension or resumption of a cell group (or secondary cell group) or a PSCell (or SCell) of a cell group (or secondary cell group).

Since a length of the bitmap is interpreted by replacing the existing MCS field, NDI field, RV field, HARQ process number field, antenna port field, or DMRS SI fields when the conditions proposed above are satisfied, the length of the bitmap may have a fixed length, for example, 15 bits or 16 bits.

In the third embodiment proposed in the disclosure, in a bitmap mapping method, for example, in a first bitmap method, each bit value of the bitmap may be mapped with each SCell from the right bit (e.g., from least significant bit (LSB)) or the left bit (e.g., from most significant bit (MSB)) of the bitmap in ascending or descending order of SCell identifier values of respective SCells configured for the first UE, so as to be indicated. As another method, in the first bitmap method, each bit value of the bitmap may be mapped with each SCell from the right bit (e.g., from least significant bit (LSB)) of the bitmap in ascending order of SCell identifier values of respective SCells of a cell group (master cell group (MCG) or secondary cell group (SCG)) configured for the first UE, so as to be indicated. If the UE receives the third DCI format from the PCell, only SCells belonging to an MCG cell group may be mapped with the bitmap in ascending order of SCell identifier values. If the UE receives the third DCI format from the PSCell, only SCells belonging to an SCG cell group may be mapped with the bitmap in ascending order of SCell identifier values. The reason for limiting the mapping with the bitmap to SCells belonging to one cell group, as described above, is that the number of SCell identifiers that may be configured for one UE is 32, and the bitmap is 15 bits or 16 bits.

As another method, in the first bitmap method, each bit value of the bitmap may be mapped with each SCell from the right bit (e.g., from least significant bit (LSB)) of the bitmap in descending order of SCell identifier values of respective SCells of a cell group (master cell group (MCG) or secondary cell group (SCG)) configured for the first UE, so as to be indicated. If the UE receives the third DCI format from the PCell, only SCells belonging to an MCG cell group may be mapped with the bitmap in ascending order of SCell identifier values. If the UE receives the third DCI format from the PSCell, only SCells belonging to an SCG cell group may be mapped with the bitmap in descending order of SCell identifier values. The reason for limiting the mapping with the bitmap to SCells belonging to one cell group, as described above, is that the number of SCell identifiers that may be configured for one UE is 32, and the bitmap is 15 bits or 16 bits.

As another method, in the first bitmap method, each bit value of the bitmap may be mapped with each SCell from the left bit (e.g., from most significant bit (MSB)) of the bitmap in ascending order of SCell identifier values of respective SCells of a cell group (master cell group (MCG) or secondary cell group (SCG)) configured for the first UE, so as to be indicated. If the UE receives the third DCI format from the PCell, only SCells belonging to an MCG cell group may be mapped with the bitmap in ascending order of SCell identifier values. If the UE receives the third DCI format from the PSCell, only SCells belonging to an SCG cell group may be mapped with the bitmap in ascending order of SCell identifier values. The reason for limiting the mapping with the bitmap to SCells belonging to one cell group, as described above, is that the number of SCell identifiers that may be configured for one UE is 32, and the bitmap is 15 bits or 16 bits.

As another method, in the first bitmap method, each bit value of the bitmap may be mapped with each SCell from the left bit (e.g., from most significant bit (MSB)) of the bitmap in descending order of SCell identifier values of respective SCells of a cell group (master cell group (MCG) or secondary cell group (SCG)) configured for the first UE, so as to be indicated. If the UE receives the third DCI format from the PCell, only SCells belonging to an MCG cell group may be mapped with the bitmap in ascending order of SCell identifier values. If the UE receives the third DCI format from the PSCell, only SCells belonging to an SCG cell group may be mapped with the bitmap in descending order of SCell identifier values. The reason for limiting the mapping with the bitmap to SCells belonging to one cell group, as described above, is that the number of SCell identifiers that may be configured for one UE is 32, and the bitmap is 15 bits or 16 bits. A new bit is defined in the first DCI format of PDCCH, and the new bit may be used as information indicating suspension or resumption of the cell group (or secondary cell group) or the PSCell (or SCell) of the cell group (or secondary cell group).

If a rule of mapping from the left bit or the right bit of the bitmap is applied, the number of bitmaps that the UE should read may be reduced, thereby enabling faster UE processing.

If a bit value of the bitmap 12-11, 12-12, 12-13, 12-14, or 12-15 is 0, the bit value of 0 may indicate to perform switching or activation to a dormant bandwidth part for each activated SCell (if a dormant bandwidth part is configured, or if the SCell is included in the first SCell group or the second SCell group) corresponding to each bit. As another method, if the bit value of the bitmap is 0, the UE may indicate, according to the bit value of 0, to perform switching or activation to a dormant bandwidth part if an activated bandwidth part is not a dormant bandwidth part (or is a normal bandwidth part) for each activated SCell corresponding to the bit. If no dormant bandwidth part is configured for an activated SCell corresponding to the bit of the bitmap, the UE may disregard the bit value (or may not read or apply the bit value).

When the bit value of the bitmap is 1, the bit value of 1 may indicate to perform switching or activation to a normal bandwidth part (e.g., first active bandwidth part activated from dormancy) for each activated SCell corresponding to the bit. As another method, when the bit value of the bitmap is 1, the UE may indicate, according to the bit value of 1, to perform switching or activation to a normal bandwidth part (e.g., first active bandwidth part activated from dormancy) if a current or activated bandwidth part is a dormant bandwidth part (or is not a normal bandwidth part) for each activated SCell corresponding to the bit, and otherwise (if a current or activated bandwidth part is not a dormant bandwidth part (or is a normal bandwidth part) for each activated SCell corresponding to the bit), the UE may maintain (or continue to use, apply, or activate) the current active bandwidth part as it is. As another method, when the bit value of the bitmap is 1, the UE may indicate, according to the bit value of 1, to perform switching or activation from a dormant bandwidth part to a normal bandwidth part (e.g., first active bandwidth part activated from dormancy) for each activated SCell corresponding to the bit, or may indicate to maintain (or continue to use, apply, or activate) the current active bandwidth part as it is. If no dormant bandwidth part is configured for an activated SCell corresponding to the bit of the bitmap, the UE may disregard the bit value (or may not read or apply the bit value).

After receiving DCI of PDCCH in the PCell, the UE may determine, while reading DCI, the presence or absence of a bitmap including an indication for a bandwidth part of a cell group (or secondary cell group) or a bandwidth part of a PSCell (or SCell) of a cell group (or secondary cell group), or an indication of suspending or resuming the cell group. If there is the bitmap, for a cell group (or secondary cell group) or a PSCell (or SCell) of a cell group (or secondary cell group), indicated by each bit of the bitmap, a bandwidth part may be switched or activated, or the cell group may be suspended or resumed according to the bit value. For example, if the bit of the bitmap indicates a cell group (or secondary cell group) or a PSCell (or SCell) of the cell group (or secondary cell group), and the bit value is 1 (or 0), the UE may resume or activate the cell group. When, due to the bit value of 1 (or 0), the cell group (or secondary cell group) or the PSCell (or SCell) of the cell group (or secondary cell group), indicated by the bit, should be switched or activated to a bandwidth part other than a dormant bandwidth part, or when the cell group should be resumed, if the cell group (or secondary cell group) or the PSCell (or SCell) of the cell group (or secondary cell group) has already been resumed, the bit value may not be applied (or may be disregarded or may not be read). For example, if the bit of the bitmap indicates a cell group (or secondary cell group) or a PSCell (or SCell) of a cell group (or secondary cell group), and the bit value is 0 (or 1), the UE may switch or activate a bandwidth part of the cell group (or secondary cell group) or a bandwidth part of the PSCell (or SCell) of the cell group (or secondary cell group) to a dormant bandwidth part, or may suspend or deactivate the cell group. When, due to the bit value of 0 (or 1), the cell group (or secondary cell group) or the PSCell (or SCell) of the cell group (or secondary cell group), indicated by the bit, should be switched or activated to a dormant bandwidth part, or the cell group should be resumed, if the SCell is active and an activated bandwidth part is a dormant bandwidth part, then the bit value may not be applied (or may be disregarded or may not be read) for the SCell or each of the SCells belonging to the SCell group, or if the cell group (or secondary cell group) or the PSCell (or SCell) of the cell group (or secondary cell group) has already been suspended or deactivated, then the bit value may not be applied (or may be disregarded or may not be read).

The third embodiment operates as described above, the third DCI format of PDCCH proposed in the third embodiment may be used in the activation time interval, and the PCell of the UE also does not accompany a downlink transmission resource (e.g., PDSCH) or an uplink transmission resource (e.g., PUSCH) for the SPCell. Accordingly, in the third embodiment, the UE may receive the third DCI format of PDCCH, and may not transmit ACK or NACK information (e.g., HARQ ACK or NACK) for an indication in the third DCI format.

When the first embodiment, the second embodiment, or the third embodiment is applied, if a downlink dormant bandwidth part configured for the SCell or PSCell of the UE is not configured as a default downlink bandwidth part (default DL BWP), a bandwidth part inactivity timer for switching or shifting a dormant bandwidth part to a default bandwidth part may not be used. This is because, if the default bandwidth part is configured as a normal bandwidth part other than a dormant bandwidth part, when the timer expires, switching is automatically performed from a dormant bandwidth part to a normal bandwidth part, and thus battery consumption due to PDCCH monitoring may occur.

Figure 13:
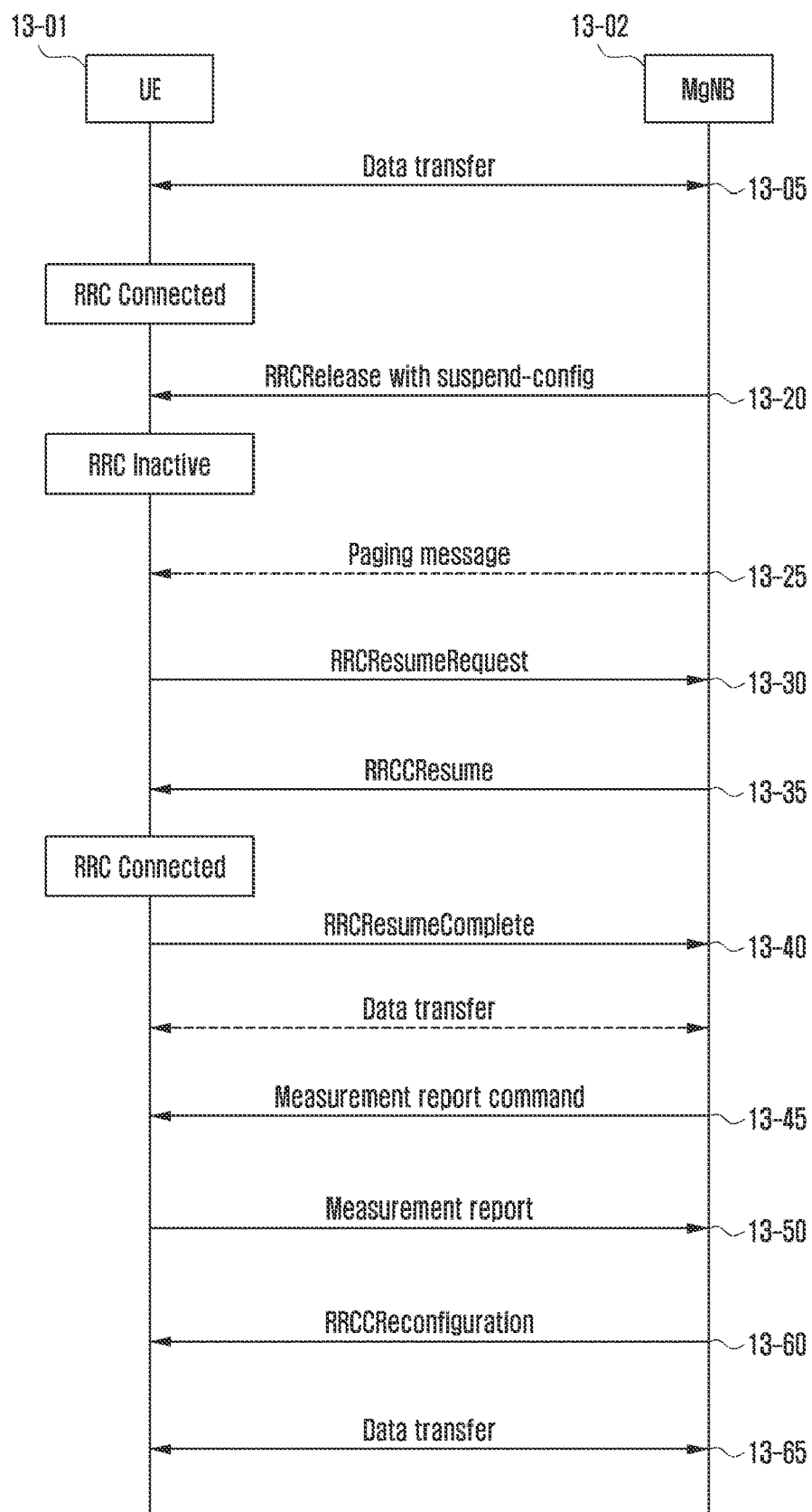
FIG. 13 is a diagram illustrating a fourth embodiment in which the first, second, or third embodiment is extended and applied to a UE in an RRC inactive mode according to an embodiment of the disclosure.

FIG. 13 is a diagram illustrating a fourth embodiment in which the first, second, or third embodiment is extended and applied to a UE in an RRC inactive mode according to an embodiment of the disclosure.

The fourth embodiment proposes that a UE continuously stores SCell configuration information (e.g., configuration information described or proposed in FIG. 6) or configuration information of a PSCell (or SCell) of a cell group (or secondary group), which is configured or stored, referring to FIG. 6, in an RRC connected mode for the first embodiment, the second embodiment, or the third embodiment, without clearing or discarding the same even if the UE shifts to an RRC inactive mode. The fourth embodiment also proposes that, when the UE in the RRC inactive mode performs RRC connection resumption, the UE determines whether to discard or clear, maintain and apply, or reconfigure the stored SCell configuration information (e.g., configuration information described or proposed in FIG. 6) or configuration information of the PSCell (or SCell) of the cell group (e.g., secondary cell group), via a reconfiguration procedure or an indicator of an RRCResume message or an RRCReconfiguration message, which is transmitted by a base station. When the base station transmits, to the UE, an RRCRelease message including an indicator or configuration for shifting the UE to the RRC inactive mode, the base station may transmit, to the UE, the message including configuration information or an indicator indicating whether to discard or clear (release), maintain and apply, or reconfigure the SCell configuration information (e.g., configuration information described or proposed in FIG. 6) or the configuration information of the PSCell (or SCell) of the cell group (e.g., secondary cell group), which is stored in the RRCRelease message. When the UE moves and performs RAN notification area (RNA) update in the RRC inactive mode, the UE may receive and apply the configuration information or the indicator indicating whether to discard or clear, maintain and apply, or reconfigure the SCell configuration information (e.g., configuration information described or proposed in FIG. 6) or the configuration information of the PSCell (or SCell) of the cell group (e.g., secondary cell group), which is stored in the RRCRelease message transmitted to the UE by the base station.

In the fourth embodiment proposed in the disclosure, the base station may allow a first active bandwidth part of downlink or uplink bandwidth part configuration information of each cell to be configured as a dormant bandwidth part, in the SCell configuration information (e.g., configuration information described or proposed in FIG. 6) or configuration information of the PSCell (or SCell) of the cell group (e.g., secondary cell group) of the RRC message, and when the UE activates each SCell, each cell group, or a PSCell of each cell group, the base station may directly enable operation, as a dormant bandwidth part, of a downlink bandwidth part or uplink bandwidth part of each SCell, each cell group, or the PSCell of each cell group, or may enable suspension or resumption of the cell group, thereby reducing battery consumption of the UE.

As another method, in the fourth embodiment proposed in the disclosure, the base station may not configure, as a dormant bandwidth part, a first active bandwidth part of downlink or uplink bandwidth part configuration information of each cell, in the SCell configuration information (e.g., configuration information described or proposed in FIG. 6) or configuration information of the PSCell (or SCell) of the cell group (e.g., secondary cell group) of the RRC message, and when the UE activates or resumes each SCell, each cell group, or a PSCell of each cell group, the base station may always cause activation of a downlink bandwidth part or uplink bandwidth part of each SCell, each cell group, or the PSCell of each cell group to a first active bandwidth part, and may enable switching or activation to a dormant bandwidth part according to the first embodiment, the second embodiment, or the third embodiment proposed in the disclosure, or may enable suspension or resumption of the cell group, thereby reducing battery consumption of the UE.

The fourth embodiment proposed above may be extended to each SCell configuration information or PSCell configuration information of a master cell group (MCG) or a secondary cell group (SCG) of the UE, for which dual connectivity has been configured, so as to be applied. That is, the SCell configuration information or PSCell configuration information of the SCG may also be stored when the UE is shifted to the RRC inactive mode, and when RRC connection resumption is performed as in the above, or when the UE is shifted to the RRC inactive mode, the base station may transmit, to the UE, configuration information or an indicator indicating whether to discard or clear, maintain and apply, or reconfigure the SCell configuration information (e.g., configuration information described or proposed in FIG. 6) or the PSCell configuration information of the MCG or SCG, stored in the RRC message (e.g., RRCResume or RRCReconfiguration or RRCRelease message).

Referring to FIG. 13, a UE 13-01 may perform network connection to a base station 13-02 and transmit or receive data 13-05 while the UE is in RRC connected mode. If, for some reason, the base station needs to shift the UE to an RRC inactive mode, the base station may transmit an RRCRelease message 13-20 to shift the UE to the RRC inactive mode. The base station may transmit, to the UE, the message including configuration information or an indicator indicating whether to discard or clear, maintain and apply, or reconfigure SCell configuration information (e.g., configuration information described or proposed in FIG. 6) of an MCG or SCG, or PSCell (or SCell) configuration information of a cell group (e.g., secondary cell group), stored in the RRC message (e.g., RRCRelease). In a case of a UE to which dual connectivity is applied, the base station may determine whether to suspend or resume master cell group bearer configuration or RRC configuration information or SCell configuration information of the MCG or SCG, and may inquire a secondary cell base station about whether or not to perform suspension or resumption and receive a respond in order to determine whether to suspend or resume secondary cell group bearer configuration and RRC configuration information. The base station may configure a list of frequencies to be measured by the UE in an RRC idle mode or an RRC inactive mode, frequency measurement configuration information, a frequency measurement period, or the like via the RRCRelease message.

The UE in the RRC inactive mode may, while moving, receive a paging message 13-25 and perform RRC connection resumption when uplink data needs to be transmitted or a RAN notification area needs to be updated.

When the UE needs to establish a connection, the UE performs random access, and when transmitting an RRCResumeRequest message 13-30 to the base station, UE operations related to transmission of the message are as follows.
1. When the UE identifies system information, and the system information indicates transmission of a complete UE connection resumption identifier (I-RNTI or full resume ID), the UE prepares to transmit the message including the stored complete UE connection resumption identifier (I-RNTI). If the system information indicates to transmit a truncated UE connection resumption identifier (truncated I-RNTI or truncated resume ID), the UE configures the stored complete UE connection resumption identifier (I-RNTI) to a truncated UE connection resumption identifier (truncated resume ID) according to a predetermined scheme, and prepares to transmit the message including the configured truncated UE connection resumption identifier.
2. The UE restores RRC connection configuration information and security context information from stored UE context.
3. The UE updates a new KgNB security corresponding to the master cell group key on the basis of a current KgNB security key, a NextHop (NH) value, and an NCC value received via the RRCRelease message so as to be stored.
4. If the UE receives an SCG-counter value (or sk-counter) via the RRCRelease message, the UE updates a new SKgNB security key corresponding to the secondary cell group on the basis of the KgNB security key and the SCG-counter (or sk-counter).
5. The UE derives new security keys (K_RRCenc, K_RRC_int, K_UPint, and K_UPenc) to be used in integrity protection and verification and in encryption and decryption, by using the newly updated KgNB security key.
6. If the UE receives the SCG-counter value (or sk-counter) via the RRCRelease message, the UE derives new security keys (SK_RRCenc, SK_RRC_int, SK_UPint, and SK_UPenc) to be used in integrity protection and verification and in encryption and decryption, by using the newly updated SKgNB security key.
7. The UE calculates MAC-I and prepares to transmit the message including the calculated MAC-I.
8. The UE resumes SRB1 (SRB1 should be resumed in advance because the RRCResume message is to be received via SRB1 in response to the RRCResumeRequest message to be transmitted).
9. The UE configures the RRCResumeRequest message and transmits the message to a lower layer.
10. The UE resumes the integrity protection and verification by applying the updated security keys and a preconfigured algorithm with respect to all bearers (MCG terminated RBs) except for SRB0 corresponding to the master cell group, and applies the integrity verification and protection to data to be transmitted and received at a later time (the resumption and application of the integrity verification and protection is to increase reliability and security on the data to be transmitted to or received from SRB1 or DRBs at a later time).
11. The UE resumes the encryption and decryption by applying the updated security keys and a preconfigured algorithm with respect to all bearers (MCG terminated RBs) except for SRB0 corresponding to the master cell group, and applies the encryption and decryption to data to be transmitted and received at a later time. (The resumption and application of the encryption and decryption is to increase reliability and security on the data to be transmitted to or received from SRB1 or DRBs at a later time.)
12. If the UE receives the SCG-counter value (or sk-counter) via the RRCRelease message, the UE resumes the integrity protection and verification by applying the updated security keys and a preconfigured algorithm with respect to all bearers (SCG terminated RBs) except for SRB0 corresponding to the secondary cell group, and applies the integrity verification and protection to data to be transmitted and received at a later time. (The resumption and application of the integrity verification and protection is to increase reliability and security on the data to be transmitted to or received from DRBs at a later time.)
13. If the UE receives the SCG-counter value (or sk-counter) via the RRCRelease message, the UE resumes the encryption and decryption by applying the updated security keys and a preconfigured algorithm with respect to all bearers (SCG terminated RBs) except for SRB0 corresponding to the secondary cell group, and applies the encryption and decryption to data to be transmitted and received at a later time. (The resumption and application of the encryption and decryption is to increase reliability and security on the data to be transmitted to or received from DRBs at a later time.)

When the UE needs to establish a connection so as to perform random access, the UE transmits an RRCResumeRequest message to the base station, and then receives an RRCResume message 13-35 in response thereto, proposed UE operations are as follows. If the RRCResume message includes an indicator indicating to report, if the UE has a valid frequency measurement result measured in the RRC inactive mode, the frequency measurement result, the UE may report the frequency measurement result configured in an RRCResumeComplete message. The base station may transmit, to the UE, the RRC message (e.g., RRCResume message) including configuration information or an indicator indicating whether to discard or clear, maintain and apply, or reconfigure the SCell configuration information (e.g., configuration information described or proposed in FIG. 6) of the MCG or SCG, stored in the UE.
1. When the message is received, the UE restores a PDCP state corresponding to the master cell group, resets a COUNT value, and re-establishes PDCP layers of all DRBs (MCG terminated RBs) and SRB2 corresponding to the master cell group.
2. If the UE receives an SCG-counter value (or sk-counter) via the message, the UE updates a new SKgNB security key corresponding to the secondary cell group on the basis of a KgNB security key and the SCG-counter (or sk-counter). The UE derives new security keys (SK_RRCenc, SK_RRC_int, SK_UPint, and SK_UPenc) to be used in integrity protection and verification and in encryption and decryption, by using the newly updated SKgNB security key corresponding to the secondary cell group.
3. If the message includes master cell group (masterCellgroup) configuration information,
A. the UE performs and applies the master cell group configuration information included the message. The master cell group information may include configuration information on RLC layers belonging to the master cell group, a logical channel identifier, a bearer identifier, and the like.

4. If the message includes bearer configuration information (radioBearerConfig),
   A. the UE performs and applies the bearer configuration information (radioBearerConfig) included in the message. The bearer configuration information (radioBearerConfig) may include configuration information on PDCP layers for respective bearers, configuration information on service data adaptation protocol (SDAP) layers, a logical channel identifier, a bearer identifier, and the like.
5. If the message includes secondary cell group (secondaryCellgroup) configuration information,
   A. the UE performs and applies the secondary cell group configuration information included the message. The secondary cell group information may include configuration information on RLC layers belonging to the secondary cell group, a logical channel identifier, a bearer identifier, and the like.
6. If the message includes secondary bearer configuration information (radioBearerConfig),
   A. the UE performs and applies the secondary bearer configuration information (radioBearerConfig) included in the message. The secondary bearer configuration information (radioBearerConfig) may include configuration information on PDCP layers for respective secondary bearers, configuration information on SDAP layers, a logical channel identifier, a bearer identifier, and the like.
7. The UE resumes all DRBs (MCG terminated RBs) and SRB2 corresponding to the master cell group.
8. If the message includes frequency measurement configuration information (measConfig),
   A. the UE performs and applies the frequency measurement configuration information included the message. That is, frequency measurement may be performed according to the configuration.
9. The UE is shifted to the RRC connected mode.
10. The UE indicates to an upper layer that the suspended RRC connection has been resumed.
11. The UE configures and transfers the RRCResumeComplete message 13-40 for transmission to a lower layer.

If the UE has UE context information and bearer configuration information for the suspended secondary cell group, the UE may perform frequency measurement on the basis of frequency configuration information configured via system information, the RRCRelease message, or the RRCResume message, and if there is a valid result, the UE may transmit the RRCResumeComplete message including an indicator so as to indicate the presence of the result. When the base station receives the indicator, if resumption of frequency carrier aggregation or dual connectivity is necessary, the base station may indicate in a measurement report command 13-45 to the UE to report a frequency measurement result and receive a frequency measurement result report, or the base station may receive the frequency measurement result report 13-50 via the RRCResumeComplete message. When the frequency measurement result is received, the base station may inquire the secondary cell base station about whether to resume bearer information for the suspended secondary cell group, and may receive a respond so as to make a determination, and the base station may provide an indication of resumption or release of bearers for the secondary cell group, by transmitting the RRCReconfiguration message 13-60 to the UE and initiate data transfer 13-65. The base station may transmit, to the UE, the RRC message (e.g., RRCReconfiguration message) including configuration information or an indicator indicating whether to discard or clear, maintain and apply, or reconfigure the SCell configuration information (e.g., configuration information described or proposed in FIG. 6) of the MCG or SCG, stored in the UE.

1> If configuration information of only one cell group (e.g., secondary cell group) can be configured for the UE (e.g., if the UE can have master cell group configuration information and configuration information of one secondary cell group), the UE may apply cell group configuration information or may apply dual connectivity according to an indicator of the RRCResume message as follows.
2> If the RRCResume message includes new cell group (e.g., secondary cell group) configuration information without an indicator for restoring the cell group, the UE may release stored cell group (e.g., secondary cell group) configuration information, may apply the cell group configuration information included in the RRCResume message, and may use dual connectivity.
2> If the RRCResume message includes an indicator for restoring the cell group and new cell group (e.g., secondary cell group) configuration information, the UE may restore the stored cell group (e.g., secondary cell group) configuration information, may add the cell group configuration information included in the RRCResume message to the existing cell group configuration information or reconfigure the cell group configuration information to the existing cell group configuration information (delta configuration), and may use dual connectivity on the basis of the added or reconfigured cell group configuration information. If the RRCResume message includes an indicator for restoring the cell group and new cell group (e.g., secondary cell group) configuration information, but the new cell group configuration information has no configuration information for a bearer or a protocol layer, the UE may restore the stored cell group (e.g., secondary cell group) configuration information and may use dual connectivity on the basis of the restored cell group configuration information.
1> If configuration information of multiple cell groups (e.g., secondary cell group) can be configured for the UE (e.g., if the UE can have master cell group configuration information and configuration information of multiple secondary cell groups), the UE may apply cell group configuration information and may apply dual connectivity according to an indicator of the RRCResume message as follows.
2> If the RRCResume message includes new cell group (e.g., secondary cell group) configuration information without an indicator for restoring the cell group, the UE may clear all the stored cell group (e.g., secondary cell group) configuration information, may apply the cell group configuration information included in the RRCResume message, and may use dual connectivity. As another method, an indicator, list, or cell group identifier for clearing the cell group may be introduced from the RRC message, so as to indicate which cell group configuration information from among the stored cell group configuration information is to be cleared or restored.
2> If the RRCResume message includes an indicator for restoring the cell group and new cell group (e.g., secondary cell group) configuration information or includes cell group identifier information or cell group state information to be restored (or to be applied, activated, or resumed), the UE may restore the cell group configuration information indicated above among the stored cell group (e.g., secondary cell group) configuration information, may add the cell group configuration information included in the RRCResume message to the existing cell group configuration information or reconfigure the cell group configuration information to the existing cell group configuration information (delta configuration), and may use dual connectivity on the basis of the added or reconfigured cell group configuration information. When the RRCResume message includes an indicator for restoring the cell group and new cell group (e.g., secondary cell group) configuration information, if the RRCResume message includes cell group identifier information or cell group state information to be restored (or to be applied, activated, or resumed), or if the new cell group configuration information has no configuration information for a bearer or a protocol layer, the UE may restore the cell group configuration information indicated above among the stored cell group (e.g., secondary cell group) configuration information, and may use dual connectivity on the basis of the restored cell group configuration information.

Referring to FIG. 13 of the disclosure, the base station may allow a first active bandwidth part of downlink or uplink bandwidth part configuration information of each cell to be configured as a dormant bandwidth part, in the SCell configuration information (e.g., configuration information described or proposed in FIG. 6) or PSCell (or SCell) configuration information of the cell group (e.g., secondary cell group) of the RRC message (e.g., RRCRelease, RRCResume, or RRCReconfiguration message), and therefore when the UE activates each SCell or a PSCell of the cell group (e.g., secondary cell group), the base station may directly enable operation, as a dormant bandwidth part, of a downlink bandwidth part or uplink bandwidth part of each SCell or PSCell, or may enable suspension or resumption of the cell group, thereby reducing battery consumption of the UE. For example, a method may be operated for each SCell or PSCell, in which, if an SCell state is configured to be active or a cell group state is configured to be active, suspended, or deactivated in SCell configuration information or cell group configuration information of the RRC message (e.g., RRCRelease, RRCResume, or RRCReconfiguration message), if an indicator for suspending or resuming the cell group is configured, or if an indication of activating the SCell is received via MAC control information proposed in the disclosure, the SCell or PSCell may be activated, resumed, or suspended, and when the SCell or PSCell is activated, a downlink bandwidth part or uplink bandwidth part of the SCell or PSCell may be directly activated to a dormant bandwidth part, thereby reducing battery consumption of the UE.

As described above, when the UE in the RRC inactive mode is shifted to the RRC connected mode, and the SCell configuration information or PSCell (or SCell) configuration information of the cell group (e.g., secondary cell group) proposed in the disclosure is restored, applied, or reconfigured, switching or activation between bandwidth parts or activation or application of a dormant bandwidth part may be performed for each activated SCell or activated PSCell (or SCell) of the cell group according to the first embodiment, second embodiment, third embodiment, or fourth embodiment proposed in the disclosure. The fourth embodiment may also be extended and applied when handover is performed.

If the UE receives an indicator for suspension, resumption, activation, or deactivation for a cell group or a PSCell of a cell group via the MAC control information proposed in the first embodiment, second information, third embodiment, or FIG. 14 proposed in the disclosure is received, a PHY layer or a MAC layer having received the indication may indicate the indication to an upper layer (e.g., MAC layer, RLC layer, PDCP layer, or RRC layer). When the upper layer receives the indication (e.g., cell group suspension, resumption, activation, or deactivation) from the lower layer, a protocol layer procedure for cell group suspension, resumption, activation, or deactivation corresponding to the indication may be performed. Alternatively, if the UE receives an indicator for suspension, resumption, activation, or deactivation for a cell group or a PSCell of a cell group via the RRC message as in the fourth embodiment, an RRC layer having received the indication may indicate the indication to a lower layer (e.g., PHY layer, MAC layer, RLC layer, of PDCP layer). When the lower layer receives the indication (e.g., cell group suspension, resumption, activation, or deactivation) from the upper layer, a protocol layer procedure for cell group suspension, resumption, activation, or deactivation corresponding to the indication may be performed.

Various embodiments may be configured and operated by uniting or extending the first embodiment, second embodiment, third embodiment, or fourth embodiment proposed in the disclosure.

FIG. 14 is a diagram illustrating medium access control (MAC) control information (MAC control element, MAC CE) indicating a state transition to an active state, a dormant state, or a deactivated state according to an embodiment of the disclosure.

The activation and deactivation MAC CE proposed in the disclosure may have the structures referring to FIG. 14 as an embodiment, and may be divided into a MAC CE structure 14-05 with a size of 1 byte supporting 7 Scells and a MAC CE structure 14-10 with a size of 4 bytes supporting 31 Scells. The activation and deactivation MAC CE has the following characteristics.

When a dormant MAC CE is not received and only active and deactivated MAC CEs are received, UE operations are as follows.

Each field of the activation and deactivation MAC CE indicates each SCell identifier, and a value corresponding to each field indicates whether to activate or deactivate the SCell. If an indicator value for an SCell indicated by an SCell identifier is 1, the SCell is activated when the SCell is deactivated. However, if the state of the SCell is other than a deactivated state, the indicator value is disregarded. If an indicator value for an SCell indicated by an SCell identifier is 0, the SCell is deactivated. That is, regardless of the state of the Scell, of the indicator value for the SCell is 0, the SCell is deactivated.

A new MAC CE may be designed or an existing MAC CE function may be extended to support the embodiments in the disclosure and extend to various embodiments.

For example, the MAC CEs proposed and described in FIG. 14 may be applied, the function described in FIG. 14 of the disclosure may be extended and applied by extending a reserved bit (R bit) in 14-05 or 14-10 in FIG. 14.

For example, when the reserved bit (e.g., R field) is configured to 0 (or 1), a 1-bit indicator (e.g., C field) indicating an identifier of each SCell may be defined and used as follows. As another method, when the reserved bit (e.g., R field) is configured to 0 (or 1), this may refer to an indication of deactivating or suspending a cell group (e.g., secondary cell group). For example, a cell, a bandwidth part, or a cell group, which has been deactivated or suspended, may be shifted to a deactivated state or remains the same, and a cell, a bandwidth part, or a cell group, which has been active (or resumed), may be shifted to a deactivated state. Indication of the identifier may be performed to an upper layer.

If the 1-bit indicator is configured to 0 (or 1), state transition for each cell (e.g., SCell, or SCell of a master or secondary cell group) or bandwidth part may be performed as follows.

A cell or a bandwidth part, which has been deactivated, is shifted to a deactivated state or remains the same.

A cell or a bandwidth part, which has been active, is shifted to a deactivated state.

If the 1-bit indicator is configured to 1, state shifting for each cell (e.g., SCell, or SCell of a master or secondary cell group) or bandwidth part may be performed as follows.

A cell or a bandwidth part, which has been active, is shifted to an active state or remains the same.

A cell or a bandwidth part, which has been deactivated, is shifted to an active state.

When the reserved bit (R bit) is configured to 1 (or 0), the 1-bit indicator indicating an identifier of each cell (SCell) may be defined and used as follows. As another method, a new logical identifier may be defined, a new MAC CE may be defined, and the new logical identifier and the new MAC CE may be defined and used as follows. As another method, when the reserved bit (e.g., R field) is configured to 1 (or 0), this may refer to an indication of activating or resuming a cell group (e.g., secondary cell group). For example, a cell, a bandwidth part, or a cell group, which has been active or resumed, may be shifted to an active state or remains the same, and a cell, a bandwidth part, or a cell group, which has been deactivated (or suspended), may be shifted to an active state. Indication of the identifier may be performed to an upper layer.

If the 1-bit indicator is configured to 0 (or 1), state transition for each cell (e.g., SCell, or SCell of a master or secondary cell group) or bandwidth part may be performed as follows.

A cell or a bandwidth part, which has been deactivated, is shifted to or remains in a deactivated state.

A cell or a bandwidth part, which has been active, is shifted to a deactivated state.

If the 1-bit indicator is configured to 1, state transition for each cell (e.g., SCell, or SCell of a master or secondary cell group) or bandwidth part may be performed as follows.

A cell or a bandwidth part, which has been active, is shifted to or remains in an active state.

A cell or a bandwidth part, which has been deactivated, is shifted to an active state.

The MAC CE function described as an example in the above may be extended variously and designed to indicate state transition or switching of a cell or a bandwidth part, so as to be applied to the above embodiments. For example, new MAC control information may be designed, and the MAC control information may include a cell group identifier, a cell identifier, a bandwidth part identifier, or bitmap information, and activation (or resumption), making dormant (or suspension), or deactivation (or suspension) of a cell group, a cell, or a bandwidth part may be thus indicated.

In the following, the disclosure proposes a procedure of reporting a power headroom.

In the disclosure, a first embodiment of reporting a power headroom is as follows.

In the first embodiment, power headroom reporting may be used to provide the following information to a base station (serving gNB) serving a UE. A power headroom may indicate a difference between a maximum transmission power (or calculated or nominal maximum transmission power (nominal UE maximum transmit power)), at which the UE is capable of performing transmission in each activated serving cell (PCell, SCell, PSCell, or SPCell), and a power measured for uplink data transmission (UL-SCH) or sounding reference signal (SRS) transmission, or may indicate a difference between a maximum transmission power, at which the UE is capable of performing transmission, and a power measured for uplink data transmission and PUCCH transmission in an SPCell (PCell or PSCell) of another MAC layer (e.g., LTE MAC or E-UTRA MAC). According to power headroom reporting, a power headroom value may be configured in MAC control information and the MAC control information is transmitted via an uplink transmission resource, so that the power headroom may be reported to the base station.

- A first type power headroom corresponds to a difference between a maximum transmission power (or calculated or nominal maximum transmission power (nominal UE maximum transmit power)), at which the UE is capable of performing transmission in each activated serving cell (PCell, SCell, PSCell, or SPCell), and a power measured for uplink data transmission (UL-SCH), and may be reported.
- A second type power headroom corresponds to a difference between a maximum transmission power (or calculated or nominal maximum transmission power (nominal UE maximum transmit power)), at which the UE is capable of performing transmission, and a power measured for uplink data transmission (UL-SCH) or PUCCH transmission in an SPCell (PCell or PSCell) of another MAC layer (e.g., LTE MAC or E-UTRA MAC when dual connectivity is configured), and may be reported.
- A third type power headroom corresponds to a difference between a maximum transmission power (or calculated or nominal maximum transmission power (nominal UE maximum transmit power)), at which the UE is capable of performing transmission in each activated serving cell (PCell, SCell, PSCell, or SPCell), and a power measured for sounding reference signal (SRS) transmission, and may be reported.

The UE may be configured, via an RRC message (e.g., RRCReconfiguration), with configuration information for power headroom reporting, and an RRC layer may adjust power headroom reporting by using the following parameters.

- Timer value (phr-PeriodicTimer) for periodic power headroom reporting: For example, when a periodic power headroom reporting timer expires, power headroom reporting may be triggered.
- Timer value (phr-ProhibitTimer) for restricting power headroom reporting: For example, while a power headroom reporting restriction timer is running, power headroom reporting is not triggered.

Threshold value (phr-Tx-PowerFactorChange) for triggering power headroom reporting Indicator (phr-Type2OtherCell) indicating reporting of a second type power headroom in consideration of another cell or MAC layer Indicator (phr-ModeOtherCG) indicating power headroom reporting in consideration of another cell group Indicator (multiplePHR) indicating reporting of multiple power headrooms The parameters may be configured via an RRC message (e.g., RRCReconfiguration message) as in FIG. 6 of the disclosure.

The power headroom reporting may be triggered when one of the following conditions occurs or is satisfied.

If a power headroom restriction timer (phr-ProhibitTimer) expires or has expired, and if a path loss is changed by a threshold value (phr-Tx-PowerFactorChange) dB configured via the RRC message with respect to at least one activated serving cell of a certain MAC layer, power headroom reporting is triggered. The path loss may be used as a path loss reference value when the MAC layer has (or receives) an uplink transmission resource for new transmission after a power headroom transmitted last in the MAC layer.

When a periodic power headroom reporting timer expires, power headroom reporting may be triggered.

When a power headroom reporting function is configured or reconfigured by an upper layer (e.g., RRC layer), power headroom reporting may be triggered. The configuration or reconfiguration may not be used to disable the power headroom reporting function.

When a cell, for which an uplink of a certain MAC layer is configured, is activated, power headroom reporting may be triggered.

When a PSCell is added, newly added, or changed (or when dual connectivity is configured, and a PSCell of an SCG is newly added or changed), power headroom reporting may be triggered.

If a power headroom restriction timer (phr-ProhibitTimer) expires or has expired, if the MAC layer has (or receives) an uplink transmission resource for new transmission, and if the following condition for an activated serving cell, for which an uplink of a certain MAC layer is configured, is true or satisfied, then power headroom reporting may be triggered.

The condition is that, when there is PUCCH information or an uplink transmission resource allocated for transmission in the cell, and there is PUCCH transmission or an uplink resource for transmission in the cell in the MAC layer, if a required power backoff due to power management (e.g., to reduce interference from other frequencies or to avoid harm to the human body) for the cell has changed, after the last transmitted power headroom, by the threshold value (phr-Tx-PowerFactorChange) dB configured via the RRC message, power headroom reporting may be triggered.

In the following, the disclosure proposes that, if, among the conditions proposed in the above, one or multiple events occur, or one or multiple conditions are satisfied, and the power headroom reporting is thus triggered, the MAC layer operates as follows.

If the MAC layer has or receives an uplink transmission resource allocated for new transmission, the MAC layer operates as follows.

1> If, after a last MAC reset, the uplink transmission resource is a first uplink transmission resource allocated for new transmission, 2> the periodic power headroom reporting timer for periodic power headroom reporting starts.

1> If, in the power headroom reporting, it is decided (or determined) that power headroom or power headroom reporting has been triggered and has not been canceled, and 1> if the uplink transmission resource allocated above can include, as a result of logical channel prioritization (LCP) (e.g., allocating the uplink transmission resource to data or MAC control information), MAC control information (MAC CE or MAC control element) for a power headroom report configured to be transmitted in the MAC layer and a sub-header thereof (e.g., MAC sub-header), or if transmission can be performed via the uplink transmission resource, 2> if an indicator (multiplePHR) indicating reporting of multiple power headrooms is configured to be TRUE (or configured to perform reporting), 3> with respect to each activated serving cell which is connected to a certain MAC layer or configured in a certain MAC layer, and for which an uplink is configured, 4> a value of a first type power headroom or third type power headroom with respect to an uplink carrier (or frequency) corresponding to the cell is acquired (calculated).

4> If, for the serving cell, the MAC layer has or receives an uplink transmission resource allocated for transmission, 4> or if another MAC layer is configured, and the another MAC layer has or receives an uplink transmission resource allocated for transmission with respect to the serving cell, and if an indicator (phr-ModeOtherCG) indicating power headroom reporting in consideration of another cell group is configured to Real (or configured to report an actual value) via an upper layer (RRC layer), 5> a maximum transmission power (or power value required for power headroom calculation) corresponding to the serving cell is acquired from a physical layer.

3> If an indicator (phr-Type2OtherCell), which indicates reporting of a second type power headroom in consideration of another cell or MAC layer, is configured to TRUE (or configured to perform reporting), 4> if the another MAC layer is an evolved-universal terrestrial radio access (E-UTRA) MAC layer, 5> a value for reporting of the second type power headroom with respect to an SPCell of the another MAC is acquired (or calculated).

5> If the indicator (phr-ModeOtherCG), which indicates power headroom reporting in consideration of another cell group, is configured to Real by the upper layer (RRC layer) (or configured to report an actual value), 6> a maximum transmission power value (or power value required for power headroom calculation) for the SPCell of the another MAC layer (E-UTRA MAC layer) is acquired from the physical layer.

3> An indication of generating and transmitting MAC control information for reporting of multiple power headrooms on the basis of the values reported from the physical layer is provided to multiplexing and reassembly (multiplexing and assembly procedure of the MAC layer).

2> If the indicator (multiplePHR) indicating reporting of multiple power headrooms is not configured to TRUE (or not configured to perform reporting), if reporting of one power headroom is indicated, or if one power headroom reporting format is used, 3> a first type power headroom value for an uplink carrier (or frequency) of the serving cell (or PCell) is acquired (or calculated) from the physical layer.

3> A maximum transmission power value (or power value required for power headroom calculation) corresponding to the serving cell (or PCell) is acquired from the physical layer.

3> An indication of generating and transmitting MAC control information for reporting of one power headroom on the basis of the values reported from the physical layer is provided to multiplexing and reassembly (multiplexing and assembly procedure of the MAC layer).

2> A timer for periodic power headroom reporting starts or restarts.

2> A timer for restricting power headroom reporting starts or restarts.

2> All triggered power headroom reporting or power headrooms are canceled.

The power headroom reporting proposed in the disclosure causes the UE to perform power headroom reporting for each cell, so as to enable a base station to adjust or manage uplink transmission power of the UE. However, in the case of a cell (SCell) or serving cell, for which a dormant bandwidth part is configured, or a suspended (or deactivated) cell group or cell, proposed in the disclosure, if a current or activated bandwidth part (or downlink bandwidth part) of an activated serving cell is a dormant bandwidth part, or if activation is performed to a bandwidth part indicated by a dormant bandwidth part identifier, even if the cell group performs power headroom reporting for the suspended (or deactivated) cell (e.g., PSCell or SCell), uplink data transmission or PUCCH transmission is impossible in the dormant bandwidth part or the suspended (or deactivated) cell group or cell, and therefore unnecessary power headroom reporting is performed.

Therefore, in the following, the disclosure proposes that, in order to reduce unnecessary processing loads of a UE and prevent a waste of transmission resources due to unnecessary power headroom reporting, the UE first determines whether a cell is activated or deactivated, and determines, for an activated cell, whether an activated bandwidth part (e.g., downlink bandwidth part) of the activated cell is a dormant bandwidth part (or is a bandwidth part having a dormant bandwidth part identifier configured via an RRC message) or is not a dormant bandwidth part (or is not a bandwidth part having a dormant bandwidth part identifier configured via an RRC message), or whether a cell group or cell (e.g., PSCell) is suspended (or deactivated) or is activated (or resumed). As another method, the UE may first determine whether a cell is activated or deactivated, and may determine for an activated cell, when a dormant bandwidth part is configured, (e.g., if a bandwidth part identifier is configured for the cell via an RRC message), whether an activated bandwidth part (e.g., downlink bandwidth part) of the activated cell is a dormant bandwidth part (or is a bandwidth part having a dormant bandwidth part identifier configured via an RRC message) or is not a dormant bandwidth part (or is not a bandwidth part having a dormant bandwidth part identifier configured via an RRC message). With respect to an activated cell, for which a dormant bandwidth part is not configured, determination of the activated bandwidth part, as described above, may be omitted (or may not be performed).

Further, it is proposed that, in the case of the cell (SCell) or serving cell, for which a dormant bandwidth part is configured, as proposed above, if the current or activated bandwidth part (or downlink bandwidth part) of the activated serving cell is a dormant bandwidth part or is activated to a bandwidth part indicated by a dormant bandwidth part identifier, or if a cell group or cell (e.g., PSCell or SCell) is suspended (or deactivated), power headroom reporting is not triggered, and even if power headroom reporting is triggered by another cell, a power headroom is not reported for the suspended (or deactivated) cell. As another method, in the case of the cell (SCell) or serving cell, for which a dormant bandwidth part is configured, power headroom reporting may be triggered only if the current or activated bandwidth part (or downlink bandwidth part) of the activated serving cell is not a dormant bandwidth part, if activation is not performed to a bandwidth part indicated by a dormant bandwidth part identifier, or if a cell group or cell (e.g., PSCell or SCell) is not suspended (or if activated, resumed, or not deactivated), and even if power headroom reporting is triggered by another cell, a power headroom may be reported for the activated serving cell only if, as described above, the current or activated bandwidth part (or downlink bandwidth part) of the activated serving cell is not a dormant bandwidth part, if activation is not performed to a bandwidth part indicated by a dormant bandwidth part identifier, or if a cell group or cell (e.g., PSCell or SCell) is not suspended (or if activated, resumed, or not deactivated). Accordingly, procedures proposed in the above enable the UE to reduce unnecessary processing loads and prevent a waste of transmission resources due to unnecessary power headroom reporting. A specific embodiment of the procedures proposed above will be described in the following second embodiment in consideration of a dormant bandwidth part.

In the disclosure, in the second embodiment in consideration of a dormant bandwidth part, power headroom reporting may be used to provide the following information to a base station (serving gNB) serving a UE. A power headroom may indicate a difference between a maximum transmission power (or calculated or nominal maximum transmission power (nominal UE maximum transmit power)), at which the UE is capable of performing transmission in each activated serving cell (PCell, SCell, PSCell, or SPCell), and a power measured for uplink data transmission (UL-SCH) or sounding reference signal (SRS) transmission, or may indicate a difference between a maximum transmission power, at which the UE is capable of performing transmission, and a power measured for uplink data transmission and PUCCH transmission in an SPCell (PCell or PSCell) of another MAC layer (e.g., LTE MAC or E-UTRA MAC). According to power headroom reporting, a power headroom value may be configured in MAC control information and the MAC control information is transmitted via an uplink transmission resource, so that the power headroom may be reported to the base station.

A first type power headroom corresponds to a difference between a maximum transmission power (or calculated or nominal maximum transmission power (nominal UE maximum transmit power)), at which the UE is capable of performing transmission in each activated serving cell (PCell, SCell, PSCell, or SPCell), and a power measured for uplink data transmission (UL-SCH), and may be reported.

A second type power headroom corresponds to a difference between a maximum transmission power (or calculated or nominal maximum transmission power (nominal UE maximum transmit power)), at which the UE is capable of performing transmission, and a power measured for uplink data transmission (UL-SCH) or PUCCH transmission in an SPCell (PCell or PSCell) of another MAC layer (e.g., LTE MAC or E-UTRA MAC when dual connectivity is configured), and may be reported.

A third type power headroom corresponds to a difference between a maximum transmission power (or calculated or nominal maximum transmission power (nominal UE maximum transmit power)), at which the UE is capable of performing transmission in each activated serving cell (PCell, SCell, PSCell, or SPCell), and a power measured for sounding reference signal (SRS) transmission, and may be reported.

The second embodiment of power headroom reporting in consideration of a dormant bandwidth part is as follows.

In the second embodiment, the UE may be configured, via an RRC message (e.g., RRCReconfiguration message), with configuration information for power headroom reporting, and an RRC layer may adjust power headroom reporting by using the following parameters.

Timer value (phr-PeriodicTimer) for periodic power headroom reporting: For example, when a periodic power headroom reporting timer expires, power headroom reporting may be triggered.

Timer value (phr-ProhibitTimer) for restricting power headroom reporting: For example, while a power headroom reporting restriction timer is running, power headroom reporting is not triggered.

Threshold value (phr-Tx-PowerFactorChange) for triggering power headroom reporting Indicator (phr-Type2OtherCell) indicating reporting of a second type power headroom in consideration of a different cell or MAC layer Indicator (phr-ModeOtherCG) indicating power headroom reporting in consideration of another cell group Indicator (multiplePHR) indicating reporting of multiple power headrooms The parameters may be configured via an RRC message (e.g., RRCReconfiguration message) as in FIG. 6 of the disclosure.

In the second embodiment of power headroom reporting in consideration of a dormant bandwidth part, proposed in the disclosure, the power headroom reporting may be triggered if one event occurs or one condition is satisfied from among the following conditions.

With respect to at least one serving cell, in which a power headroom restriction timer (phr-ProhibitTimer) expires or has expired, a bandwidth part (or downlink bandwidth part) of an activated serving cell of a certain MAC layer is activated, and the activated bandwidth part (or downlink bandwidth part) is not a dormant bandwidth part (dormant BWP), or the activated bandwidth part (or downlink bandwidth part) or a current bandwidth part (or activated current downlink bandwidth part) of the activated serving cell is not a dormant bandwidth part (dormant BWP), if a path loss is changed by a threshold value (phr-Tx-PowerFactorChange) dB configured via the RRC message, power headroom reporting is triggered. The path loss may be used as a path loss reference value when the MAC layer has (or receives) an uplink transmission resource for new transmission after a power headroom transmitted last in the MAC layer.

When a periodic power headroom reporting timer expires, power headroom reporting may be triggered.

When a power headroom reporting function is configured or reconfigured by an upper layer (e.g., RRC layer), power headroom reporting may be triggered. The configuration or reconfiguration may not be used to disable the power headroom reporting function.

If a certain cell, for which an uplink of a certain MAC layer is configured, is activated, and a first active downlink bandwidth part (or first active downlink bandwidth part identifier (firstActiveDownlinkBWP-Id)) configured for the cell is not configured to a dormant bandwidth part (dormant BWP), power headroom reporting may be triggered.

When a PSCell, a cell group, or a cell is added, newly added, or changed (or when dual connectivity is configured and a PSCell of an SCG is newly added or changed), or when the PSCell, the cell group, or the cell is activated or resumed, power headroom reporting may be triggered.

As another method, when a PSCell is added, newly added, or changed (or when dual connectivity is configured and a PSCell of an SCG is newly added or changed), or when the PSCell, the cell group, or the cell is activated or resumed, and if a first active downlink bandwidth part (or first active downlink bandwidth part identifier (firstActiveDownlinkBWP-Id)) configured for the cell is not configured to a dormant bandwidth part (dormant BWP), power headroom reporting may be triggered.

If a power headroom restriction timer (phr-ProhibitTimer) expires or has expired, if the MAC layer has (or receives) an uplink transmission resource for new transmission, and if the following condition for an activated serving cell, for which an uplink of a certain MAC layer is configured, is true or satisfied, then power headroom reporting may be triggered.

The condition is that, when there is PUCCH information or an uplink transmission resource allocated for transmission in the cell, and there is PUCCH transmission or an uplink resource for transmission in the cell in the MAC layer, if a required power backoff due to power management (e.g., to reduce interference from other frequencies or to avoid harm to the human body) for the cell has changed, after the last transmitted power headroom, by the threshold value (phr-Tx-PowerFactorChange) dB configured via the RRC message, power headroom reporting may be triggered.

When an uplink bandwidth part (UL BWP) is activated (or activated to a first active uplink bandwidth part), or when a downlink bandwidth part (or activated bandwidth part or a current bandwidth part (or downlink bandwidth part)) of a certain activated SCell for which an uplink is configured in a certain MAC layer is switched or activated from a dormant bandwidth part (dormant BWP) to a normal bandwidth part (or bandwidth part (non-dormant BWP) other than a dormant bandwidth part) or to a bandwidth part (bandwidth part indicated by an identifier of the bandwidth part other than the dormant bandwidth part or firstActiveNonDormantDownlinkBWP-Id) other than a dormant bandwidth part, which is first activated from dormancy configured via the RRC message, power headroom reporting may be triggered.

If a downlink bandwidth part (or activated bandwidth part or a current bandwidth part (or downlink bandwidth part)) of a certain activated SCell for which an uplink is configured in a certain MAC layer is activated from dormancy configured via the RRC message to a bandwidth part indicated by a first activated bandwidth part identifier (firstOutsideActiveTimeBWP-Id or first WithinActiveTimeBWP-Id), power headroom reporting may be triggered. Activation of a bandwidth part, as described above, may be indicated by DCI of PDCCH.

When an uplink bandwidth part (UL BWP) is activated (or activated to a first active uplink bandwidth part), or when a downlink bandwidth part (or activated bandwidth part or a current bandwidth part (or downlink bandwidth part)) of a certain activated SCell for which an uplink is configured in a certain MAC layer is switched or activated from a dormant bandwidth part (dormant BWP) to a normal bandwidth part (or bandwidth part (non-dormant BWP) other than a dormant bandwidth part) or to a bandwidth part (bandwidth part indicated by firstActiveNonDormantDownlinkBWP-Id, firstOutsideActiveTimeBWP-Id, first WithinActiveTimeBWP-Id, or an identifier of the bandwidth part other than the dormant bandwidth part) other than a dormant bandwidth part, which is first activated from dormancy configured via the RRC message, or if first SRS configuration information or second SRS configuration information is configured (or if the activated bandwidth part (or downlink bandwidth part) or the current bandwidth part (or activated current downlink bandwidth part) of the activated serving cell is a dormant bandwidth part (dormant BWP), and the first SRS configuration information or the second SRS configuration information is configured, power headroom reporting may be triggered.

When a power headroom restriction timer (phr-ProhibitTimer) expires or has expired, a bandwidth part (or downlink bandwidth part) of an activated serving cell of a certain MAC layer is activated, and the activated bandwidth part (or downlink bandwidth part) is not a dormant bandwidth part (dormant BWP) or if the activated bandwidth part (or downlink bandwidth part) or a current bandwidth part (or activated current downlink bandwidth part) of the activated serving cell is not a dormant bandwidth part (dormant BWP), or if first SRS configuration information or second SRS configuration information is configured (or if the activated bandwidth part (or downlink bandwidth part) or the current bandwidth part (or activated current downlink bandwidth part) of the activated serving cell is a dormant bandwidth part (dormant BWP), and the first SRS configuration information or the second SRS configuration information is configured), and, for at least one activated serving cell, a path loss is changed by a threshold value (phr-Tx-PowerFactorChange) dB configured via the RRC message, power headroom reporting is triggered. The path loss may be used as a path loss reference value when the MAC layer has (or receives) an uplink transmission resource for new transmission after a power headroom transmitted last in the MAC layer.

In the following, the disclosure proposes that, if, among the conditions proposed in the above, one or multiple events occur, or one or multiple conditions are satisfied, and the power headroom reporting is thus triggered, the MAC layer operates as follows.

If the MAC layer has or receives an uplink allocated for new transmission, the MAC layer operates as follows.

1> If, after a last MAC reset, the uplink transmission resource is a first uplink transmission resource allocated for new transmission, 2> the periodic power headroom reporting timer for periodic power headroom reporting starts.

1> If, in the power headroom reporting, it is decided (or determined) that power headroom or power headroom reporting has been triggered and has not been canceled, and 1> if the uplink transmission resource allocated above can include, as a result of logical channel prioritization (LCP) (e.g., allocating the uplink transmission resource to data or MAC control information), MAC control information (MAC CE or MAC control element) for a power headroom report configured to be transmitted in the MAC layer and a sub-header thereof (e.g., MAC sub-header), or if transmission can be performed via the uplink transmission resource, 2> if an indicator (multiplePHR) indicating reporting of multiple power headrooms is configured to be TRUE (or configured to perform reporting), 3> with respect to each activated serving cell which is connected to a certain MAC layer or configured in a certain MAC layer, and for which an uplink is configured, 3> if a bandwidth part (or downlink bandwidth part) of the activated serving cell is activated, and the activated bandwidth part (or downlink bandwidth part) is not a dormant bandwidth part (dormant BWP), if the activated bandwidth part (or downlink bandwidth part) or a current bandwidth part (or activated current downlink bandwidth part) of the activated serving cell is not a dormant bandwidth part (dormant BWP), or if the cell group or cell (e.g., PSCell) is not suspended or deactivated, 3> or if a bandwidth part (or downlink bandwidth part) of the activated serving cell is activated, and the activated bandwidth part (or downlink bandwidth part) is not a dormant bandwidth part (dormant BWP), if the activated bandwidth part (or downlink bandwidth part) or a current bandwidth part (or activated current downlink bandwidth part) of the activated serving cell is not a dormant bandwidth part (dormant BWP), if the cell group or cell (e.g., PSCell) is not suspended or deactivated, or if first SRS configuration information or second SRS configuration information is configured (or if the activated bandwidth part (or downlink bandwidth part) or the current bandwidth part (or activated current downlink bandwidth part) of the activated serving cell is a dormant bandwidth part (dormant BWP), and the first SRS configuration information or the second SRS configuration information is configured), then 4> a value of a first type power headroom or third type power headroom with respect to an uplink carrier (or frequency) corresponding to the cell is acquired (calculated).

4> If, for the serving, the MAC layer has or receives an uplink transmission resource allocated for transmission, 4> or if another MAC layer is configured, and the another MAC layer has or receives an uplink transmission resource allocated for transmission with respect to the serving cell, and if an indicator (phr-ModeOtherCG) indicating power headroom reporting in consideration of another cell group is configured to Real (or configured to report an actual value) via an upper layer (RRC layer), 5> a maximum transmission power (or power value required for power headroom calculation) corresponding to the serving cell is acquired from a physical layer.

3> If an indicator (phr-Type2OtherCell), which indicates reporting of a second type power headroom in consideration of another cell or MAC layer, is configured to TRUE (or configured to perform reporting), 4> if the another MAC layer is an E-UTRA MAC layer, 5> a value for reporting of the second type power headroom with respect to an SPCell of the another MAC is acquired (or calculated).

5> If the indicator (phr-ModeOtherCG), which indicates power headroom reporting in consideration of another cell group, is configured to Real by the upper layer (RRC layer) (or configured to report an actual value), 6> a maximum transmission power value (or power value required for power headroom calculation) for the SPCell of the another MAC layer (E-UTRA MAC layer) is acquired from the physical layer.

3> An indication of generating and transmitting MAC control information for reporting of multiple power headrooms on the basis of the values reported from the physical layer is provided to multiplexing and reassembly (multiplexing and assembly procedure of the MAC layer).

2> If the indicator (multiplePHR) indicating reporting of multiple power headrooms is not configured to TRUE (or not configured to perform reporting), if reporting of one power headroom is indicated, or if one power headroom reporting format is used, 3> a first type power headroom value for an uplink carrier (or frequency) of the serving cell (or PCell) is acquired (or calculated) from the physical layer.

3> A maximum transmission power value (or power value required for power headroom calculation) corresponding to the serving cell (or PCell) is acquired from the physical layer.

3> An indication of generating and transmitting MAC control information for reporting of one power headroom on the basis of the values reported from the physical layer is provided to multiplexing and reassembly (multiplexing and assembly procedure of the MAC layer).

2> A timer for periodic power headroom reporting starts or restarts.

2> A timer for restricting power headroom reporting starts or restarts.

2> All triggered power headroom reporting or power headrooms are canceled.

Figure 15:
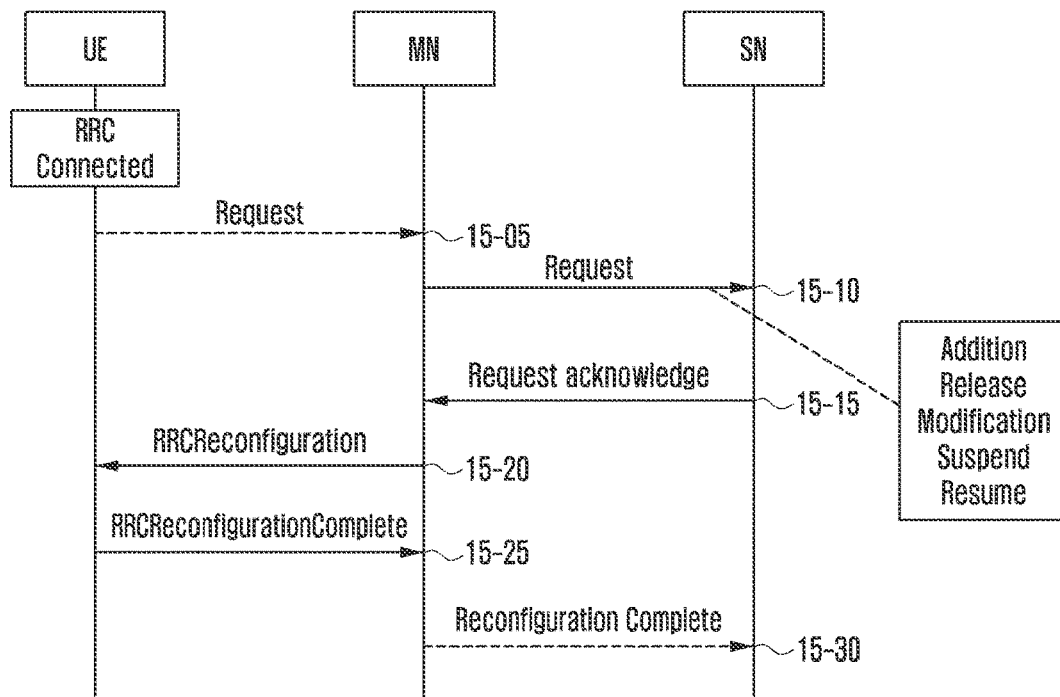
FIG. 15 is a diagram illustrating a first signaling procedure of configuring or releasing dual connectivity, or configuring, releasing, activating, resuming, suspending, or deactivating a secondary cell group for which dual connectivity is configured according to an embodiment of the disclosure.
Figure 15:
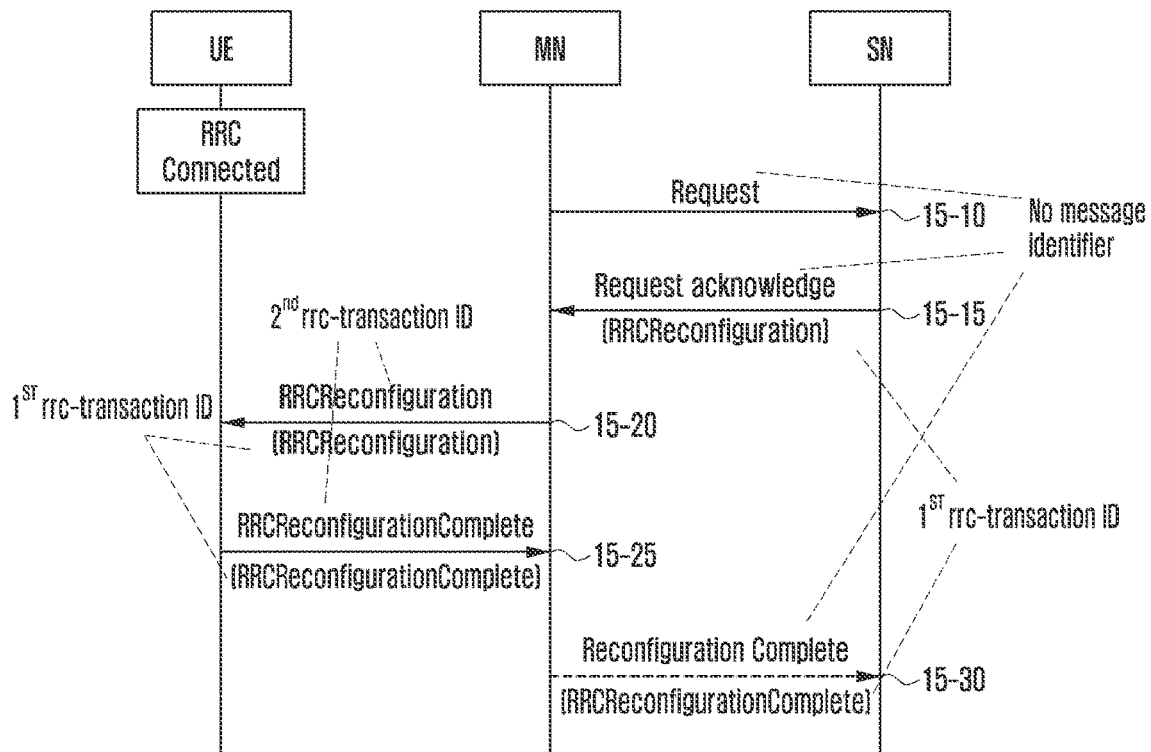

FIG. 15 is a diagram illustrating a first signaling procedure of configuring or releasing dual connectivity, or configuring, releasing, activating, resuming, suspending, or deactivating a secondary cell group for which dual connectivity is configured according to an embodiment of the disclosure.

FIG. 15 is a diagram illustrating a first signaling procedure of configuring or clearing dual connectivity, or configuring, clearing, activating, resuming, suspending, or deactivating a secondary cell group for which dual connectivity is configured.

Referring to FIG. 15, a UE may establish an RRC connection with a network or a base station as in FIG. 6 of the disclosure, and may transmit data to or receive data from the base station (e.g., master cell group (MCG), master node (MN), or cells (PCell or SCell) of the master cell group).

The base station may configure dual connectivity for the UE according to a predetermined reason (e.g., when a high data transmission rate is required, when high QoS requirements should be satisfied, or in response to a request 15-05 from the UE). For example, the UE may transmit, to the base station, a request (or request message) for configuring or clearing, activating or deactivating, or resuming or suspending dual connectivity, a cell group (e.g., secondary cell group), or a cell, and the request message 15-05 may include a frequency (or channel) measurement result report, a cell group identifier, cell identifiers, or measurement results. As another method, the base station may determine, by considering a downlink (or uplink) data amount or a buffer amount, whether the base station is to configure, clear, add, deactivate, activate, resume, change, reconfigure, or suspend dual connectivity, a cell group (e.g., secondary cell group), or a cell.

A master base station (master node (MN) or master cell group (MCG)) may receive a frequency or channel measurement report for each frequency or channel received from the UE, and may determine a secondary base station (secondary node (SN) or secondary cell group (SCG)), for which dual connectivity is to be configured, on the basis of the measurement report. Alternatively, the master base station may determine, by considering a downlink (or uplink) data amount or a buffer amount, whether the base station is to configure, clear, add, deactivate, activate, resume, change, reconfigure, or suspend dual connectivity, a cell group (e.g., secondary cell group), or a cell. In order to configure, clear, add, deactivate, activate, resume, change, reconfigure, or suspend dual connectivity, a cell group (secondary cell group), or a cell for a determined secondary base station, the master base station may transmit a message 15-10 for requesting whether it is possible to configure or add as a secondary cell group of the UE, to the secondary base station via an Xn interface (e.g., interface between base stations) or an Sn interface (e.g., interface between base stations or a base station and AMF or UMF). For the request message, each separate new request message may be defined and used to configure, clear, add, deactivate, activate, resume, change, reconfigure, or suspend dual connectivity, a cell group (secondary cell group), or a cell for the secondary base station, and alternatively, a new indicator may be defined from an existing message (e.g., SN addition request message, SN modification request message, SN release request message, or the like) so as to indicate (or request) to configure, clear, add, deactivate, activate, resume, change, reconfigure, or suspend a cell group (secondary cell group), or a cell. The request message may include information, such as cell group configuration information (e.g., master cell group configuration information) currently configured for the UE, bearer configuration information, capability information of the UE, frequency (or channel) measurement result information of the UE, or the like, and when a secondary cell group is configured for the UE in consideration of the information, the secondary base station may configure secondary cell group configuration information or the bearer configuration information so as not to exceed a UE capability or according to the UE capability or the bearer configuration information of the master cell group.

When the request message is rejected, the secondary base station having received the request message 15-10 may configure a rejection message and transmit message 15-15 to the master base station via the Xn interface (e.g., interface between base stations) or the Sn interface (e.g., interface between base stations or a base station and AMF or UMF). If the request message is accepted, the secondary base station may transmit message 15-15 (a request acknowledge message) including an indicator or configuration information for configuring, clearing, adding, deactivating, activating, resuming, changing, reconfiguring, or suspending dual connectivity, a cell group (secondary cell group), or a cell to the master base station via the Xn interface (e.g., interface between base stations) or the Sn interface (e.g., interface between base stations or a base station and AMF or UMF). The request acknowledge message may include some of the following information.

- Identifier identical to a message identifier included in the request message, or indicator indicating acceptance of the request made from the request message
- Indicator or configuration information (e.g., indicator or configuration information for the master cell group) for configuring, clearing, adding, deactivating, activating, resuming, changing, reconfiguring, or suspending dual connectivity, a cell group (secondary cell group), or a cell
- First RRC message (e.g., RRCReconfiguration message) including an indicator or configuration information for configuring, clearing, adding, deactivating, activating, resuming, changing, reconfiguring, or suspending dual connectivity, a cell group (secondary cell group), or a cell
- The first RRC message may include some of the following information.
  - First RRC message identifier for distinguishing the first RRC message (e.g., rrc-Transaction identifier) The UE and the base station (e.g., secondary base station) transmit or receive multiple RRC messages to or from each other, and identifiers for distinguishing the respective RRC messages may be thus included in the RRC messages. For example, an RRC message (e.g., RRCReconfiguration message) transmitted by a transmission end, an RRC message (e.g., RRCReconfigurationComplete message) corresponding to the RRC message (e.g., RRCReconfiguration message) transmitted by a reception end, or an RRC message corresponding to the RRC message transmitted by the transmission end may include the same first RRC message identifier.
  - Indicator or configuration information (e.g., indicator or configuration information for the UE) for configuring, clearing, adding, deactivating, activating, resuming, changing, reconfiguring, or suspending dual connectivity, a cell group (secondary cell group), or a cell
  - Indicator indicating a cell group state (e.g., activated, deactivated, suspended, or resumed)
  - Cell group identifier for distinguishing cell groups. The cell group identifier may be assigned by the master base station, or one identifier among previously agreed identifiers may be assigned by the secondary base station.
  - Cell group or cell configuration information
  - Bearer configuration information. For example, indicator information indicating an operation of a protocol layer (e.g., SDAP layer, PDCP layer, RLC layer, or MAC layer) of each bearer (e.g., PDCP suspension indicator, PDCP re-establishment indicator, PDCP data recovery indicator, RLC re-establishment indicator, MAC partial reset indicator, MAC reset indicator, or indicator triggering a new operation)
  - If an indicator or configuration information for configuring, adding, activating, resuming, changing, or reconfiguring dual connectivity, a cell group (secondary cell group), or a cell is included, a first indicator (e.g., mobilityControlInfor or Reconfiguration WithSync) may be included together. However, if an indicator or configuration information for clearing, deactivating, reconfiguring, or suspending dual connectivity, a cell group (secondary cell group), or a cell is included, the first indicator (e.g., mobilityControlInfor or ReconfigurationWithSync) may not be included. The first indicator may be an indicator triggering random access to the cell group or cell, an indicator for synchronizing a signal with a new cell, an indicator indicating frequency shifting of the UE, or an indicator indicating changing of a cell group (or cell).
  - If the indicator or configuration information for configuring, adding, activating, resuming, changing, or reconfiguring dual connectivity, a cell group (secondary cell group), or a cell is included, random access configuration information may be included together. However, if the indicator or configuration information for clearing, deactivating, reconfiguring, or suspending dual connectivity, a cell group (secondary cell group), or a cell is included, the random access configuration information may not be included. The random access configuration information may include random access transmission resource information (time or frequency transmission resource), designated preamble information, or the like for preamble transmission for the cell group or cell.
  - Time information indicating when to activate, resume, deactivate, or suspend dual connectivity, a cell group (e.g., secondary cell group), or a cell (PSCell or SCG SCell) (for example, information indicating timing (e.g., X time unit, subframe unit, time slot unit, or symbol unit), for example, time information indicating, if the message is received in an nth time unit, whether to activate, resume, deactivate, or suspend the cell in an (n+X)th time unit)

When the request acknowledge message 15-15 is received, the master base station may check the request acknowledge message, and may transmit, to the UE, a second RRC message 15-20 (e.g., RRCReconfiguration message) including information (e.g., first RRC message included in the request acknowledge message 15-15) included in the request acknowledge message. The second RRC message may include some of the following information.

- Second RRC message identifier for distinguishing the second RRC message (e.g., rrc-Transaction identifier) The UE and the base station (e.g., master base station) transmit or receive multiple RRC messages to and from each other, and identifiers for distinguishing the respective RRC messages may be thus included in the RRC messages. For example, an RRC message (e.g., RRCReconfiguration message) transmitted by a transmission end, an RRC message (e.g., RRCReconfigurationComplete message) corresponding to the RRC message (e.g., RRCReconfiguration message) transmitted by a reception end, or an RRC message corresponding to the RRC message transmitted by the transmission end may include the same second RRC message identifier.
- First RRC message included in the request acknowledge message 15-15
- Indicator or configuration information (e.g., indicator or configuration information for the UE) for configuring, clearing, adding, deactivating, activating, resuming, changing, reconfiguring, or suspending dual connectivity, a cell group (secondary cell group), or a cell
- Indicator indicating a cell group state (e.g., activated, deactivated, suspended, or resumed)
- Cell group identifier for distinguishing cell groups. The cell group identifier may be assigned by the master base station, or one identifier among previously agreed identifiers may be assigned by the secondary base station.

Cell group or cell configuration information

Bearer configuration information. For example, indicator information indicating an operation of a protocol layer (e.g., SDAP layer, PDCP layer, RLC layer, or MAC layer) of each bearer (e.g., PDCP suspension indicator, PDCP re-establishment indicator, PDCP data recovery indicator, RLC re-establishment indicator, MAC partial reset indicator, MAC reset indicator, or indicator triggering a new operation)

If an indicator or configuration information for configuring, adding, activating, resuming, changing, or reconfiguring dual connectivity, a cell group (secondary cell group), or a cell is included, a first indicator (e.g., mobilityControlInfor or ReconfigurationWithSync) may be included together. However, if an indicator or configuration information for clearing, deactivating, reconfiguring, or suspending dual connectivity, a cell group (secondary cell group), or a cell is included, the first indicator (e.g., mobilityControlInfor or ReconfigurationWithSync) may not be included. The first indicator may be an indicator triggering random access to the cell group or cell, an indicator for synchronizing a signal with a new cell, an indicator indicating frequency shifting of the UE, or an indicator indicating changing of a cell group (or cell). As another method, the UE may perform PDCCH monitoring in the indicated or configured cell group or cell, and may trigger and perform random access as indicated in PDCCH. For example, an upper layer (e.g., RRC layer) may transmit, to a lower If the indicator or configuration information for configuring, adding, activating, resuming, changing, or reconfiguring dual connectivity, a cell group (secondary cell group), or a cell is included, random access configuration information may be included together. However, if the indicator or configuration information for clearing, deactivating, reconfiguring, or suspending dual connectivity, a cell group (secondary cell group), or a cell is included, the random access configuration information may not be included. The random access configuration information may include random access transmission resource information (time or frequency transmission resource), designated preamble information, or the like for preamble transmission for the cell group or cell.

Time information indicating when to activate, resume, deactivate, or suspend dual connectivity, a cell group (e.g., secondary cell group), or a cell (PSCell or SCG SCell) (for example, information indicating timing (e.g., X time unit, subframe unit, time slot unit, or symbol unit), for example, time information indicating, if the message is received in an nth time unit, whether to activate, resume, deactivate, or suspend the cell in an (n+X)th time unit)

When the second RRC message 15-20 is received, the UE may read and check the second RRC message, or may read information (e.g., first RRC message included in the second RRC message) included in the second RRC message, and the UE may configure, add, change, resume, suspend, or deactivate dual connectivity or a cell group (e.g., secondary cell group). If the first indicator triggering random access is included in the second RRC message or in the first RRC message, or if a state indicator of the cell group indicates activation or resumption, the configured bearer configuration information or each piece of configuration information of a protocol layer may be applied or established, or random access may be triggered for the configured or indicated cell group or cell. When random access is performed, if there is random access information in the RRC message, or if there is random access information that has been stored, random access (e.g., contention-free random access (e.g., 4-step random access or 2-step random access)) may be performed on the basis of system information or the random access information that has been stored or received via the RRC message. If there is no random access information in the RRC message, random access (e.g., contention-based random access (e.g., 4-step random access or 2-step random access)) may be performed. As another method, the UE may perform PDCCH monitoring in the indicated or configured cell group or cell, and may trigger and perform random access as indicated in PDCCH. For example, an upper layer (e.g., RRC layer) may transmit, to a lower layer (e.g., MAC layer), an indicator triggering random access. If the first indicator triggering random access is included in neither the second RRC message nor the first RRC message, or if a cell group state indicates suspension, deactivation, or clearing, the RRC message or cell group configuration information corresponding to the cell group identifier may be stored in consideration thereof.

The UE may receive the second RRC message 15-20 or apply received configuration information, and may generate a third RRC message 15-25 or a fourth RRC message and transmit 15-25 the same to the base station. The third RRC message may include some of the following information.

Second RRC message identifier having the same value as that of the second RRC message identifier included in the second RRC message Indicator or identifier indicating that the second RRC message has been successfully received Fourth RRC message including a response indicating that a first RRC message generated and transmitted by a secondary base station has been successfully received. The fourth RRC message may include some of the following information.

First RRC message identifier having the same value as that of the first RRC message identifier included in the first RRC message Indicator or identifier indicating that the first RRC message has been successfully received Response indicator indicating that the first RRC message has been successfully applied When the base station (e.g., master base station) receives the third RRC message, the base station may determine, via a second identifier, whether the received message is a response message to the second RRC message. Further, the base station may check the fourth RRC message included in the third message, and may add the fourth RRC message to a configuration completion message indicating completion of configuration for a secondary cell group base station, so as to transmit the configuration completion message 15-30 to the secondary base station via the Xn interface (e.g., interface between base stations) or the Sn interface (e.g., interface between base stations or a base station and AMF or UMF). The configuration completion message may include some of the following information.

Fourth RRC message included in the third RRC message

Indicator or identifier indicating that configuration (adding, changing, or clearing of a cell group) or indication (activation, deactivation, suspension, or resumption of a cell group) indicated via the request acknowledge message or the first RRC message has been completed When the configuration completion message is received, the base station (e.g., secondary base station) may read and check the fourth RRC message included in the configuration completion message, and may determine, via the first identifier, whether the fourth RRC message is a response message to the first RRC message. Further, the base station may determine whether the indicated configuration or indication has been successfully completed. When the configuration completion message or the fourth RRC message is received, the secondary base station may transmit, to the master base station in response to the reception, a response message indicating that the configuration completion message or the fourth RRC message has been successfully received.

Figure 16:
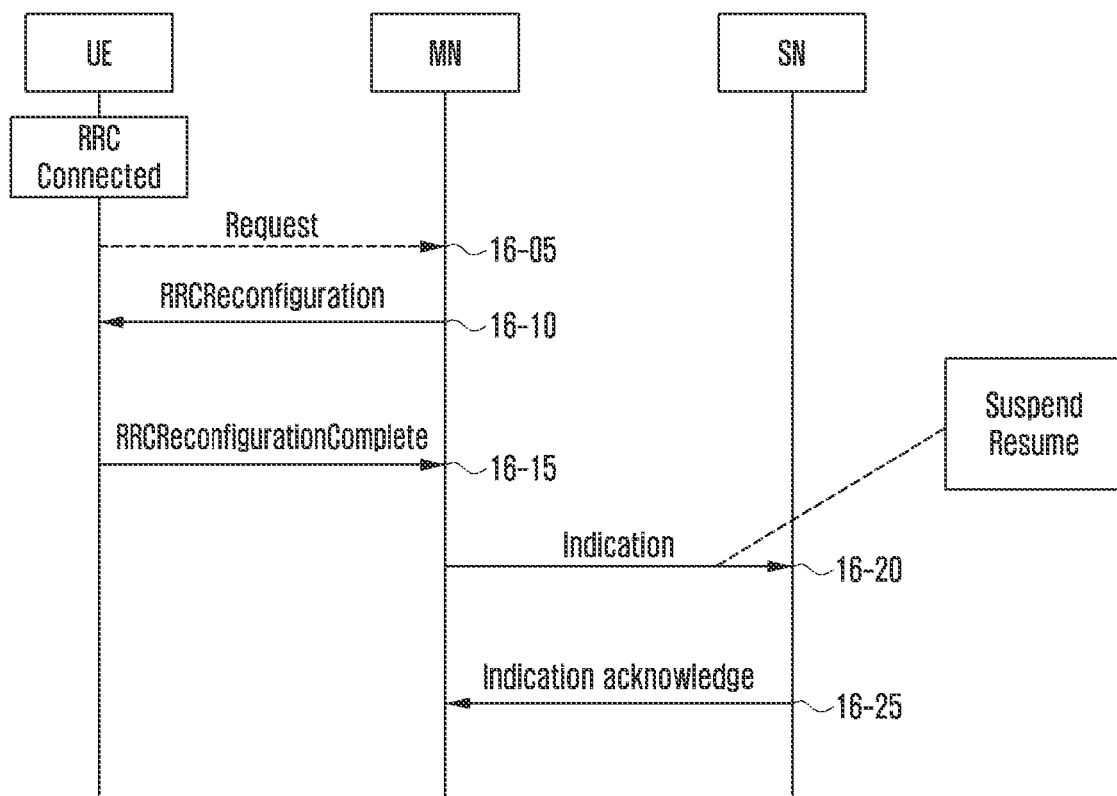
FIG. 16 is a diagram illustrating a second signaling procedure of configuring or releasing dual connectivity, or configuring, releasing, activating, resuming, suspending, or deactivating a secondary cell group for which dual connectivity is configured according to an embodiment of the disclosure.

FIG. 16 is a diagram illustrating a second signaling procedure of configuring or releasing dual connectivity, or configuring, releasing, activating, resuming, suspending, or deactivating a secondary cell group for which dual connectivity is configured according to an embodiment of the disclosure.

Referring to FIG. 16, a UE may establish an RRC connection with a network or a base station as in FIG. 6 of the disclosure, and may transmit data to or receive data from the base station (e.g., master cell group (MCG), master node (MN), or cells (PCell or SCell) of the master cell group).

The base station may configure dual connectivity for the UE according to a predetermined reason (e.g., when a high data transmission rate is required, when high QoS requirements should be satisfied, or in response to a request 16-05 from the UE). For example, the UE may transmit, to the base station, a request (or request message) for configuring or clearing, activating or deactivating, or resuming or suspending dual connectivity, a cell group (e.g., secondary cell group), or a cell, and the request message 16-05 may include a frequency (or channel) measurement result report, a cell group identifier, cell identifiers, or measurement results. As another method, the base station may determine, by considering a downlink (or uplink) data amount or a buffer amount, whether the base station is to configure, clear, add, deactivate, activate, resume, change, reconfigure, or suspend dual connectivity, a cell group (e.g., secondary cell group), or a cell.

A master base station (master node (MN) or master cell group (MCG)) may receive a frequency or channel measurement report for each frequency or channel received from the UE, and may determine a secondary base station (secondary node (SN) or secondary cell group (SCG)), for which dual connectivity is to be configured, on the basis of the measurement report. Alternatively, the master base station may determine, by considering a downlink (or uplink) data amount or a buffer amount, whether the base station is to configure, clear, add, deactivate, activate, resume, change, reconfigure, or suspend dual connectivity, a cell group (e.g., secondary cell group), or a cell. The master base station may transmit a first RRC message 16-10 to the UE in order to configure, clear, add, deactivate, activate, resume, change, reconfigure, or suspend dual connectivity, a cell group (secondary cell group), or a cell for the determined secondary base station. For the first RRC message, each separate new request message may be defined and used to perform indication to configure, clear, add, deactivate, activate, resume, change, reconfigure, or suspend dual connectivity, a cell group (secondary cell group), or a cell for the UE, and alternatively, a new indicator may be defined from an existing message (e.g., RRCReconfiguration message or RRCResume message) so as to indicate (or request) to configure, clear, add, deactivate, activate, resume, change, reconfigure, or suspend a cell group (e.g., secondary cell group), or a cell. The first RRC message may include some of the following information.

- First RRC message identifier for distinguishing the first RRC message (e.g., rrc-Transaction identifier) The UE and the base station (e.g., master base station) transmit or receive multiple RRC messages to and from each other, and identifiers for distinguishing the respective RRC messages may be thus included in the RRC messages. For example, an RRC message (e.g., RRCReconfiguration message) transmitted by a transmission end, an RRC message (e.g., RRCReconfigurationComplete message) corresponding to the RRC message (e.g., RRCReconfiguration message) transmitted by a reception end, or an RRC message corresponding to the RRC message transmitted by the transmission end may include the same first RRC message identifier.
- Indicator or configuration information (e.g., indicator or configuration information for the UE) for configuring, clearing, adding, deactivating, activating, resuming, changing, reconfiguring, or suspending dual connectivity, a cell group (secondary cell group), or a cell
- Indicator indicating a cell group state (e.g., activation, deactivation, suspension, or resumption)
- Cell group identifier for distinguishing cell groups. The cell group identifier may be assigned by the master base station, or one identifier among previously agreed identifiers may be assigned by the secondary base station.
- Cell group or cell configuration information
- Bearer configuration information. For example, indicator information indicating an operation of a protocol layer (e.g., SDAP layer, PDCP layer, RLC layer, or MAC layer) of each bearer (e.g., PDCP suspension indicator, PDCP re-establishment indicator, PDCP data recovery indicator, RLC re-establishment indicator, MAC partial reset indicator, MAC reset indicator, or indicator triggering a new operation)
- If an indicator or configuration information for configuring, adding, activating, resuming, changing, or reconfiguring dual connectivity, a cell group (secondary cell group), or a cell is included, a first indicator (e.g., mobilityControlInfor or Reconfiguration WithSync) may be included together. However, if an indicator or configuration information for clearing, deactivating, reconfiguring, or suspending dual connectivity, a cell group (secondary cell group), or a cell is included, the first indicator (e.g., mobilityControlInfor or ReconfigurationWithSync) may not be included. The first indicator may be an indicator triggering random access to the cell group or cell, an indicator for synchronizing a signal with a new cell, an indicator indicating frequency shifting of the UE, or an indicator indicating changing of a cell group (or cell). As another method, the UE may perform PDCCH monitoring in the indicated or configured cell group or cell, and may trigger and perform random access as indicated in PDCCH. For example, an upper layer (e.g., RRC layer) may transmit, to a lower layer (e.g., MAC layer), an indicator triggering random access.
- If the indicator or configuration information for configuring, adding, activating, resuming, changing, or reconfiguring dual connectivity, a cell group (secondary cell group), or a cell is included, random access configuration information may be included together. However, if the indicator or configuration information for clearing, deactivating, reconfiguring, or suspending dual connectivity, a cell group (secondary cell group), or a cell is included, the random access configuration information may not be included. The random access configuration information may include random access transmission resource information (time or frequency transmission resource), designated preamble information, or the like for preamble transmission for the cell group or cell.

Time information indicating when to activate, resume, deactivate, or suspend dual connectivity, a cell group (e.g., secondary cell group), or a cell (PSCell or SCG SCell) (for example, information indicating timing (e.g., X time unit, subframe unit, time slot unit, or symbol unit), for example, time information indicating, if the message is received in an nth time unit, whether to activate, resume, deactivate, or suspend the cell in an (n+X)th time unit)

When the first RRC message 16-10 is received, the UE may read and check the first RRC message, and the UE may configure, add, change, resume, suspend, or deactivate dual connectivity or a cell group (e.g., secondary cell group). If the first indicator triggering random access is included in the first RRC message, or if a state indicator of the cell group indicates activation or resumption, the configured bearer configuration information or each piece of configuration information of a protocol layer may be applied or established, or random access may be triggered for the configured or indicated cell group or cell. When random access is performed, if there is random access information in the RRC message, or if there is random access information that has been stored, random access (e.g., contention-free random access (e.g., 4-step random access or 2-step random access)) may be performed on the basis of system information or the random access information that has been stored or received via the RRC message. If there is no random access information in the RRC message, random access (e.g., contention-based random access (e.g., 4-step random access or 2-step random access)) may be performed. As another method, the UE may perform PDCCH monitoring in the indicated or configured cell group or cell, and may trigger and perform random access as indicated in PDCCH. For example, an upper layer (e.g., RRC layer) may transmit, to a lower layer (e.g., MAC layer), an indicator triggering random access. If the first indicator triggering random access is included in neither the second RRC message nor the first RRC message, or if a cell group state indicates suspension, deactivation, or clearing, the RRC message or cell group configuration information corresponding to the cell group identifier may be stored in consideration thereof.

The UE may receive the first RRC message 16-10 or apply received configuration information, and may generate a second RRC message 16-15 and transmit the same to the base station. The second RRC message may include some of the following information.

First RRC message identifier having the same value as that of the first RRC message identifier included in the first RRC message Indicator or identifier indicating that the first RRC message has been successfully received When the base station (e.g., master base station) receives the second RRC message, the base station may determine, via a first identifier, whether the received message is a response message to the first RRC message. The base station may check the first RRC message, and may transmit an indication message 16-20, which includes an indication that a cell group has been configured, added, cleared, activated, resumed, suspended, or deactivated for a secondary cell group base station, to the secondary base station via an Xn interface (e.g., interface between base stations) or an Sn interface (e.g., interface between base stations or a base station and AMF or UMF). The indication message may include some of the following information.

Identifier capable of distinguishing the indication message

Indicator or configuration information (e.g., indicator or configuration information for the secondary cell group) for configuring, clearing, adding, deactivating, activating, resuming, changing, reconfiguring, or suspending dual connectivity, a cell group (secondary cell group), or a cell When the indication message is received, the base station (e.g., secondary base station) may read and check a message or configuration information included in the indication message, and may generate an indication acknowledge message as a response message to the indication message, so as to transmit the indication acknowledge message 16-25 to the master base station.

Figure 17:
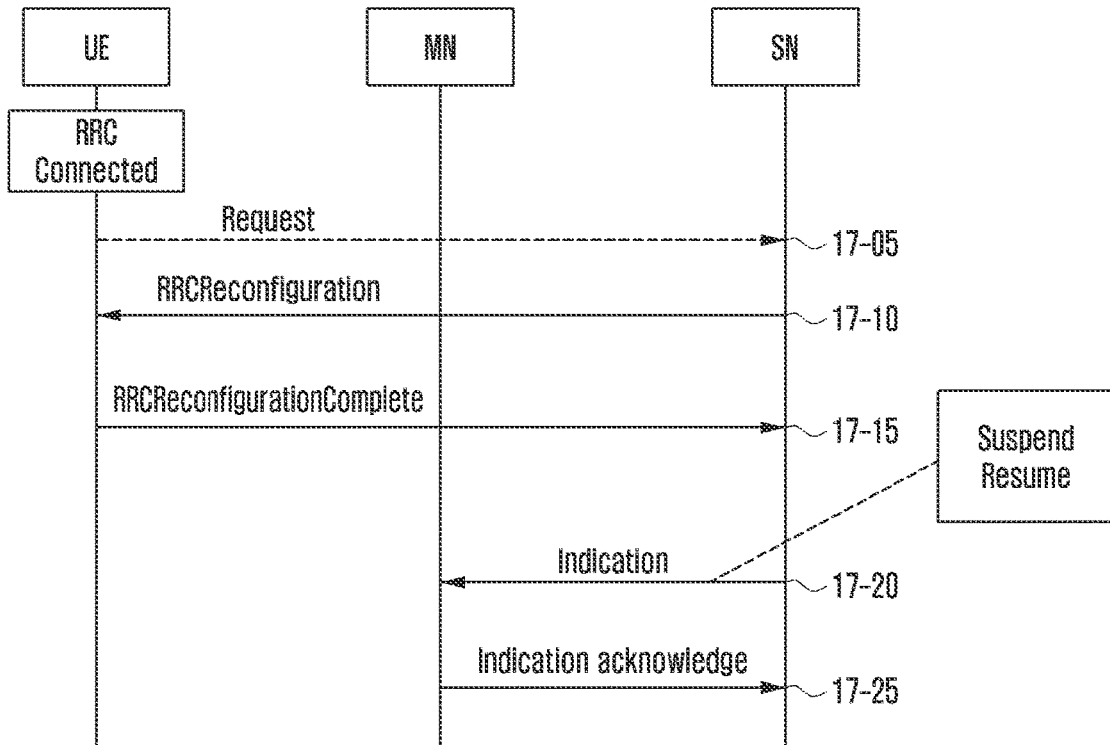
FIG. 17 is a diagram illustrating a third signaling procedure of configuring or releasing dual connectivity, or configuring, releasing, activating, resuming, suspending, or deactivating a secondary cell group for which dual connectivity is configured according to an embodiment of the disclosure.
Figure 17:
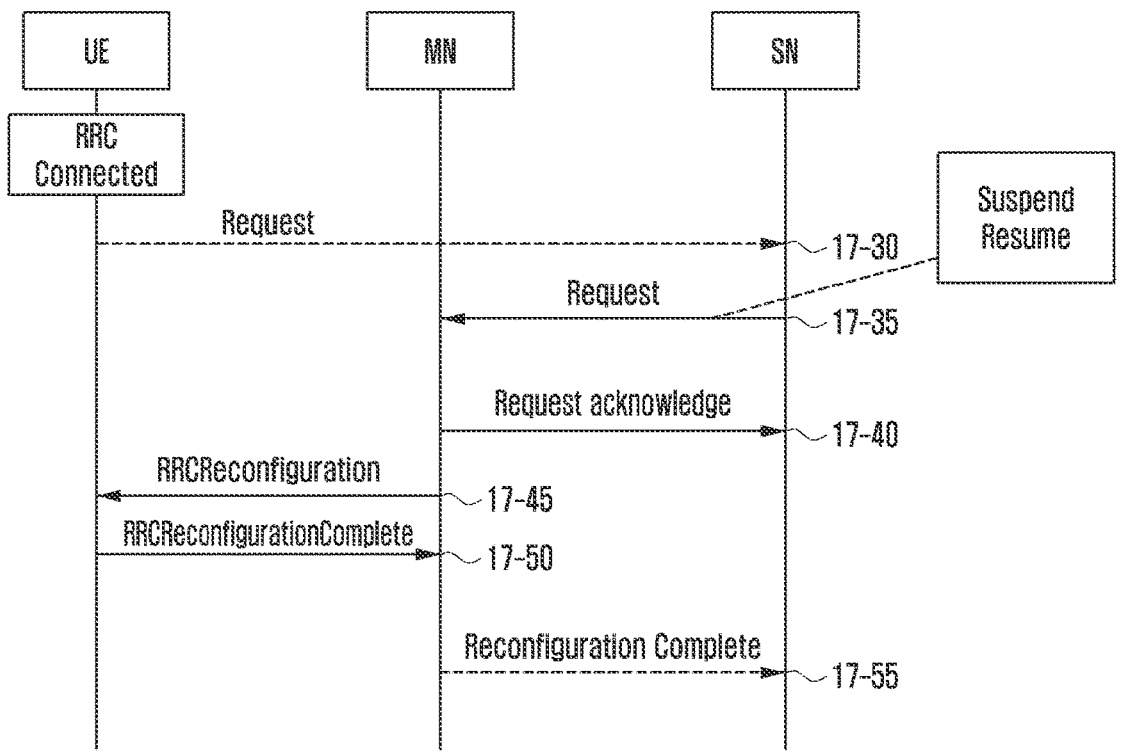

Identifier having the same value as that of the indicator included in the indication message Indicator or identifier indicating that the indication message has been successfully received Response indicator indicating that the indication message has been successfully applied FIG. 17 is a diagram illustrating a third signaling procedure of configuring or releasing dual connectivity, or configuring, releasing, activating, resuming, suspending, or deactivating a secondary cell group for which dual connectivity is configured according to an embodiment of the disclosure.

Referring to FIG. 17, a UE may establish an RRC connection with a network or a base station as in FIG. 6 of the disclosure, and may transmit data to or receive data from the base station (e.g., master cell group (MCG), master node (MN), or cells (PCell or SCell) of the master cell group).

Referring to FIG. 17, according to configuration procedures in FIG. 6, the base station may configure, for the UE, an SRB (e.g., SRB3) enabling direct transmission or reception of a control message or an RRC message between the UE and a secondary base station.

The base station (e.g., secondary base station or master base station) may configure dual connectivity for the UE according to a predetermined reason (e.g., when a high data transmission rate is required, when high QoS requirements should be satisfied, or in response to a request 17-05 from the UE). For example, the UE may transmit, to the base station, a request for configuring or releasing, activating or deactivating, or resuming or suspending dual connectivity, a cell group (e.g., secondary cell), or a cell, or may transmit a request to the secondary base station via SRB3, and a message for the request 17-05 may include a frequency (or channel) measurement result report, a cell group identifier, cell identifiers, or measurement results. As another method, the secondary base station may determine, by considering a downlink (or uplink) data amount or a buffer amount, whether the base station is to configure, clear, add, deactivate, activate, resume, change, reconfigure, or suspend dual connectivity, a cell group (e.g., secondary cell group), or a cell.

The secondary base station (secondary node (SN) or secondary cell group (SCG)) may receive a frequency or channel measurement report for each frequency or channel received from the UE, and may determine whether to configure, release, add, deactivate, activate, resume, change, reconfigure, or suspend dual connectivity, a cell group (secondary cell group), or a cell on the basis of the measurement report. Alternatively, the secondary base station may determine, by considering a downlink (or uplink) data amount or a buffer amount, whether the base station is to configure, release, add, deactivate, activate, resume, change, reconfigure, or suspend dual connectivity, a cell group (e.g., secondary cell group), or a cell.

The secondary base station may transmit a first RRC message 17-10 to the UE via SRB3 in order to configure, release, add, deactivate, activate, resume, change, reconfigure, or suspend dual connectivity, a cell group (secondary cell group), or a cell. For the first RRC message, each separate new request message may be defined and used to perform indication to configure, clear, add, deactivate, activate, resume, change, reconfigure, or suspend dual connectivity, a cell group (secondary cell group), or a cell for the UE, and alternatively, a new indicator may be defined from an existing message (e.g., RRCReconfiguration message or RRCResume message) so as to indicate (or request) to configure, release, add, deactivate, activate, resume, change, reconfigure, or suspend a cell group (e.g., secondary cell group), or a cell. The first RRC message may include some of the following information.

- First RRC message identifier for distinguishing the first RRC message (e.g., rrc-Transaction identifier) The UE and the base station (e.g., secondary base station) transmit or receive multiple RRC messages to or from each other, and identifiers for distinguishing the respective RRC messages may be thus included in the RRC messages. For example, an RRC message (e.g., RRCReconfiguration message) transmitted by a transmission end, an RRC message (e.g., RRCReconfigurationComplete message) corresponding to the RRC message (e.g., RRCReconfiguration message) transmitted by a reception end, or an RRC message corresponding to the RRC message transmitted by the transmission end may include the same first RRC message identifier.
- Indicator or configuration information (e.g., indicator or configuration information for the UE) for configuring, releasing, adding, deactivating, activating, resuming, changing, reconfiguring, or suspending dual connectivity, a cell group (secondary cell group), or a cell
- Indicator indicating a cell group state (e.g., activation, deactivation, suspension, or resumption)
- Cell group identifier for distinguishing cell groups The cell group identifier may be assigned by a master base station, or one identifier among previously agreed identifiers may be assigned by the secondary base station.
- Cell group or cell configuration information
- Bearer configuration information For example, indicator information indicating an operation of a protocol layer (e.g., SDAP layer, PDCP layer, RLC layer, or MAC layer) of each bearer (e.g., PDCP suspension indicator, PDCP re-establishment indicator, PDCP data recovery indicator, RLC re-establishment indicator, MAC partial reset indicator, MAC reset indicator, or indicator triggering a new operation)
- If an indicator or configuration information for configuring, adding, activating, resuming, changing, or reconfiguring dual connectivity, a cell group (secondary cell group), or a cell is included, a first indicator (e.g., mobilityControlInfor or ReconfigurationWithSync) may be included together. However, if an indicator or configuration information for clearing, deactivating, reconfiguring, or suspending dual connectivity, a cell group (secondary cell group), or a cell is included, the first indicator (e.g., mobilityControlInfor or ReconfigurationWithSync) may not be included. The first indicator may be an indicator triggering random access to the cell group or cell, an indicator for synchronizing a signal with a new cell, an indicator indicating frequency shifting of the UE, or an indicator indicating changing of a cell group (or cell). As another method, the UE may perform PDCCH monitoring in the indicated or configured cell group or cell, and may trigger and perform random access as indicated in PDCCH. For example, an upper layer (e.g., RRC layer) may transmit, to a lower layer (e.g., MAC layer), an indicator triggering random access.
- If the indicator or configuration information for configuring, adding, activating, resuming, changing, or reconfiguring dual connectivity, a cell group (secondary cell group), or a cell is included, random access configuration information may be included together. However, if the indicator or configuration information for releasing, deactivating, reconfiguring, or suspending dual connectivity, a cell group (secondary cell group), or a cell is included, the random access configuration information may not be included. The random access configuration information may include random access transmission resource information (time or frequency transmission resource), designated preamble information, or the like for preamble transmission for the cell group or cell.
- Time information indicating when to activate, resume, deactivate, or suspend dual connectivity, a cell group (e.g., secondary cell group), or a cell (PSCell or SCG SCell) (for example, information indicating timing (e.g., X time unit, subframe unit, time slot unit, or symbol unit), for example, time information indicating, if the message is received in an nth time unit, whether to activate, resume, deactivate, or suspend the cell in an (n+X)th time unit)

When the first RRC message 17-10 is received via SRB3, the UE may read and check the first RRC message, and the UE may configure, add, change, resume, suspend, or deactivate dual connectivity or a cell group (e.g., secondary cell group). If the first indicator triggering random access is included in the first RRC message, or if a state indicator of the cell group indicates activation or resumption, the configured bearer configuration information or each piece of configuration information of a protocol layer may be applied or established, or random access may be triggered for the configured or indicated cell group or cell. When random access is performed, if there is random access information in the RRC message, or if there is random access information that has been stored, random access (e.g., contention-free random access (e.g., 4-step random access or 2-step random access)) may be performed on the basis of system information or the random access information that has been stored or received via the RRC message. If there is no random access information in the RRC message, random access (e.g., contention-based random access (e.g., 4-step random access or 2-step random access)) may be performed. As another method, the UE may perform PDCCH monitoring in the indicated or configured cell group or cell, and may trigger and perform random access as indicated in PDCCH. For example, an upper layer (e.g., RRC layer) may transmit, to a lower layer (e.g., MAC layer), an indicator triggering random access. If the first indicator triggering random access is included in neither the second RRC message nor the first RRC message, or if a cell group state indicates suspension, deactivation, or releasing, the RRC message or cell group configuration information corresponding to the cell group identifier may be stored in consideration thereof.

The UE may receive the first RRC message 17-10 or apply received configuration information, and may generate a second RRC message so as to transmit the second RRC message 17-15 to the secondary base station via SRB3. The second RRC message may include some of the following information.

First RRC message identifier having the same value as that of the first RRC message identifier included in the first RRC message Indicator or identifier indicating that the first RRC message has been successfully received When the base station (e.g., secondary base station) receives the second RRC message, the base station may determine, via a first identifier, whether the received message is a response message to the first RRC message. The base station may check the first RRC message, and may transmit an indication message 17-20, which includes an indication that a cell group has been configured, added, cleared, activated, resumed, suspended, or deactivated for the master base station or a master cell group base station, to the master base station via an Xn interface (e.g., interface between base stations) or an Sn interface (e.g., interface between base stations or a base station and AMF or UMF). The indication message may include some of the following information.

Identifier capable of distinguishing the indication message

Indicator or configuration information (e.g., indicator or configuration information for the secondary cell group) for configuring, releasing, adding, deactivating, activating, resuming, changing, reconfiguring, or suspending dual connectivity, a cell group (secondary cell group), or a cell When the indication message is received, the base station (e.g., master base station) may read and check a message or configuration information included in the indication message, and may generate an indication acknowledge message as a response message to the indication message, so as to transmit the indication acknowledge message 17-25 to the secondary base station.

Identifier having the same value as that of the indicator included in the indication message Indicator or identifier indicating that the indication message has been successfully received Response indicator indicating that the indication message has been successfully applied As another method, referring to FIG. 17, the UE may activate, suspend, resume, deactivate, or clear a cell group on the basis of the following signaling.

The base station may configure dual connectivity for the UE according to a predetermined reason (e.g., when a high data transmission rate is required, when high QoS requirements should be satisfied, or in response to a request 17-30 from the UE). For example, the UE may transmit, to the base station, a request for configuring or releasing, activating or deactivating, or resuming or suspending dual connectivity, a cell group (e.g., secondary cell group), or a cell, and a message for the request 17-30 may include a frequency (or channel) measurement result report, a cell group identifier, cell identifiers, or measurement results. As another method, the base station may determine, by considering a downlink (or uplink) data amount or a buffer amount, whether the base station is to configure, clear, add, deactivate, activate, resume, change, reconfigure, or suspend dual connectivity, a cell group (e.g., secondary cell group), or a cell.

The secondary base station (secondary node (SN) or secondary cell group (SCG)) may receive a frequency or channel measurement report for each frequency or channel received from the UE, and may determine activation, suspension, deactivation, or resumption of the secondary base station (secondary node (SN) or secondary cell group (SCG)), for which dual connectivity is configured, on the basis of the measurement report. Alternatively, the secondary base station may determine, by considering a downlink (or uplink) data amount or a buffer amount of a bearer configured for the secondary base station, whether the base station is to configure, clear, add, deactivate, activate, resume, change, reconfigure, or suspend dual connectivity, a cell group (e.g., secondary cell group), or a cell. In order to configure, clear, add, deactivate, activate, resume, change, reconfigure, or suspend dual connectivity, a cell group (secondary cell group), or a cell for the master base station, the secondary base station may transmit, to the master base station, a request message 17-35 of the UE to a master cell group, via an Xn interface (e.g., interface between base stations) or an Sn interface (e.g., interface between base stations or a base station and AMF or UMF). For the request message, each separate new request message may be defined and used to configure, clear, add, deactivate, activate, resume, change, reconfigure, or suspend dual connectivity, a cell group (secondary cell group), or a cell for the master base station, and alternatively, a new indicator may be defined from an existing message (e.g., SN addition request message, SN modification request message, SN release request message, or the like) so as to indicate (or request) to configure, clear, add, deactivate, activate, resume, change, reconfigure, or suspend a cell group (secondary cell group), or a cell. The request message may include information, such as cell group configuration information (e.g., master cell group configuration information) currently configured for the UE, bearer configuration information, capability information of the UE, frequency (or channel) measurement result information of the UE, or the like, and when a secondary cell group is configured for the UE in consideration of the information, the master base station may configure secondary cell group configuration information or the bearer configuration information so as not to exceed a UE capability or according to the UE capability or the bearer configuration information of the master cell group. As another method, the request message may include an RRC message including configuration information of the UE, and the master base station may forward the RRC message to the UE so as to indicate configuration, releasing, addition, deactivation, activation, resumption, changing, reconfiguration, or suspension of the cell group (e.g., secondary cell group) or cell.

When the master base station having received the request message 17-35 rejects the request message, the master base station may configure a rejection message and transmit message 17-40 to the secondary base station via the Xn interface (e.g., interface between base stations) or the Sn interface (e.g., interface between base stations or a base station and AMF or UMF). If the request message is accepted, the master base station may transmit message 17-40 (a request acknowledge message) including an indicator or configuration information for configuring, releasing, adding, deactivating, activating, resuming, changing, reconfiguring, or suspending dual connectivity, a cell group (secondary cell group), or a cell to the secondary base station via the Xn interface (e.g., interface between base stations) or the Sn interface (e.g., interface between base stations or a base station and AMF or UMF). The request message 17-35 or the request acknowledge message 17-40 may include some of the following information.

Identifier identical to a message identifier included in the request message, indicator indicating acceptance of the request made from the request message, or identifier for distinguishing the request message Indicator or configuration information (e.g., indicator or configuration information for the master cell group) for configuring, releasing, adding, deactivating, activating, resuming, changing, reconfiguring, or suspending dual connectivity, a cell group (secondary cell group), or a cell First RRC message (e.g., RRCReconfiguration message) including an indicator or configuration information for configuring, releasing, adding, deactivating, activating, resuming, changing, reconfiguring, or suspending dual connectivity, a cell group (secondary cell group), or a cell The first RRC message may include some of the following information.

First RRC message identifier for distinguishing the first RRC message (e.g., rrc-Transaction identifier) The UE and the base station (e.g., secondary base station) transmit or receive multiple RRC messages to or from each other, and identifiers for distinguishing the respective RRC messages may be thus included in the RRC messages. For example, an RRC message (e.g., RRCReconfiguration message) transmitted by a transmission end, an RRC message (e.g., RRCReconfigurationComplete message) corresponding to the RRC message (e.g., RRCReconfiguration message) transmitted by a reception end, or an RRC message corresponding to the RRC message transmitted by the transmission end may include the same first RRC message identifier.

Indicator or configuration information (e.g., indicator or configuration information for the UE) for configuring, releasing, adding, deactivating, activating, resuming, changing, reconfiguring, or suspending dual connectivity, a cell group (secondary cell group), or a cell Indicator indicating a cell group state (e.g., activation, deactivation, suspension, or resumption)

Cell group identifier for distinguishing cell groups The cell group identifier may be assigned by a master base station, or one identifier among previously agreed identifiers may be assigned by the secondary base station.

Cell group or cell configuration information

Bearer configuration information For example, indicator information indicating an operation of a protocol layer (e.g., SDAP layer, PDCP layer, RLC layer, or MAC layer) of each bearer (e.g., PDCP suspension indicator, PDCP re-establishment indicator, PDCP data recovery indicator, RLC re-establishment indicator, MAC partial reset indicator, MAC reset indicator, or indicator triggering a new operation)

If an indicator or configuration information for configuring, adding, activating, resuming, changing, or reconfiguring dual connectivity, a cell group (secondary cell group), or a cell is included, a first indicator (e.g., mobilityControlInfor or Reconfiguration WithSync) may be included together. However, if an indicator or configuration information for releasing, deactivating, reconfiguring, or suspending dual connectivity, a cell group (secondary cell group), or a cell is included, the first indicator (e.g., mobilityControlInfor or ReconfigurationWithSync) may not be included. The first indicator may be an indicator triggering random access to the cell group or cell, an indicator for synchronizing a signal with a new cell, an indicator indicating frequency shifting of the UE, or an indicator indicating changing of a cell group (or cell).

If the indicator or configuration information for configuring, adding, activating, resuming, changing, or reconfiguring dual connectivity, a cell group (secondary cell group), or a cell is included, random access configuration information may be included together. However, if the indicator or configuration information for releasing, deactivating, reconfiguring, or suspending dual connectivity, a cell group (secondary cell group), or a cell is included, the random access configuration information may not be included. The random access configuration information may include random access transmission resource information (time or frequency transmission resource), dedicated preamble information, or the like for preamble transmission for the cell group or cell.

Time information indicating when to activate, resume, deactivate, or suspend dual connectivity, a cell group (e.g., secondary cell group), or a cell (PSCell or SCG SCell) (for example, information indicating timing (e.g., $X$ time unit, subframe unit, time slot unit, or symbol unit), for example, time information indicating, if the message is received in an nth time unit, whether to activate, resume, deactivate, or suspend the cell in an $(n+X)$th time unit)

When the request message 17-35 is accepted, the master base station may check the request message, and may transmit, to the UE, a second RRC message 17-45 (e.g., RRCReconfiguration message) including information (e.g., first RRC message included in the request message 17-35) included in the request message. The second RRC message may include some of the following information.

Second RRC message identifier for distinguishing the second RRC message (e.g., rrc-Transaction identifier) The UE and the base station (e.g., master base station) transmit or receive multiple RRC messages to and from each other, and identifiers for distinguishing the respective RRC messages may be thus included in the RRC messages. For example, an RRC message (e.g., RRCReconfiguration message) transmitted by a transmission end, an RRC message (e.g., RRCReconfigurationComplete message) corresponding to the RRC message (e.g., RRCReconfiguration message) transmitted by a reception end, or an RRC message corresponding to the RRC message transmitted by the transmission end may include the same second RRC message identifier.

First RRC message included in the request acknowledge message 17-40 or the request message 17-35

Indicator or configuration information (e.g., indicator or configuration information for the UE) for configuring, releasing, adding, deactivating, activating, resuming, changing, reconfiguring, or suspending dual connectivity, a cell group (secondary cell group), or a cell Indicator indicating a cell group state (e.g., activated, deactivated, suspended, or resumed)

Cell group identifier for distinguishing cell groups. The cell group identifier may be assigned by the master base station, or one identifier among previously agreed identifiers may be assigned by the secondary base station.

Cell group or cell configuration information

Bearer configuration information For example, indicator information indicating an operation of a protocol layer (e.g., SDAP layer, PDCP layer, RLC layer, or MAC layer) of each bearer (e.g., PDCP suspension indicator, PDCP re-establishment indicator, PDCP data recovery indicator, RLC re-establishment indicator, MAC partial reset indicator, MAC reset indicator, or indicator triggering a new operation)

If an indicator or configuration information for configuring, adding, activating, resuming, changing, or reconfiguring dual connectivity, a cell group (secondary cell group), or a cell is included, a first indicator (e.g., mobilityControlInfor or Reconfiguration WithSync) may be included together. However, if an indicator or configuration information for releasing, deactivating, reconfiguring, or suspending dual connectivity, a cell group (secondary cell group), or a cell is included, the first indicator (e.g., mobilityControlInfor or ReconfigurationWithSync) may not be included. The first indicator may be an indicator triggering random access to the cell group or cell, an indicator for synchronizing a signal with a new cell, an indicator indicating frequency shifting of the UE, or an indicator indicating changing of a cell group (or cell). As another method, the UE may perform PDCCH monitoring in the indicated or configured cell group or cell, and may trigger and perform random access as indicated in PDCCH. For example, an upper layer (e.g., RRC layer) may transmit, to a lower If the indicator or configuration information for configuring, adding, activating, resuming, changing, or reconfiguring dual connectivity, a cell group (secondary cell group), or a cell is included, random access configuration information may be included together. However, if the indicator or configuration information for releasing, deactivating, reconfiguring, or suspending dual connectivity, a cell group (secondary cell group), or a cell is included, the random access configuration information may not be included. The random access configuration information may include random access transmission resource information (time or frequency transmission resource), dedicated preamble information, or the like for preamble transmission for the cell group or cell.

Time information indicating when to activate, resume, deactivate, or suspend dual connectivity, a cell group (e.g., secondary cell group), or a cell (PSCell or SCG SCell) (for example, information indicating timing (e.g., X time unit, subframe unit, time slot unit, or symbol unit), for example, time information indicating, if the message is received in an nth time unit, whether to activate, resume, deactivate, or suspend the cell in an (n+X)th time unit)

When the second RRC message 17-45 is received, the UE may read and check the second RRC message, or may read information (e.g., first RRC message included in the second RRC message) included in the second RRC message, and the UE may configure, add, change, resume, suspend, or deactivate dual connectivity or a cell group (e.g., secondary cell group). If the first indicator triggering random access is included in the second RRC message or in the first RRC message, or if a state indicator of the cell group indicates activation or resumption, the configured bearer configuration information or each piece of configuration information of a protocol layer may be applied or established, or random access may be triggered for the configured or indicated cell group or cell. When random access is performed, if there is random access information in the RRC message, or if there is random access information that has been stored, random access (e.g., contention-free random access (e.g., 4-step random access or 2-step random access)) may be performed on the basis of system information or the random access information that has been stored or received via the RRC message. If there is no random access information in the RRC message, random access (e.g., contention-based random access (e.g., 4-step random access or 2-step random access)) may be performed. As another method, the UE may perform PDCCH monitoring in the indicated or configured cell group or cell, and may trigger and perform random access as indicated in PDCCH. For example, an upper layer (e.g., RRC layer) may transmit, to a lower layer (e.g., MAC layer), an indicator triggering random access. If the first indicator triggering random access is included in neither the second RRC message nor the first RRC message, or if a cell group state indicates suspension, deactivation, or releasing, the RRC message or cell group configuration information corresponding to the cell group identifier may be stored in consideration thereof.

The UE may receive the second RRC message 17-45, may apply received configuration information, and may generate a third RRC message 17-50 or a fourth RRC message so as to transmit the same to the base station. The third RRC message may include some of the following information.

Second RRC message identifier having the same value as that of the second RRC message identifier included in the second RRC message Indicator or identifier indicating that the second RRC message has been successfully received Fourth RRC message including a response indicating that a first RRC message generated and transmitted by a secondary base station has been successfully received. The fourth RRC message may include some of the following information.

First RRC message identifier having the same value as that of the first RRC message identifier included in the first RRC message Indicator or identifier indicating that the first RRC message has been successfully received Response indicator indicating that the first RRC message has been successfully applied When the base station (e.g., master base station) receives the third RRC message, the base station may determine, via a second identifier, whether the received message is a response message to the second RRC message. Further, the base station may check the fourth RRC message included in the third message, and may add the fourth RRC message to a configuration completion message indicating completion of configuration for a secondary cell group base station, so as to transmit the configuration completion message 17-55 to the secondary base station via the Xn interface (e.g., interface between base stations) or the Sn interface (e.g., interface between base stations or a base station and AMF or UMF). The configuration completion message may include some of the following information.

Fourth RRC message included in the third RRC message

Indicator or identifier indicating that configuration (adding, changing, or releasing of a cell group) or indication (activation, deactivation, suspension, or resumption of a cell group) indicated via the request message, the request acknowledge message or the first RRC message has been completed When the configuration completion message is received, the base station (e.g., secondary base station) may read and check the fourth RRC message included in the configuration completion message, and may determine, via the first identifier, whether the fourth RRC message is a response message to the first RRC message. Further, the base station may determine whether the indicated configuration or indication has been successfully completed. When the configuration completion message or the fourth RRC message is received, the secondary base station may transmit, to the master base station in response to the reception, a response message indicating that the configuration completion message or the fourth RRC message has been successfully received.

When, as proposed in the disclosure, a message is transmitted to the UE in order to configure or indicate a cell group or cell configuration information to the UE, for example, if the message includes an indicator or configuration information for configuring, adding, activating, resuming, changing, or reconfiguring dual connectivity, a cell group (e.g., secondary cell group), or a cell, SDAP configuration information may be included or reconfigured, or mapping configuration information of a QoS flow and a bearer of an SDAP layer may be included, configured or reconfigured. However, when an indicator or configuration information for releasing, deactivating, reconfiguring, or suspending dual connectivity, a cell group (e.g., secondary cell group), or a cell is included, the SDAP configuration information may be neither included nor reconfigured, the mapping configuration information of the QoS flow and the bearer of the SDAP layer may be neither included, configured, nor reconfigured, or application of the mapping configuration information may be suspended.

The signaling proposed in the disclosure may have procedures combined to each other and modified, so as to be extended to new signaling.

The signaling proposed in the disclosure may be extended to multi-connectivity. For example, configuration information of multiple cell groups may be configured for the UE via an RRC message, one or more cell groups (or cells) among the configured multiple cell groups may be activated or resumed via an indicator of PDCCU, MAC control information, or an RRC message, or one or more cell groups may be suspended or deactivated.

Hereinafter, when, as proposed in the disclosure, dual connectivity, a cell group (e.g., secondary cell group), or a cell (PSCell or SCG SCell) is activated, resumed, added, deactivated, cleared, or suspended, a UE operation for each cell (PSCell or SCG SCell) or a UE operation for each protocol layer (e.g., SDAP layer, PDCP layer, RLC layer, MAC layer, or PHY layer) may be proposed.

1> If the UE receives an identifier (e.g., via DCI of PDCCH, MAC control information, or RRC message) or configuration information for configuring, adding, activating, or resuming, changing, or reconfiguring dual connectivity, a cell group (e.g., secondary cell group), or a cell, the UE may perform some of the following procedures.

2> An upper layer (e.g., RRC layer) may indicate the configuration information or indicator to a lower layer (e.g., PDCP layer, RLC layer, MAC layer, or PHY layer).

2> UE operation for PSCell: When an indicator or configuration information is received, the UE may maintain a PSCell active, may activate a downlink bandwidth part of the PSCell to a normal bandwidth part (e.g., first active bandwidth part, or bandwidth part other than a dormant bandwidth part) configured via the RRC message, or a last activated bandwidth part, and may perform a UE operation of the activated bandwidth part. As another method, when an indicator or configuration information is received, the UE may maintain a PSCell active, may reconfigure or switch a DRX configuration cycle or a PDCCH monitoring cycle of the PSCell to a short cycle on the basis of first DRX configuration information, and may perform PDCCH monitoring and a UE operation of the active cell. In this way, the UE operation for the PSCell may be performed to enable reception of a scheduling indication from a cell group or a cell, and a quick start of data transmission or reception. In order to receive a scheduling indication from a cell group or cell, and to start data transmission or reception more quickly, the UE may measure many or frequent channel signals on the basis of first channel measurement configuration information configured via the RRC message, and may perform quick channel measurement reporting, that is, report a measurement result to the base station. When a predetermined condition is satisfied, the UE may measure a channel signal again on the basis of second channel measurement configuration information and may report a measurement result to the UE.

2> UE operation for SCell of secondary cell group: When an indicator or configuration information is received, the UE may activate an SCell of a secondary cell group, may activate a downlink bandwidth part or an uplink bandwidth part to a bandwidth part (e.g., first active bandwidth part) configured via the RRC message, and may perform a UE operation of the activated SCell or bandwidth part. As another method, when an indicator or configuration information is received, if a dormant bandwidth part is configured for an SCell of the secondary cell group, the UE may maintain the SCell active, may activate a downlink bandwidth part of the SCell to a bandwidth part (e.g., first active bandwidth part) configured via the RRC message, and may perform a UE operation of the activated bandwidth part, or if a dormant bandwidth part is not configured for the SCell of the secondary cell group, the UE may switch the SCell to an active state, may activate the downlink bandwidth part or uplink bandwidth part to a bandwidth part (e.g., first active bandwidth part) configured via the RRC message, and may perform a UE operation of the activated SCell or bandwidth part. As another method, when an indicator or configuration information is received, the UE may determine, according to an indicator or SCell configuration information configured in the message including the indicator or configuration information, switching, activation, or deactivation of a bandwidth part or a state of the SCell, and may perform a UE operation.

2> UE operation of MAC layer for secondary cell group: When an indicator or configuration information is received, the UE may perform resetting for a MAC layer (MAC reset) (for example, the UE may reset or clear configuration information configured for the MAC layer, may suspend or reset configured timers, or may suspend or reset an HARQ procedure). For example, a timing advance timer (TAT) indicating validity of signal synchronization between the UE and the base station may be considered to be suspended or expired. As another method, when an indicator or configuration information is received, the UE may perform MAC partial reset (alternatively, when the message including the indicator or configuration information includes an indicator indicating MAC partial reset, the MAC partial reset may be performed). For example, the timing advance timer (TAT) indicating validity of signal synchronization between the UE and the base station may be continuously maintained, or HARQ retransmission that has been performed may be continued. As another method, the current configuration may be maintained without performing any procedure for the MAC layer. If an indication of triggering random access is indicated from an upper layer (e.g., RRC layer), or if the TAT is suspended or has expired, the UE may trigger random access. Alternatively, if the TAT has not been suspended or has not expired, random access may not be triggered or performed. This is because, if the TAT is running, synchronization between the secondary cell group and a signal is made (or maintained), and thus unnecessary random access is performed.

2> Operation for data radio bearer (DRB) configured for secondary cell group: When an indicator or configuration information is received, the UE may resume DRBs (or SN (SCG) terminated DRB, or DRB in which a PDCP layer is configured for the SCG) included in the secondary cell group. For example, for a split bearer (one RLC layer is configured for the master cell group, and another RLC layer is configured for the secondary cell group) in which the PDCP layer is configured for the master cell group, the RRC message including the configuration information or indicator may include an indicator (reestablishRLC) triggering re-establishment of the RLC layer configured for the secondary cell group, or the UE may perform re-establishment for the RLC layer configured for the secondary cell group. For example, for a split bearer (one RLC layer is configured for the master cell group, and another RLC layer is configured for the secondary cell group) in which the PDCP layer is configured for the secondary cell group, the RRC message including the configuration information or indicator may include an indicator (reestablishRLC) triggering re-establishment of the RLC layer configured for the master cell group, an indicator triggering PDCP re-establishment (reestablishPDCP) or PDCP resumption (PDCP resume) in the PDCP layer configured for the secondary cell group may be included together, or the UE may perform re-establishment for the RLC layer configured for the master cell group, or may perform PDCP re-establishment or PDCP resumption (PDCP resume) in the PDCP layer configured for the secondary cell group. For example, with respect to bearers configured for the secondary cell group, the bearers may be resumed, the RRC layer may indicate, to the PDCP layer, triggering of PDCP re-establishment or PDCP resumption, or PDCP re-establishment or PDCP resumption (PDCP resume) may be performed in the PDCP layer. The UE may trigger first PDCP resumption for the bearers configured for the secondary cell group, or may perform the first PDCP resumption in the PDCP layer. As another method, in order to solve a security issue caused by transmission of different data with the same security key when the secondary cell group is activated or resumed, the UE may trigger second PDCP resumption for the bearers configured for the secondary cell group, or may perform the second PDCP resumption in the PDCP layer. As another method, when PDCP layer resumption is triggered in an upper layer, the first PDCP resumption may be triggered and performed, and when the upper layer triggers the PDCP layer resumption or indicates an indicator for activation or resumption of a cell group (or cell), second PDCP resumption may be triggered and performed. As another method, in order to solve a security issue caused by transmission of different data with the same security key, when an indicator for activation or resumption of a cell group (or cell) is indicated, the base station may configure a network security key by adding security key configuration information (e.g., sk-counter) to the RRC message including the indicator for activation or resumption of the cell group (or cell) and may enable a change or update of the security key, the RRC message includes a PDCP re-establishment indicator to enable a change or update of the security key of the bearers configured for the secondary cell group, or the UE may perform PDCP re-establishment for the bearers. As another method, when the RRC message includes security key configuration information so as to enable a change of the security key, or an indication of PDCP layer re-establishment is included, PDCP layer re-establishment may be performed, and if the RRC message does not include security key configuration information, or if an indicator indicates a PDCP layer operation, the first PDCP resumption or the second PDCP resumption may be triggered and performed. In order not to transmit stored old data when the suspended bearer, PDCP layer, or RLC layer is resumed, the stored data (e.g., PDCP PDU, PDCP SDU, RLC PDU, or RLC SDU) may be discarded. For example, in the PDCP layer, data discard (SDU discard) may be performed, or RLC layer re-establishment may be performed. The data discard (SDU discard) in the PDCP layer, which is to discard the stored data, or RLC layer re-establishment may be performed when suspension, deactivation, or releasing of a cell group is indicated via the RRC message, MAC control information, or DCI of PDCCH.

2> Operation for signaling radio bearer (SRB) configured for secondary cell group: When an indicator or configuration information is received, and a PSCell is activated, or if an activated downlink bandwidth part of the PSCell is a normal bandwidth part other than a dormant bandwidth part, or the activated PSCell performs PDCCH monitoring in a long cycle on the basis of first DRX configuration information, the UE may continuously maintain SRBs (or SN (SCG) terminated SRB, or SRB or SRB3 in which a PDCP layer is configured in SCG) included in the secondary cell group (for example, the UE may continuously transmit or receive a control message to or from the secondary base station). Alternatively, data discard (e.g., RLC re-establishment or discard indication to the PDCP layer) may be performed to discard old data (e.g., PDCP SDU or PDCP PDU) stored in SRBs configured for the secondary cell group. As another method, when an indicator or configuration information is received, the UE may resume SRBs (or SN (SCG) terminated SRB, or SRB or SRB3 in which a PDCP layer is configured in SCG) included in the secondary cell group. Alternatively, data discard (e.g., RLC re-establishment or discard indication to the PDCP layer) may be performed to discard old data (e.g., PDCP SDU or PDCP PDU) stored in SRBs configured for the secondary cell group. For example, for a split bearer (one RLC layer is configured for the master cell group, and another RLC layer is configured for the secondary cell group) in which the PDCP layer is configured for the master cell group, the RRC message including the configuration information or indicator may include an indicator (reestablishRLC) triggering re-establishment of the RLC layer configured for the secondary cell group, or the UE may perform re-establishment for the RLC layer configured for the secondary cell group. For example, for a split bearer (one RLC layer is configured for the master cell group, and another RLC layer is configured for the secondary cell group) in which the PDCP layer is configured for the secondary cell group, the RRC message including the configuration information or indicator may include an indicator (reestablishRLC) triggering re-establishment of the RLC layer configured for the master cell group, an indicator triggering PDCP re-establishment (reestablishPDCP) or PDCP resumption (PDCP resume) in the PDCP layer configured for the secondary cell group may be included together, or the UE may perform re-establishment for the RLC layer configured for the master cell group, or may perform PDCP re-establishment or PDCP resumption (PDCP resume) in the PDCP layer configured for the secondary cell group. For example, with respect to bearers configured for the secondary cell group, the bearers may be resumed, the RLC layer may indicate, to the PDCP layer, triggering of PDCP re-establishment or PDCP resumption, or PDCP re-establishment or PDCP resumption (PDCP resume) may be performed in the PDCP layer. The UE may trigger first PDCP resumption for the bearers configured for the secondary cell group, or may perform the first PDCP resumption in the PDCP layer. As another method, in order to solve a security issue problem caused by transmission of different data with the same security key when the secondary cell group is activated or resumed, the UE may trigger second PDCP resumption for the bearers configured for the secondary cell group, or may perform the second PDCP resumption in the PDCP layer. As another method, when PDCP layer resumption is triggered in an upper layer, the first PDCP resumption may be triggered and performed, and when the upper layer triggers the PDCP layer resumption or indicates an indicator for activation or resumption of a cell group (or cell), second PDCP resumption may be triggered and performed. As another method, in order to solve a security issue caused by transmission of different data with the same security key, when an indicator for activation or resumption of a cell group (or cell) is indicated, the base station may configure a network security key by adding security key configuration information (e.g., sk-counter) to the RRC message including the indicator for activation or resumption of the cell group (or cell) and may enable a change or update of the security key, the RRC message includes a PDCP re-establishment indicator to enable a change or update of the security key of the bearers configured for the secondary cell group, or the UE may perform PDCP re-establishment for the bearers. As another method, when the RRC message includes security key configuration information so as to enable a change of the security key, or an indication of PDCP layer re-establishment is included, PDCP layer re-establishment is performed, and if the RRC message does not include security key configuration information, or if an indicator indicates PDCP layer re-establishment, the first PDCP re-establishment or the second PDCP re-establishment may be triggered and performed. In order not to transmit stored old data when the suspended bearer, PDCP layer, or RLC layer is resumed, the stored data (e.g., PDCP PDU, PDCP SDU, RLC PDU, or RLC SDU) may be discarded. For example, in the PDCP layer, data discard (SDU discard) may be performed, or RLC layer re-establishment may be performed. The data discard (SDU discard) in the PDCP layer, which is to discard the stored data, or RLC layer re-establishment may be performed when suspension, deactivation, or releasing of a cell group is indicated via the RRC message, MAC control information, or DCI of PDCCH.

2> UE operation for PUCCH SCell of secondary cell group: When an indicator or configuration information is received, the UE may activate a PUCCH SCell of a secondary cell group, may activate a downlink bandwidth part or an uplink bandwidth part to a bandwidth part (e.g., first active bandwidth part) configured via the RRC message, and may perform a UE operation of the activated SCell or bandwidth part. As another method, when an indicator or configuration information is received, if a dormant bandwidth part is configured for a PUCCH SCell of the secondary cell group, the UE may maintain the SCell active, may activate a downlink bandwidth part of the SCell to a bandwidth part (e.g., first active bandwidth part) configured via the RRC message, and may perform a UE operation of the activated bandwidth part, or if a dormant bandwidth part is not configured for the SCell of the secondary cell group, the UE may switch the SCell to an active state, may activate the downlink bandwidth part or uplink bandwidth part to a bandwidth part (e.g., first active bandwidth part) configured via the RRC message, and may perform the UE operation of the activated SCell or bandwidth part. As another method, when an indicator or configuration information is received, the UE may determine, according to an indicator or SCell configuration information configured in the message including the indicator or configuration information, switching, activation, or deactivation of a bandwidth part or a state of the SCell, and may perform a UE operation. As another method, when an indicator or configuration information is received, the UE may apply the first DRX configuration information (e.g., suspending second DRX configuration information and performing reconfiguration to the first DRX configuration information) configured via the RRC message for the PUCCH SCell, and if PDCCH monitoring can be performed, a UE operation in the activated SCell may be performed.

1> If the UE receives an identifier (e.g., via DCI of PDCCH, MAC control information, or RRC message) or configuration information for releasing, deactivating, reconfiguring, or suspending dual connectivity, a cell group (e.g., secondary cell group), or a cell, the UE may perform some of the following procedures.

2> An upper layer (e.g., RRC layer) may indicate the configuration information or indicator to a lower layer (e.g., PDCP layer, RLC layer, MAC layer, or PHY layer).

2> UE operation for PSCell: When an indicator or configuration information is received, the UE may maintain a PSCell active, may activate a downlink bandwidth part of the PSCell to a dormant bandwidth part configured via the RRC message, and may perform a UE operation in the activated bandwidth part. As another method, when an indicator or configuration information is received, the UE may maintain a PSCell active, may reconfigure or switch a DRX configuration cycle or a PDCCH monitoring cycle of the PSCell to a very long cycle on the basis of the second DRX configuration information, and may perform PDCCH monitoring and a UE operation of the active cell. As another method, when an indicator or configuration information is received, the UE may deactivate a PSCell and may perform a UE operation of the deactivated cell. In this way, by performing a UE operation for the PSCell, power consumption of the UE may be reduced.

2> UE operation for SCell of secondary cell group: When an indicator or configuration information is received, the UE may deactivate an SCell of the secondary cell group and may perform a UE operation of the deactivated SCell. As another method, when an indicator or configuration information is received, if a dormant bandwidth part is configured for the SCell of the secondary cell group, the UE may maintain the SCell active, may activate a downlink bandwidth part of the SCell to a dormant bandwidth part, and may perform a UE operation in the dormant bandwidth part, or if no dormant bandwidth part is configured for the SCell of the secondary cell group, the UE may switch the SCell to a deactivated state, and may perform a UE operation in the deactivated cell or bandwidth part. As another method, when an indicator or configuration information is received, the UE may determine, according to an indicator or SCell configuration information configured in the message including the indicator or configuration information, switching, activation, or deactivation of a bandwidth part or a state of the SCell, and may perform a UE operation.

2> UE operation of MAC layer for secondary cell group: When an indicator or configuration information is received, the UE may perform resetting for a MAC layer (MAC reset) (for example, the UE may reset or clear configuration information configured for the MAC layer, may suspend or reset configured timers, or may suspend or reset an HARQ procedure). For example, a timing advance timer (TAT) indicating validity of signal synchronization between the UE and the base station may be considered to be suspended or expired. As another method, in order to prevent data loss due to the reset of the MAC layer reset, when an indicator or configuration information is received, the UE may perform MAC partial reset (alternatively, when the message including the indicator or configuration information includes an indicator indicating MAC partial reset, the MAC partial reset may be performed). For example, the timing advance timer (TAT) indicating validity of signal synchronization between the UE and the base station may be continuously maintained, or HARQ retransmission that has been performed may be continued. As another method, the current configuration may be maintained without performing any procedure for the MAC layer.

2> Operation for data radio bearer (DRB) configured for secondary cell group: When an indicator or configuration information is received, the UE may suspend DRBs (or SN (SCG) terminated DRB, or DRB in which a PDCP layer is configured for the SCG) included in the secondary cell group. For example, for a split bearer (one RLC layer is configured for the master cell group, and another RLC layer is configured for the secondary cell group) in which the PDCP layer is configured for the master cell group, the RRC message including the configuration information or indicator may include an indicator (reestablishRLC) triggering re-establishment of the RLC layer configured for the secondary cell group, an indicator triggering PDCP data recovery in the PDCP layer configured for the master cell group, may be included together, or the UE may perform re-establishment for the RLC layer configured for the secondary cell group, or may perform PDCP data recovery in the PDCP layer configured for the master cell group. For example, for a split bearer (one RLC layer is configured for the master cell group, and another RLC layer is configured for the secondary cell group) in which the PDCP layer is configured for the secondary cell group, the RRC message including the configuration information or indicator may include an indicator (reestablishRLC) triggering re-establishment of the RLC layer configured for the master cell group, an indicator triggering PDCP re-establishment (reestablishPDCP) or triggering PDCP suspension (PDCP suspend) in the PDCP layer configured for the secondary cell group may be included together, or the UE may perform re-establishment for the RLC layer configured for the master cell group, or may perform PDCP re-establishment or PDCP suspension (PDCP suspend) in the PDCP layer configured for the secondary cell group. For example, with respect to bearers configured for the secondary cell group, the bearers may be suspend, the RRC layer may indicate, to the PDCP layer, triggering of PDCP re-establishment or PDCP suspension, or PDCP re-establishment or PDCP suspension (PDCP suspend) may be performed in the PDCP layer. The UE may trigger first PDCP suspension for the bearers configured for the secondary cell group, or may perform the first PDCP suspension in the PDCP layer. As another method, in order to solve a security issue caused by transmission of different data with the same security key when the secondary cell group is activated or resumed, the UE may trigger second PDCP suspension for the bearers configured for the secondary cell group, or may perform second PDCP suspension in the PDCP layer. As another method, when PDCP layer suspension is triggered in an upper layer, the first PDCP suspension may be triggered and performed, and when the upper layer triggers the PDCP layer suspension or indicates an indicator for deactivation or suspension of a cell group (or cell), second PDCP suspension may be triggered and performed. As another method, when the RRC message includes security key configuration information so as to enable a change of the security key, or an indication of PDCP layer re-establishment is included, PDCP layer re-establishment may be performed, and if the RRC message does not include security key configuration information, or if an indicator indicates a PDCP layer operation, the first PDCP resumption or the second PDCP resumption may be triggered and performed. In order not to transmit stored old data when the suspended bearer, PDCP layer, or RLC layer is resumed, the stored data (e.g., PDCP PDU, PDCP SDU, RLC PDU, or RLC SDU) may be discarded. For example, in the PDCP layer, data discard (SDU discard) may be performed, or RLC layer re-establishment may be performed. The data discard (SDU discard) in the PDCP layer, which is to discard the stored data, or RLC layer re-establishment may be performed when suspension, deactivation, or releasing of a cell group is indicated via the RRC message, MAC control information, or DCI of PDCCH.

2> Operation for signaling radio bearer (SRB) configured for secondary cell group: When an indicator or configuration information is received, and a PSCell is activated, or if an activated downlink bandwidth part of the PSCell is a normal bandwidth part other than a dormant bandwidth part, or the activated PSCell performs PDCCH monitoring in a long cycle on the basis of second DRX configuration information, the UE may continuously maintain SRBs (or SN (SCG) terminated SRB, or SRB or SRB3 in which a PDCP layer is configured in SCG) included in the secondary cell group without suspension (for example, the UE may continuously transmit or receive a control message to or from the secondary base station). Alternatively, data discard (e.g., RLC re-establishment or discard indication to the PDCP layer) may be performed to discard old data (e.g., PDCP SDU or PDCP PDU) stored in SRBs configured for the secondary cell group. As another method, when an indicator or configuration information is received, the UE may suspend SRBs (or SN (SCG) terminated SRB, or SRB or SRB3 in which a PDCP layer is configured in SCG) included in the secondary cell group. Alternatively, data discard (e.g., RLC re-establishment or discard indication to the PDCP layer) may be performed to discard old data (e.g., PDCP SDU or PDCP PDU) stored in SRBs configured for the secondary cell group. For example, for a split SRB bearer (one RLC layer is configured for the master cell group, and another RLC layer is configured for the secondary cell group) in which the PDCP layer is configured for the master cell group, the RRC message including the configuration information or indicator may include an indicator (reestablishRLC) triggering re-establishment of the RLC layer configured for the secondary cell group, an indicator triggering PDCP data recovery in the PDCP layer configured for the secondary cell group may be included together, or the UE may perform re-establishment for the RLC layer configured for the secondary cell group, or may perform PDCP data recovery in the PDCP layer configured for the master cell group. For example, for a split bearer (one RLC layer is configured for the master cell group, and another RLC layer is configured for the secondary cell group) in which the PDCP layer is configured for the secondary cell group, the RRC message including the configuration information or indicator may include an indicator (reestablishRLC) triggering re-establishment of the RLC layer configured for the master cell group, an indicator triggering PDCP re-establishment (reestablishPDCP) or PDCP suspension (PDCP suspend) in the PDCP layer configured for the secondary cell group may be included together, or the UE may perform re-establishment for the RLC layer configured for the master cell group, or may perform PDCP re-establishment or PDCP suspension (PDCP suspend) in the PDCP layer configured for the secondary cell group. For example, with respect to bearers configured for the secondary cell group, the bearers may be suspend, the RRC layer may indicate, to the PDCP layer, triggering of PDCP re-establishment or PDCP suspension, or PDCP re-establishment or PDCP suspension (PDCP suspend) may be performed in the PDCP layer. The UE may trigger first PDCP suspension for the bearers configured for the secondary cell group or may perform the first PDCP suspension in the PDCP layer. As another method, in order to solve a security issue caused by transmission of different data with the same security key when the secondary cell group is activated or resumed, the UE may trigger second PDCP suspension for the bearers configured for the secondary cell group, or may perform second PDCP suspension in the PDCP layer. As another method, when PDCP layer suspension is triggered in an upper layer, the first PDCP suspension may be triggered and performed, and when the upper layer triggers the PDCP layer suspension or indicates an indicator for deactivation or suspension of a cell group (or cell), second PDCP suspension may be triggered and performed. As another method, when the RRC message includes security key configuration information so as to enable a change of the security key, or an indication of PDCP layer re-establishment is included, PDCP layer re-establishment may be performed, and if the RRC message does not include security key configuration information, or if an indicator indicates a PDCP layer operation, the first PDCP resumption or the second PDCP resumption may be triggered and performed. In order not to transmit stored old data when the suspended bearer, PDCP layer, or RLC layer is resumed, the stored data (e.g., PDCP PDU, PDCP SDU, RLC PDU, or RLC SDU) may be discarded. For example, in the PDCP layer, data discard (SDU discard) may be performed, or RLC layer re-establishment may be performed. The data discard (SDU discard) in the PDCP layer, which is to discard the stored data, or RLC layer re-establishment may be performed when suspension, deactivation, or releasing of a cell group is indicated via the RRC message, MAC control information, or DCI of PDCCH.

2> UE operation for PUCCH SCell of secondary cell group: When an indicator or configuration information is received, the UE may deactivate a PUCCH SCell of the secondary cell group and may perform a UE operation of the deactivated SCell. As another method, when an indicator or configuration information is received, if a dormant bandwidth part is configured for the PUCCH SCell of the secondary cell group, the UE may maintain the SCell active, may activate a downlink bandwidth part of the SCell to a dormant bandwidth part, and may perform a UE operation in the dormant bandwidth part, or if no dormant bandwidth part is configured for the SCell of the secondary cell group, the UE may switch the SCell to a deactivated state, and may perform a UE operation in the deactivated cell or bandwidth part. As another method, when an indicator or configuration information is received, the UE may determine, according to an indicator or SCell configuration information configured in the message including the indicator or configuration information, switching, activation, or deactivation of a bandwidth part or a state of the SCell, and may perform a UE operation. As another method, when an indicator or configuration information is received, the UE may apply the second DRX configuration information configured via the RRC message for the PUCCH SCell, and if PDCCH monitoring can be performed on the basis of a long cycle, a UE operation in the activated SCell may be performed.

The partial reset of the MAC layer proposed in the disclosure may include one or multiple UE operations among the following procedures.

The UE flushes HARQ processes (i.e., general HARQ process, HARQ process for system information, or the like) remaining after excluding an HARQ process for MBS from HARQ processes configured for a serving cell. Further, with respect to the HARQ process for MBS, after handover completion or after RRC state mode transition (to RRC inactive mode or RRC idle mode), the UE may perform emptying (flush), releasing (flush), or initializing (flush) or may omit flushing.

If flushing is performed, or after handover completion or after RRC state mode shifting (to RRC inactive mode or RRC idle mode), at a point in time when a target base station is able to receive an MBS service or at a point in time when G-RNTI monitoring starts, MBS-related HARQ process data may be flushed. Alternatively, data reception via G-RNTI may be continued until handover completion or until completion of RRC state mode transition (to RRC inactive mode or RRC idle mode), and in a case of handover, for the target base station, G-RNTI monitoring may be performed in the target assigned via the RRC message. As another method, data reception via G-RNTI may be continued from the target base station even before completion of random access.

If there is random access being performed, the random access may be discarded.

If there is a specifically configured or indicated preamble identifier, preamble configuration information, or PRACH (random access configuration-related information) configuration information, the same may be discarded.

If there is a temporary cell identifier (temporary C-RNTI), the same may be cleared.

A buffer for message 3 transmission may be flushed.

New data indicators for an HARQ process for an uplink may all be configured to 0.

If an uplink DRX retransmission timer running for an uplink is running, the same may be suspended.

If all uplink HARQ related timers are running, the same may be suspended.

When MAC layer reset is performed, when an indicator for partial MAC layer reset is neither included nor indicated, or partial MAC layer reset is not performed, the UE may perform reset for the entire MAC layer, and accordingly the UE may flush all the configured general HARQ process, HARQ process for MBS, or HARQ process for system information.

First PDCP suspension (or resumption) proposed in the disclosure may include one or more UE operations among the following procedures.

A transmission PDCP layer of the UE may reset a transmission window variable or may configure the transmission window variable to an initial value, or stored data (e.g., PDCP PDU or PDCP SDU) may be discarded. As another method, only a PDCP PDU may be discarded in order to prevent data loss. This is to prevent old data from being transmitted or retransmitted when a secondary cell group is activated or resumed at a later time.

In a reception PDCP layer of the UE, of a reordering timer (t-reordering) (timer for reordering data in ascending order based on PDCP serial numbers or COUNT values) is running, the reordering timer may be suspended or reset. Alternatively, header decompression may be performed on stored data (e.g., PDCP SDU), and the data may be transferred to an upper layer in ascending order of COUNT values. The reception PDCP layer of the UE may reset a reception window variable or may configure the reception window variable to an initial value.

Second PDCP suspension (or resumption) proposed in the disclosure may include one or multiple UE operations among the following procedures.

The transmission PDCP layer of the UE may maintain a variable value without resetting a transmission window variable or configuring the transmission window variable to an initial value. The reason for maintaining the variable value (e.g., COUNT value) is to solve a security issue caused by transmitting different data with the same security key (e.g., COUNT value) when the secondary cell group is activated or resumed. The transmission PDCP layer of the UE may discard stored data (e.g., PDCP PDU or PDCP SDU). As another method, only a PDCP PDU may be discarded in order to prevent data loss. This is to prevent old data from being transmitted or retransmitted when a secondary cell group is activated or resumed at a later time.

In a reception PDCP layer of the UE, of a reordering timer (t-reordering) (timer for reordering data in ascending order based on PDCP serial numbers or COUNT values) is running, the reordering timer may be suspended or reset. Alternatively, header decompression may be performed on stored data (e.g., PDCP SDU), and the data may be transferred to an upper layer in ascending order of COUNT values. The reception PDCP layer of the UE may maintain a variable value without resetting a reception window variable or configuring the reception window variable to an initial value. The reason for maintaining the variable value (e.g., COUNT value) is to solve a security issue caused by transmitting different data with the same security key (e.g., COUNT value) when the secondary cell group is activated or resumed. As another method, when the UE activates or resumes the secondary cell group, or receives data, the UE may configure or update an RX_NEXT window variable (variable indicating a COUNT value of data expected to be received next) to a value of an RX_DELIV window variable (variable indicating a COUNT value corresponding to the next data of data transferred to an upper layer) or a COUNT value of data that the UE receives for the first time, in order to prevent the reordering timer from being immediately triggered even if there is no COUNT value or no PDCP serial number gap. As another method, when a reordering timer value is configured via the message or when an indicator is received from an upper layer, an RX_REORD (variable indicating a COUNT value of the next data of data having triggered the reordering timer) window variable may be configured or updated to a variable value of the RX_NEXT window variable, or the reordering timer may be suspended or restarted.

When the UE receives an indicator (e.g., via DCI of PDCCH, MAC control information, or an RRC message) or configuration information for releasing, deactivating, reconfiguring, or suspending dual connectivity, a cell group (e.g., secondary cell group), or a cell, and the UE performs the proposed UE operations, if data to be transmitted by the UE via an uplink is generated, the UE may transmit a scheduling request (SR) or MAC control information (or indicator, buffer amount, or buffer state report) to a master base station or secondary base station in a PUCCH transmission resource configured via an RRC message so as to request an uplink transmission resource or request configuration, addition, deactivation, resumption, change, or reconfiguration of the dual connectivity, the cell group (e.g., secondary cell group), or the cell. As another method, when the UE receives an indicator (e.g., via DCI of PDCCH, MAC control information, or an RRC message) or configuration information for releasing, deactivating, reconfiguring, or suspending dual connectivity, a cell group (e.g., secondary cell group), or a cell, and the UE performs the proposed UE operations, if data to be transmitted by the UE via an uplink is generated, the UE may generate an RRC message and transmit the RRC message to a master base station or a secondary base station so as to request an uplink transmission resource, or request configuration, addition, deactivation, resumption, change, or reconfiguration of the dual connectivity, the cell group (e.g., secondary cell group), or the cell.

The procedures proposed in the disclosure may be extended to multi-connectivity. For example, configuration information of multiple cell groups may be configured for the UE via an RRC message, one or more cell groups (or cells) among the configured multiple cell groups may be activated or resumed via an indicator of PDCCU, MAC control information, or an RRC message, or one or more cell groups may be suspended or deactivated.

Hereinafter, as proposed in the disclosure, when a secondary cell group or a PSCell of a secondary cell group is deactivated or suspended by deactivation or suspension of the cell group or cell, and when uplink data for the secondary cell group (or in bearers belonging to the secondary cell group) is generated in the UE, a UE operation for reactivating or resuming the cell group or cell is proposed.

If, as proposed in the disclosure, a cell group or a cell is deactivated or suspended, since the UE is unable to transmit or receive data, if uplink data is generated in the secondary cell group (or in bearers belonging to the secondary cell group) of the UE, the cell group or cell may need to be reactivated or resumed. Requesting reactivation or resumption of a cell group or a cell from the base station (maser base station or secondary base station) by the UE may be performed according to one of the following method or a method extended by a combination or application of the following methods.

First method: The UE configures a message (e.g., RRC message) for requesting reactivation or resumption of a secondary cell group or a cell, and transmits the configured message to a master base station. When the message is received, the master base station, as in the first signaling of FIG. 15 proposed in the disclosure, may request resumption and receive a response from a secondary base station, and may configure a message (e.g., RRC message) indicating reactivation or resumption of the secondary cell group, so as to transmit the configured message to the UE. As another method, as in the second signaling of FIG. 16, a master base station may configure a message (e.g., RRC message) indicating reactivation or resumption of a secondary cell group and may transmit the configured message to the UE, and then the UE may indicate activation or resumption to the secondary base station. As another method, as in the third signaling of FIG. 17, the UE may configure a message (e.g., RRC message) for requesting reactivation or resumption of a secondary cell group or a cell and may transmit the configured message to the secondary base station via SRB3, and the secondary base station may configure a message (e.g., RRC message) indicating reactivation or resumption of the secondary cell group and may transmit the configured message to the UE, and then activation or resumption may be indicated to a master base station.

Second method: The UE configures a message (e.g., MAC control information) for requesting reactivation or resumption of a secondary cell group or a cell, and transmits the configured message to a master base station. When the message is received, the master base station, as in the first signaling of FIG. 15 proposed in the disclosure, may request resumption and receive a response from a secondary base station, and may configure a message (e.g., RRC message or MAC control information) indicating reactivation or resumption of the secondary cell group, so as to transmit the configured message to the UE. As another method, as in the second signaling of FIG. 16, a master base station may configure a message (e.g., RRC message or MAC control information) indicating reactivation or resumption of a secondary cell group and may transmit the configured message to the UE, and then the UE may indicate activation or resumption to the secondary base station. As another method, as in the third signaling of FIG. 17, the UE may configure a message (e.g., RRC message or MAC control information) for requesting reactivation or resumption of a secondary cell group or a cell and may transmit the configured message to the secondary base station via SRB3, and the secondary base station may configure a message (e.g., RRC message or MAC control information) indicating reactivation or resumption of the secondary cell group and may transmit the configured message to the UE, and then activation or resumption may be indicated to a master base station. When cell group activation or resumption is requested or indicated via MAC control information, the MAC control information may be newly defined and designed. As another method, a new value (field value or identifier value) may be defined and indicated or a new field (or indicator) may be defined in existing MAC control information (e.g., buffer state report).

Third method: The UE configures a message (e.g., physical signal of a PHY layer) for requesting reactivation or resumption of a secondary cell group or a cell, and transmits the configured message to a master base station. When the message is received, the master base station, as in the first signaling of FIG. 15 proposed in the disclosure, may request resumption and receive a response from a secondary base station, and may configure a message (e.g., RRC message or physical signal of a PHY layer) indicating reactivation or resumption of the secondary cell group, so as to transmit the configured message to the UE. As another method, as in the second signaling of FIG. 16, a master base station may configure a message (e.g., RRC message or physical signal of a PHY layer) indicating reactivation or resumption of a secondary cell group and may transmit the configured message to the UE, and then the UE may indicate activation or resumption to the secondary base station. As another method, as in the third signaling of FIG. 17, the UE may configure a message (e.g., physical signal of a PHY layer) for requesting reactivation or resumption of a secondary cell group or a cell and may transmit the configured message to the secondary base station via SRB3, and the secondary base station may configure a message (e.g., RRC message or physical signal of a PHY layer) indicating reactivation or resumption of the secondary cell group and may transmit the configured message to the UE, and then activation or resumption may be indicated to a master base station. When cell group activation or resumption is requested or indicated via a physical signal of a PHY layer, the physical signal of the PHY layer may be defined and designed with a new transmission resource (e.g., new scheduling request (SR) transmission resource (e.g., PUCCH transmission resource of a PCell or PSCell) for the secondary cell group, or new field of DCI (PDCCH transmission resource transmitted from a PSCell or transmitted from a PCell) of PDCCH). As another method, a new field (or indicator) may be defined, or a new value (field value or identifier value) may be defined and indicated in a physical signal (e.g., scheduling request (SR) transmission resource (e.g., PUCCH transmission resource of a PCell or PSCell) or field (PDCCH transmission resource transmitted from a PSCell or transmitted from a PCell) of DCI of PDCCH) of an existing PHY layer. As another method, when the UE performs PDCCH monitoring with a long cycle for the PSCell of the secondary cell group by applying second DRX configuration information, or when the secondary cell group of the UE is deactivated or suspended, if random access is triggered for the UE in the PSCell via DCI of PDCCH, the UE may interpret the indication as activation of resumption of the secondary cell group.

As proposed in the disclosure, when the UE activates or resumes a cell group (e.g., secondary cell group) or a cell (e.g., PSCell) according to an indicator of an RRC message, MAC control information, or PDCCH, activation or resumption of the cell group or cell may be completed at a first time point. The first time point may be configured via an RRC message as proposed in the disclosure. For example, the RRC message may include time information (e.g., information indicating timing (e.g., X time unit, subframe unit, time slot unit, or symbol unit)) indicating when to activate, resume, deactivate, or suspend dual connectivity, a cell group (e.g., secondary cell group), or a cell (PSCell or SCG SCell). For example, if the RRC message, MAC control information, or PDCCH indicating activation, resumption, deactivation, or suspension of the cell group (e.g., secondary cell group) or cell (e.g., PSCell) is received in an nth time unit, time information indicating that the activation, resumption, deactivation, or suspension of the cell group or cell should be completed in an (n+X)th time unit may be configured. As another method, the time information (e.g., X) may not be configured by the base station, but may be predetermined and defined, and a fixed value may be used. For another example, after reception of the RRC message, MAC control information, or PDCCH indicating activation, resumption, deactivation, or suspension of the cell group (e.g., secondary cell group) or cell (e.g., PSCell), when random access is started (or when a preamble is transmitted) or random access is successfully completed in an nth time unit, time information indicating that the activation, resumption, deactivation, or suspension of the cell group or cell should be completed in an (n+X)th time unit may be configured. As another method, the time information (e.g., X) may not be configured by the base station, but may be predetermined and defined, and a fixed value may be used. When activation, suspension, deactivation, or resumption of the cell group or cell is completed, the UE may perform proposed UE operations according to a state (e.g., active, dormant, or deactivated) of each cell or bandwidth part, proposed in the disclosure. When activation or resumption of the cell group or cell is completed, a DRX operation of the UE may be started or restarted, or when deactivation or suspension of the cell group or cell is completed, the DRX operation of the UE may be suspended or deactivated.

As proposed in the disclosure, when the UE activates a cell group (e.g., master cell group or secondary cell group) or a cell (e.g., PSCell or SCell) according to an indication of MAC control information, activation of the cell may be completed at a second time point. The second time point may be configured via an RRC message as proposed in the disclosure. For example, the RRC message may include time information (e.g., information indicating timing (e.g., X time unit, subframe unit, time slot unit, or symbol unit)) indicating when to activate or deactivate frequency carrier aggregation, dual connectivity, a cell group (e.g., master cell group or secondary cell group), or a cell (MCG SCell or SCG SCell). For example, if MAC control information indicating activation or deactivation of a cell (e.g., SCell) is received in an nth time unit, time information indicating that the activation or deactivation of the cell should be completed in an (n+X)th time unit may be configured. As another method, the time information (e.g., X) may not be configured by the base station, but may be predetermined and defined, and a fixed value may be used. For another example, after reception of MAC control information indicating activation or deactivation of a cell (e.g., SCell or PSCell), when random access is started (or when a preamble is transmitted) or random access is successfully completed in an nth time unit, time information indicating that the activation or deactivation of the cell should be completed in an (n+X)th time unit may be configured. As another method, the time information (e.g., X) may not be configured by the base station, but may be predetermined and defined, and a fixed value may be used. When activation, suspension, deactivation, or resumption of the cell group or cell is completed, the UE may perform proposed UE operations according to a state (e.g., active, dormant, or deactivated) of each cell or bandwidth part, proposed in the disclosure. When activation or resumption of the cell group or cell is completed, a DRX operation of the UE may be started or restarted, or when deactivation or suspension of the cell group or cell is completed, the DRX operation of the UE may be suspended or deactivated.

As proposed in the disclosure, when the UE activates a cell group (e.g., master cell group or secondary cell group) or a cell (e.g., PSCell or SCell) according to an indication of an RRC message, activation of the cell may be completed at a third time point. The third time point may be configured via an RRC message as proposed in the disclosure. For example, the RRC message may include time information (e.g., information indicating timing (e.g., X time unit, subframe unit, time slot unit, or symbol unit)) indicating when to activate or deactivate frequency carrier aggregation, dual connectivity, a cell group (e.g., master cell group or secondary cell group), or a cell (MCG SCell, SCG SCell, or PSCell). For example, if the RRC message indicating activation or deactivation of a cell (e.g., SCell) is received in an nth time unit, time information indicating that the activation or deactivation of the cell should be completed in an (n+X)th time unit may be configured. As another method, the time information (e.g., X) may not be configured by the base station, but may be predetermined and defined, and a fixed value may be used. For another example, after reception of the RRC message indicating activation or deactivation of a cell (e.g., SCell or PSCell), when random access is started (or when a preamble is transmitted) or random access is successfully completed in an nth time unit, time information indicating that the activation or deactivation of the cell should be completed in an (n+X)th time unit may be configured. As another method, the time information (e.g., X) may not be configured by the base station, but may be predetermined and defined, and a fixed value may be used. X may be configured or predetermined on the basis of a slot number, or may be configured or predetermined on the basis of a shortest slot length among the configured PCell, PSCell, or SCells. When activation, suspension, deactivation, or resumption of the cell group or cell is completed, the UE may perform proposed UE operations according to a state (e.g., active, dormant, or deactivated) of each cell or bandwidth part, proposed in the disclosure. When activation or resumption of the cell group or cell is completed, a DRX operation of the UE may be started or restarted, or when deactivation or suspension of the cell group or cell is completed, the DRX operation of the UE may be suspended or deactivated.

The concept of a cell group proposed in the disclosure may be extended to a sub-cell group. For example, in the disclosure, in order to configure dual connectivity for a UE, a first cell group and a secondary cell group are configured, the first and secondary cell groups are applied as a master cell group and a secondary cell group to configure dual connectivity, and data transmission or reception may be performed with two base stations. However, if the concept of the cell group is extended to a sub-cell group, multiple sub-cell groups may be configured for the cell group, or a sub-cell identifier may be configured for each sub-cell group, with respect to a UE connected to one base station. The UE performs data transmission or reception with one base station, but as proposed in the disclosure, activation, suspension, resumption, or deactivation may be extended and applied via an RRC message, MAC control information, or PDCCH for different frequencies or cells for each sub-cell group. For example, when the UE communicates with one base station via multiple frequencies or cells, the base station may configure, for the UE, multiple sub-cell groups to allow the UE to apply frequency carrier aggregation with respect to multiple frequencies or cells of the base station corresponding to the cell group (master cell group), fields indicating the respective sub-cell groups may be defined in an RRC message, MAC control information, or PDCCH, and thus the respective fields may indicate activation, deactivation, suspension, or resumption of the respective sub-cell groups. The UE may apply activation, suspension, resumption, or deactivation via an RRC message, MAC control information, or PDCCH, as proposed in the disclosure, for different frequencies or cells for each sub-cell group. As another method, the proposed sub-cell group may be implemented via introduction of downlink or uplink logical channel restriction for each cell. For example, configuration information that restricts logical channels belonging to one cell group to transmit or receive data only for a specific frequency or cell may be included in an RRC message so as to be configured for the UE. As described above, logical channels (e.g., logical channel identifiers) are configured by mapping to respective cells or frequencies, grouped, and regarded as the proposed sub-cell groups, fields indicating the respective cells may be defined in an RRC message, MAC control information, or PDCCH, and the respective fields may indicate activation, deactivation, suspension, or resumption of the respective cell.

In the disclosure, when the UE, for which dual connectivity has been configured, performs data transmission or reception with a master cell group or a secondary cell group, or when the secondary cell group is suspended or deactivated, if the master cell group detects a radio link failure, the UE may report the radio link failure to the secondary cell group or to the master cell group via the secondary cell group. For example, an RRC message for radio link failure reporting may be configured, and the radio link failure may be transmitted and reported via split SRB1 or SRB3. When split SRB1 is configured, the radio link failure may be always reported via split SRB1. As another method, when the UE, for which dual connectivity has been configured, performs data transmission or reception with a master cell group or a secondary cell group, or when the secondary cell group is suspended or deactivated, if the master cell group detects a radio link failure, the UE may declare a radio link failure and may perform RRC connection re-establishment.

In the disclosure, when the UE, for which dual connectivity has been configured, performs data transmission or reception with a master cell group or a secondary cell group, or when the secondary cell group is suspended or deactivated, if the secondary cell group detects a radio connection failure, the UE may report the radio connection failure to the master cell group or to the secondary cell group via the master cell group. For example, an RRC message for radio connection failure reporting may configured, and the radio connection failure may be transmitted and reported via SRB1, split SRB1, or SRB3. When SRB1 or split SRB1 is configured, the radio link failure may be always reported via split SRB1.

In the disclosure, when the UE receives an RRC message, if a secondary cell group is included: instead of storing cell group configuration information, configuring the secondary cell group on the basis of the cell group configuration information, and always configuring dual connectivity so as to perform data transmission or reception, when the RRC message is received, the cell group configuration information may only be stored, or may be stored or restored, applied, and established, and data transmission or reception may be performed based on dual connectivity, on the basis of indication information, for example, a cell group identifier, cell group state information, or an indicator, configured for the RRC message, as proposed in the disclosure.

By extending the disclosure, a base station may enable configuration and storage of multiple pieces of cell group information for one UE via an RRC message, may indicate one piece of cell group information from the stored cell group configuration information, may apply and establish a configuration so as to configure dual connectivity, and may enable data transmission or reception. Alternatively, the cell group may be activated, deactivated, suspended, resumed, or cleared as necessary. A master cell group or a secondary cell group may be configured by one piece of cell group configuration information from the cell group configuration information. When dual connectivity is configured for one piece of cell group configuration information, the UE may attempt to connect to the cell group via contention-based random access. If the cell group configuration information includes contention-free random access-related configuration information, connection may be performed by performing contention-free random access to the cell group on the basis of the information.

Figure 18:
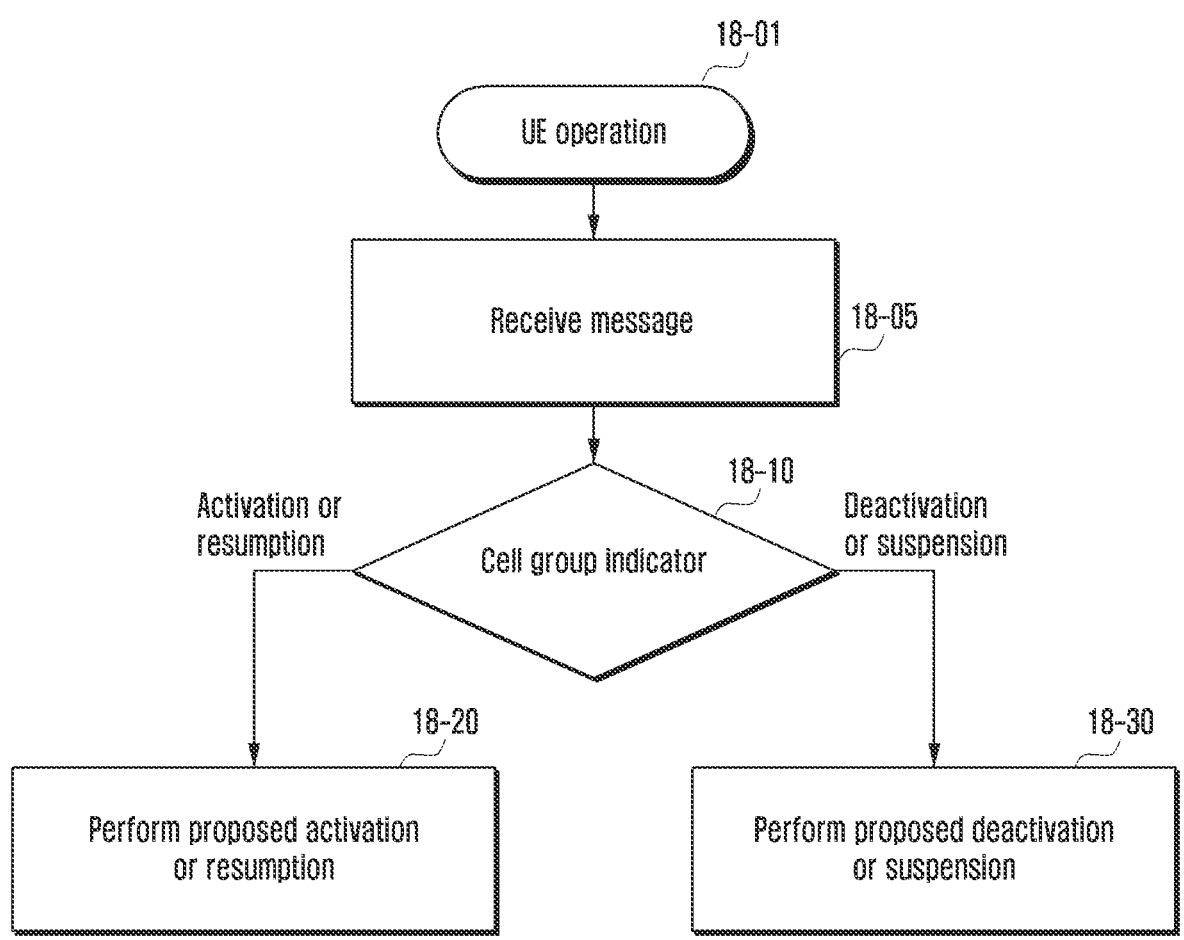
FIG. 18 is a diagram illustrating an operation of a UE according to an embodiment of the disclosure.

FIG. 18 is a diagram illustrating an operation of a UE according to an embodiment of the disclosure.

Referring to FIG. 18, a UE 18-01 may receive a message in operation 18-05 (e.g., DCI of PDCCH, MAC control information, or RRC message) from a base station. When the message includes cell group configuration information, a cell group state, or a cell group indicator, the UE may determine in operation 18-10 whether configuration, addition, activation, or resumption of a cell group is indicated, or whether releasing, deactivation, or suspension of the cell group is indicated. If configuration, addition, activation, or resumption of the cell group is indicated, cell group configuration, addition, activation, or resumption, proposed in the disclosure, may be performed in operation 18-20, and if releasing, deactivation, or suspension of the cell group is indicated, cell group releasing, deactivation, or suspension, proposed in the disclosure, may be performed in operation 18-30.

Although the various embodiments of the disclosure are mainly described from the UE side, those skilled in the art will understand that the various embodiments of this application also include operations on the base station side, and the base station side will perform operations corresponding to the UE side.

Figure 19:
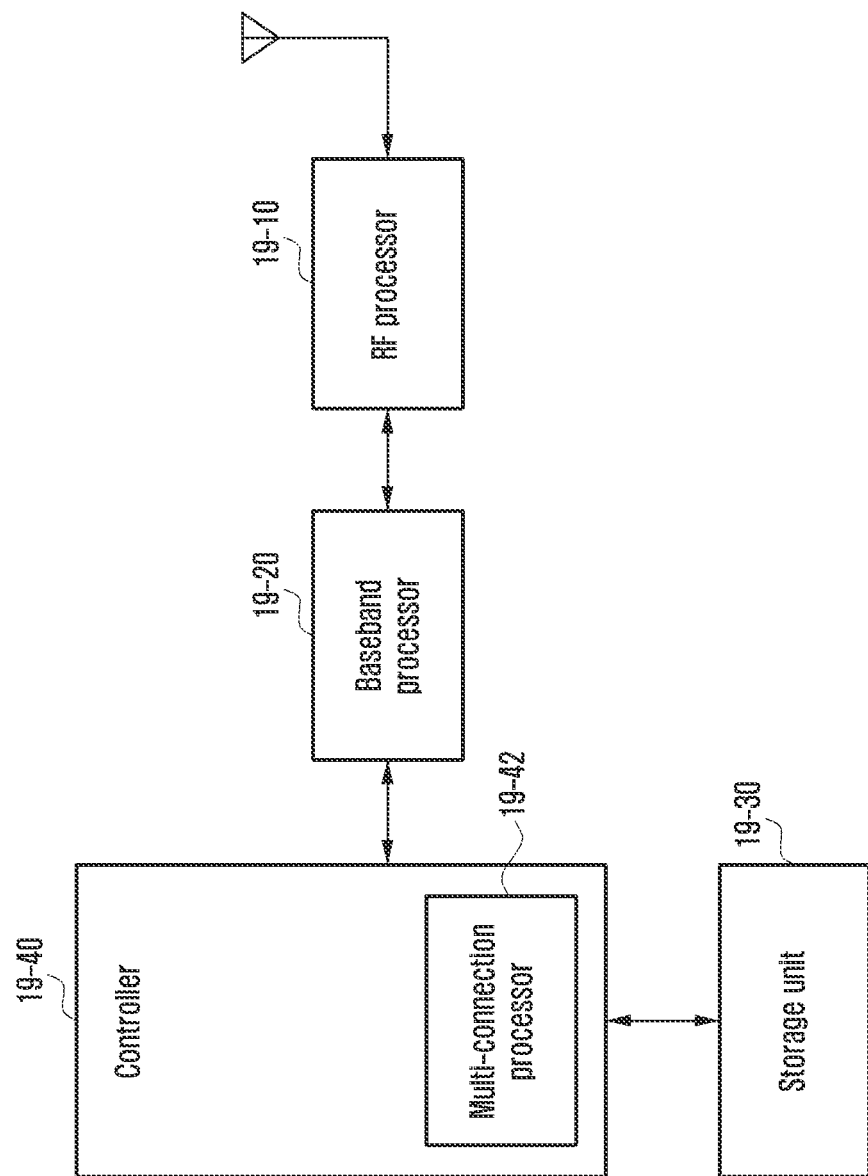
FIG. 19 is a block diagram illustrating a structure of a UE in a communication system according to an embodiment of the disclosure.

FIG. 19 is a block diagram illustrating a structure of a UE in a communication system according to an embodiment of the disclosure.

Referring to FIG. 19, the UE includes a radio frequency (RF) processor 19-10, a baseband processor 19-20, a storage unit 19-30, and a controller 19-40.

The RF processor 19-10 performs a function for transmitting or receiving a signal via a radio channel, such as signal band transform and signal amplification. That is, the RF processor 19-10 up-converts a baseband signal provided from the baseband processor 19-20 into an RF band signal, transmits the converted RF band signal via an antenna, and then down-converts the RF band signal received via the antenna into a baseband signal. For example, the RF processor 19-10 may include a transmission filter, a reception filter, an amplifier, a mixer, an oscillator, a digital-to-analog convertor (DAC), an analog-to-digital convertor (ADC), and the like. In the drawing, only one antenna is illustrated, but the UE may have multiple antennas. The RF processor 19-10 may include multiple RF chains. The RF processor 19-10 may perform beamforming. For the beamforming, the RF processor 19-10 may adjust a phase and a magnitude of each of signals transmitted or received via multiple antennas or antenna elements. The RF processor may perform MIMO, and may receive multiple layers when performing MIMO operations. The RF processor 19-10 may perform reception beam sweeping by appropriately configuring the multiple antennas or antenna elements under the control of the controller, or may adjust the direction and beam width of a reception beam so that the reception beam is coordinated with a transmission beam.

The baseband processor 19-20 performs conversion between a baseband signal and a bitstream according to a physical layer specification of a system. For example, during data transmission, the baseband processor 19-20 generates complex symbols by encoding and modulating a transmission bitstream. When data is received, the baseband processor 19-20 reconstructs a reception bitstream via demodulation and decoding of the baseband signal provided from the RF processor 19-10. For example, in a case of conforming to an orthogonal frequency division multiplexing (OFDM) scheme, during data transmission, the baseband processor 19-20 generates complex symbols by encoding and modulating a transmission bitstream, maps the complex symbols to sub-carriers, and then configures OFDM symbols by performing an inverse fast Fourier transform (IFFT) operation and cyclic prefix (CP) insertion. Further, during data reception, the baseband processor 19-20 divides the baseband signal provided from the RF processor 19-10 in units of OFDM symbols, reconstructs the signals mapped to the sub-carriers via a fast Fourier transform (FFT) operation, and then reconstructs the reception bitstream via demodulation and decoding.

The baseband processor 19-20 and the RF processor 19-10 transmit and receive signals as described above. Accordingly, the baseband processor 19-20 and the RF processor 19-10 may be referred to as a transmitter, a receiver, a transceiver, or a communication unit. Moreover, at least one of the baseband processor 19-20 and the RF processor 19-10 may include multiple communication modules to support multiple different radio access technologies. At least one of the baseband processor 19-20 and the RF processor 19-10 may include different communication modules to process signals in different frequency bands. For example, the different radio access technologies may include an LTE network, an NR network, and the like. The different frequency bands may include a super high frequency (SHF) (e.g., 2.5 GHz and 5 GHZ) band and a millimeter wave (e.g., 60 GHZ) band.

The storage unit 19-30 stores data, such as a default program, an application program, and configuration information, for operation of the UE. The storage unit 19-30 provides stored data in response to a request of the controller 19-40.

The controller 19-40 controls overall operations of the UE. For example, the controller 19-40 transmits or receives a signal via the baseband processor 19-20 and the RF processor 19-10. The controller 19-40 records and reads data in the storage unit 19-30. To this end, the controller 19-40 may include at least one processor such as multi-connection processor 19-42. For example, the controller 19-40 may include a communication processor (CP) configured to perform control for communication and an application processor (AP) configured to control an upper layer, such as an application program.

Figure 20:
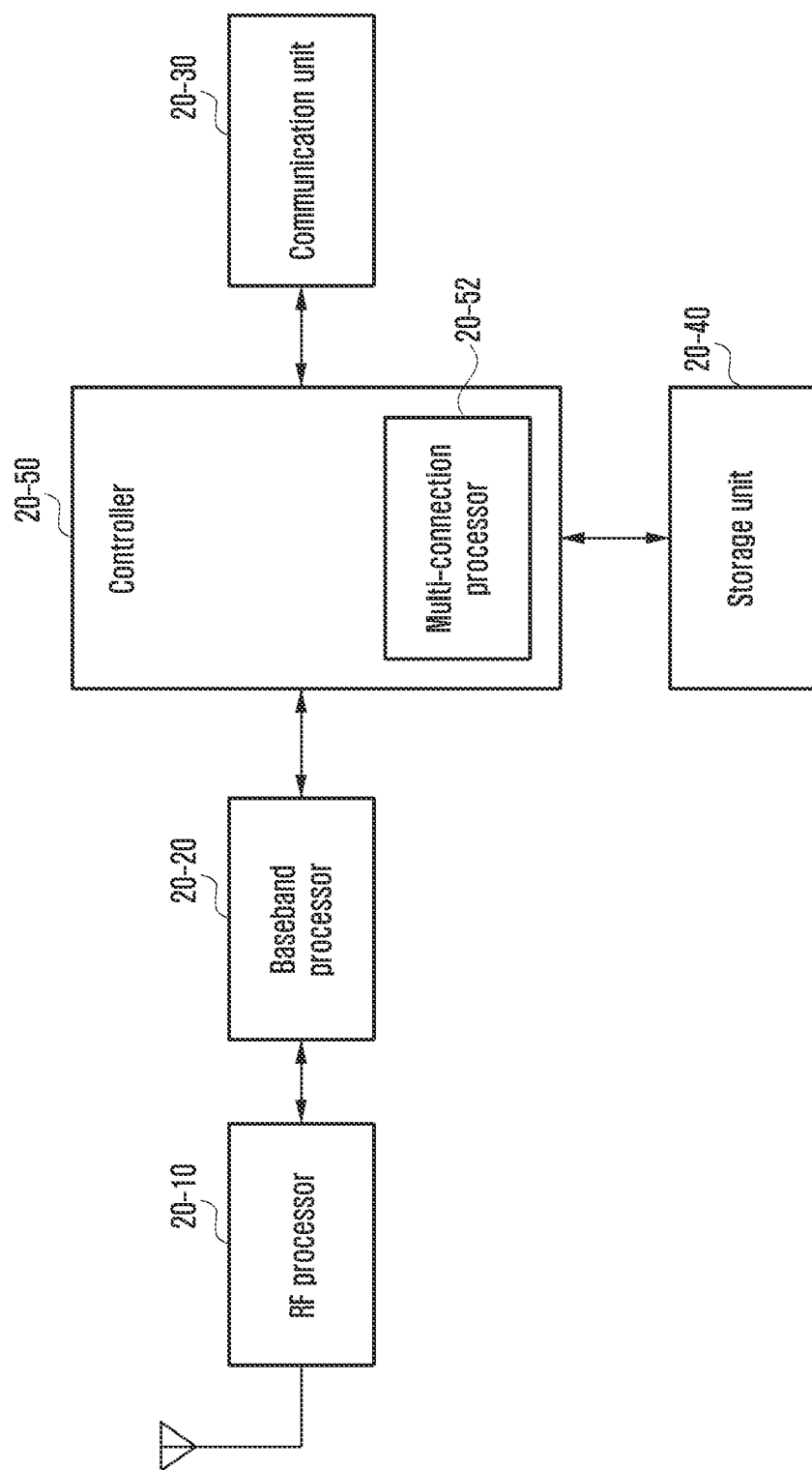
FIG. 20 is a block diagram illustrating a structure of a base station in a communication system according to an embodiment of the disclosure.

FIG. 20 is a block diagram illustrating a structure of a base station in a communication system according to an embodiment of the disclosure.

Referring to FIG. 20, a base station includes an RF processor 20-10, a baseband processor 20-20, a backhaul communication unit 20-30, a storage unit 20-40, and a controller 20-50.

The RF processor 20-10 performs a function for transmitting or receiving a signal via a radio channel, such as signal band transform and signal amplification. That is, the RF processor 20-10 up-converts a baseband signal provided from the baseband processor 20-20 into an RF band signal, transmits the converted RF band signal via an antenna, and then down-converts the RF band signal received via the antenna into a baseband signal. For example, the RF processor 20-10 may include a transmission filter, a reception filter, an amplifier, a mixer, an oscillator, a DAC, an ADC, and the like. In the drawing, only one antenna is illustrated, but a first access node may include multiple antennas. The RF processor 20-10 may include multiple RF chains. Moreover, the RF processor 20-10 may perform beamforming. For the beamforming, the RF processor 20-10 may adjust a phase and a magnitude of each of signals transmitted or received via the multiple antennas or antenna elements. The RF processor may perform downlink MIMO by transmitting one or more layers.

The baseband processor 20-20 performs a function of conversion between a baseband signal and a bitstream according to a physical layer specification of a first radio access technology. For example, during data transmission, the baseband processor 20-20 generates complex symbols by encoding and modulating a transmission bitstream. When data is received, the baseband processor 20-20 reconstructs a reception bitstream via demodulation and decoding of the baseband signal provided from the RF processor 20-10. For example, in a case of conforming to an OFDM scheme, during data transmission, the baseband processor 20-20 generates complex symbols by encoding and modulating a transmission bitstream, maps the complex symbols to sub-carriers, and then configures OFDM symbols by performing IFFT operation and CP insertion. Further, during data reception, the baseband processor 20-20 divides the baseband signal provided from the RF processor 20-10 in units of OFDM symbols, reconstructs the signals mapped to the sub-carriers via an FFT operation, and then reconstructs the reception bitstream via demodulation and decoding. The baseband processor 20-20 and the RF processor 20-10 transmit and receive signals as described above. Accordingly, the baseband processor 20-20 and the RF processor 20-10 may be referred to as a transmitter, a receiver, a transceiver, a communication unit, or a wireless communication unit.

The communication unit 20-30 provides an interface configured to perform communication with other nodes within a network.

The storage unit (memory) 20-40 stores data, such as a default program, an application program, configuration information, for operation of the main base station. Particularly, the storage unit 20-40 may store information on a bearer assigned to a connected UE, a measurement result reported from the connected UE, and the like. The storage unit 20-40 may store information serving as a criterion for determining whether to provide the UE with multi-connectivity or to suspend multi-connectivity. The storage unit 20-40 provides stored data in response to a request of the controller 20-50.

The controller 20-50 controls overall operations of the main base station. For example, the controller 20-50 transmits or receives a signal via the baseband processor 20-20 and the RF processor 20-10 or via the backhaul communication unit 20-30. The controller 20-50 records and reads data in the storage unit 20-40. To this end, the controller 20-50 may include at least one processor such as multi-connection processor 20-52.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a first base station, a radio resource control (RRC) message including configuration information for a secondary cell group (SCG) including at least one serving cell associated with a second base station, wherein the RRC message is for activation or deactivation of the SCG; and
   in case that the SCG activation is indicated by the RRC message:
   performing the SCG activation based on the RRC message; and
   performing an initialization of a suspended configured uplink grant type 1 associated with a primary secondary cell (PSCell) associated with the SCG.

2. The method of claim 1, further comprising:
   in case that the SCG activation is indicated by the RRC message, performing at least one of a physical downlink control channel (PDCCH) monitoring on the PSCell, a channel state information (CSI) reporting for the PSCell, a sounding reference signal (SRS) transmission on the PSCell, a physical uplink control channel (PUCCH) transmission on the PSCell, or information associated with a random access channel (RACH) transmission on the PSCell.

3. The method of claim 1, further comprising:
   in case that the SCG deactivation is indicated by the RRC message, suspending the configured uplink grant type 1 associated with the PSCell or clearing a configured uplink grant type 2 associated with the PSCell.

4. The method of claim 1, further comprising:
   in case that the SCG deactivation is indicated by the RRC message, a PDCCH is not monitored on the PSCell.

5. A method performed by a first base station in a wireless communication system, the method comprising:
   transmitting, to a terminal, a radio resource control (RRC) message including configuration information for a secondary cell group (SCG) including at least one serving cell associated with a second base station, wherein the RRC message is for activation or deactivation of the SCG; and
   in case that the SCG activation is indicated by the RRC message, receiving a physical uplink control channel (PUCCH) transmission on a primary secondary cell (PSCell) associated with the SCG.

6. The method of claim 5, wherein in case that the SCG activation is indicated by the RRC message, at least one of a physical downlink control channel (PDCCH) monitoring on the PSCell, a channel state information (CSI) reporting for the PSCell, a sounding reference signal (SRS) transmission on the PSCell, information associated with a random access channel (RACH) transmission on the PSCell, or an initialization of a suspended configured uplink grant type 1 associated with the PSCell is performed.

7. The method of claim 5, wherein in case that the SCG deactivation is indicated by the RRC message, the configured uplink grant type 1 associated with the PSCell is suspended or a configured uplink grant type 2 associated with the PSCell is cleared.

8. The method of claim 5, wherein in case that the SCG deactivation is indicated by the RRC message, a PDCCH is not monitored on the PSCell.

9. A terminal in a wireless communication system, the terminal comprising:
   a transceiver; and
   a controller coupled with the transceiver configured to:
   receive, from a first base station, a radio resource control (RRC) message including configuration information for a secondary cell group (SCG) including at least one serving cell associated with a second base station, wherein the RRC message is for activation or deactivation of the SCG; and
   in case that the SCG activation is indicated by the RRC message:
   perform the SCG activation based on the RRC message; and
   perform an initialization of a suspended configured uplink grant type 1 associated with a primary secondary cell (PSCell) associated with the SCG.

10. The terminal of claim 9, wherein the controller is further configured to:
    in case that the SCG activation is indicated by the RRC message, perform at least one of a physical downlink control channel (PDCCH) monitoring on the PSCell, a channel state information (CSI) reporting for the PSCell, a sounding reference signal (SRS) transmission on the PSCell, a physical uplink control channel (PUCCH) transmission on the PSCell, or information associated with a random access channel (RACH) transmission on the PSCell.

11. The terminal of claim 9, wherein the controller is further configured to:
   in case that the SCG deactivation is indicated by the RRC message, suspend the configured uplink grant type 1 associated with the PSCell or clearing a configured uplink grant type 2 associated with the PSCell.

12. The terminal of claim 9, wherein the controller is further configured to:
   in case that the SCG deactivation is indicated by the RRC message, a PDCCH is not monitored on the PSCell.

13. A first base station in a wireless communication system, the first base station comprising:
   a transceiver; and
   a controller coupled with the transceiver configured to:
      transmit, to a terminal, a radio resource control (RRC) message including configuration information for a secondary cell group (SCG) including at least one serving cell associated with a second base station, wherein the RRC message is for activation or deactivation of the SCG; and
      in case that the SCG activation is indicated by the RRC message, receive a physical uplink control channel (PUCCH) transmission on a primary secondary cell (PSCell) associated with the SCG.

14. The first base station of claim 13, wherein in case that the SCG activation is indicated by the RRC message, at least one of a physical downlink control channel (PDCCH) monitoring on the PSCell, a channel state information (CSI) reporting for the PSCell, a sounding reference signal (SRS) transmission on the PSCell, information associated with a random access channel (RACH) transmission on the PSCell, or an initialization of a suspended configured uplink grant type 1 associated with the PSCell is performed.

15. The first base station of claim 13,
   wherein in case that the SCG deactivation is indicated by the RRC message, the configured uplink grant type 1 associated with the PSCell is suspended or a configured uplink grant type 2 associated with the PSCell is cleared, and
   wherein in case that the SCG deactivation is indicated by the RRC message, a PDCCH is not monitored on the PSCell.

* * * * *